US012128683B2

(12) United States Patent
Katakura et al.

(10) Patent No.: US 12,128,683 B2
(45) Date of Patent: Oct. 29, 2024

(54) DRIVE METHOD OF LIQUID DISCHARGING HEAD AND LIQUID DISCHARGING APPARATUS

(71) Applicant: SEIKO EPSON CORPORATION, Tokyo (JP)

(72) Inventors: Takahiro Katakura, Okaya (JP); Takanori Aimono, Matsumoto (JP); Shotaro Tamai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 17/653,759

(22) Filed: Mar. 7, 2022

(65) Prior Publication Data

US 2022/0288926 A1 Sep. 15, 2022

(30) Foreign Application Priority Data

Mar. 10, 2021 (JP) ................................ 2021-038552

(51) Int. Cl.
*B41J 2/045* (2006.01)
*B41J 2/165* (2006.01)

(52) U.S. Cl.
CPC ......... *B41J 2/04588* (2013.01); *B41J 2/0451* (2013.01); *B41J 2/165* (2013.01)

(58) Field of Classification Search
CPC .................................................. B41J 2/04593
See application file for complete search history.

(56) References Cited

U.S. PATENT DOCUMENTS

| | | | | |
|---|---|---|---|---|
| 6,402,282 | B1 | 6/2002 | Webb | |
| 8,393,702 | B2 * | 3/2013 | Menzel | B41J 2/04516 347/11 |
| 2002/0012017 | A1 * | 1/2002 | Yonekubo | B41J 2/04581 347/10 |
| 2006/0221106 | A1 * | 10/2006 | Mataki | B41J 29/38 347/10 |
| 2007/0091150 | A1 * | 4/2007 | Kodama | B41J 2/17566 347/68 |
| 2009/0244200 | A1 * | 10/2009 | Ozawa | B41J 2/14201 347/68 |

(Continued)

FOREIGN PATENT DOCUMENTS

| | | |
|---|---|---|
| JP | 2002-086765 A | 3/2002 |
| JP | 2002-326357 A | 11/2002 |

(Continued)

*Primary Examiner* — Shelby L Fidler
(74) *Attorney, Agent, or Firm* — WORKMAN NYDEGGER

(57) ABSTRACT

Provided is a drive method of a liquid discharging head including a first step of forming a first liquid column by supplying a drive signal having a first waveform to a drive element, and a second step of, when the first liquid column is formed, forming a second liquid column by supplying a drive signal having a second waveform to the drive element, and thereafter discharging a part or all of liquid constituting the second liquid column as a droplet, in which when a drive signal having the first waveform but not having the second waveform is supplied to the drive element, a droplet is not discharged from the discharging portion, and when a drive signal having the second waveform but not having the first waveform is supplied to the drive element, a droplet is not discharged from the discharging portion.

15 Claims, 29 Drawing Sheets

(56) References Cited

U.S. PATENT DOCUMENTS

| | | | | |
|---|---|---|---|---|
| 2010/0194804 | A1* | 8/2010 | Ozawa | B41J 2/04581 347/11 |
| 2011/0007108 | A1 | 1/2011 | Ozawa et al. | |
| 2011/0141172 | A1* | 6/2011 | Menzel | B41J 2/04595 347/11 |
| 2012/0218333 | A1* | 8/2012 | Nishikawa | B41J 2/04581 347/10 |
| 2013/0038651 | A1* | 2/2013 | Satou | B41J 2/04593 347/9 |
| 2013/0070010 | A1* | 3/2013 | Tobita | B41J 2/04588 347/11 |
| 2014/0327714 | A1* | 11/2014 | Iwata | B41J 2/04596 347/11 |

FOREIGN PATENT DOCUMENTS

| | | | |
|---|---|---|---|
| JP | 2004-249686 | A | 9/2004 |
| JP | 2010-179660 | A | 8/2010 |
| JP | 2011-037257 | A | 2/2011 |
| JP | 2011-121368 | A | 6/2011 |

* cited by examiner

FIG. 6

| | Sd[m] | Tcu1 | Tcu2 | Tcu3 | Tcu4 | Tcu5 |
|---|---|---|---|---|---|---|
| DRIVE MODE α1 | (1,1,1,1,1) | H | H | H | H | H |
| DRIVE MODE α2 | (0,0,0,1,1) | L | L | L | H | H |
| DRIVE MODE α3 | (0,0,1,1,1) | L | L | H | H | H |
| DRIVE MODE α4 | (0,1,1,1,1) | L | H | H | H | H |
| DRIVE MODE α5 | (0,0,0,0,0) | L | L | L | L | L |

FIG. 24

| | Sd[m] | Tu1 | Tu2 | Tu3 | Tu4 | Tu5 |
|---|---|---|---|---|---|---|
| DRIVE STATE α1 | (1,1,1,1,1) | H | H | H | H | H |
| DRIVE STATE α2 | (0,0,0,1,1) | L | L | L | H | H |
| DRIVE STATE α3 | (0,0,1,1,1) | L | L | H | H | H |
| DRIVE STATE α4 | (0,1,1,1,1) | L | H | H | H | H |
| DRIVE STATE α6 | (0,0,0,1,0) | L | L | L | H | L |

FIG 26

| | Sd[m] | Tu1 | Tu2 | Tu3 | Tu4 | Tu5 |
|---|---|---|---|---|---|---|
| DRIVE MODE α1 | (1,1,1,1,1) | H | H | H | H | H |
| DRIVE MODE α2 | (0,0,0,1,1) | L | L | L | H | H |
| DRIVE MODE α3 | (0,0,1,1,1) | L | L | H | H | H |
| DRIVE MODE α4 | (0,1,1,1,1) | L | H | H | H | H |
| DRIVE MODE α7 | (0,1,0,0,0) | L | H | L | L | L |
| DRIVE MODE α8 | (1,0,1,0,0) | H | L | H | L | L |

| VISCOSITY | NUMBER OF DRIVE PULSES INCLUDED IN DRIVE SIGNAL Vin1 |
|---|---|
| LESS THAN 20 mPa SECONDS | 0 |
| 20 mPa SECONDS OR MORE AND LESS THAN 30 mPa SECONDS | 1 |
| 30 mPa SECONDS OR MORE AND LESS THAN 50 mPa SECONDS | 2 |
| 50 mPa SECONDS OR MORE AND LESS THAN 70 mPa SECONDS | 3 |

DRIVE METHOD OF LIQUID DISCHARGING HEAD AND LIQUID DISCHARGING APPARATUS

The present application is based on, and claims priority from JP Application Serial Number 2021-038552, filed Mar. 10, 2021, the disclosure of which is hereby incorporated by reference herein in its entirety.

BACKGROUND

1. Technical Field

The present disclosure relates to a drive method of a liquid discharging head and a liquid discharging apparatus.

2. Related Art

JP-A-2011-37257 discloses a liquid discharging head that discharges droplets by receiving a drive signal.

However, in the related art described above, there is a possibility that droplets cannot be discharged when the viscosity of liquid becomes high.

SUMMARY

In order to solve the above problems, a drive method of a liquid discharging head according to a preferred embodiment of the present disclosure is a drive method of a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber, the drive method including: a first step of forming a first liquid column in which a liquid surface inside the discharging portion protrudes in the discharging direction by supplying a drive signal, which has a first waveform including a first drive pulse having a first drive component that causes the pressure inside the pressure chamber to decrease and a second drive component that causes the pressure inside the pressure chamber to increase, to the drive element; and a second step of, when the first liquid column is formed, forming a second liquid column in which a liquid surface inside the discharging portion protrudes in the discharging direction by supplying a drive signal, which has a second waveform including a second drive pulse having a third drive component that causes the pressure inside the pressure chamber to decrease and a fourth drive component that causes the pressure inside the pressure chamber to increase, to the drive element, and thereafter discharging a part or all of liquid constituting the second liquid column as a droplet, in which when a drive signal having the first waveform but not having the second waveform is supplied to the drive element, a droplet is not discharged from the discharging portion, and when a drive signal having the second waveform but not having the first waveform is supplied to the drive element, a droplet is not discharged from the discharging portion.

Further, in order to solve the above problems, a liquid discharging apparatus according to a preferred embodiment of the present disclosure is a liquid discharging apparatus including: a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber; and a control portion controlling the liquid discharging head, in which the control portion forms a first liquid column in which a liquid surface inside the discharging portion protrudes in the discharging direction by supplying a drive signal, which has a first waveform including a first drive pulse having a first drive component that causes the pressure inside the pressure chamber to decrease and a second drive component that causes the pressure inside the pressure chamber to increase, to the drive element, and when the first liquid column is formed, forms a second liquid column in which a liquid surface inside the discharging portion protrudes in the discharging direction by supplying a drive signal, which has a second waveform including a second drive pulse having a third drive component that causes the pressure inside the pressure chamber to decrease and a fourth drive component that causes the pressure inside the pressure chamber to increase, to the drive element, and thereafter discharges a part or all of liquid constituting the second liquid column as a droplet, when a drive signal having the first waveform but not having the second waveform is supplied to the drive element, a droplet is not discharged from the discharging portion, and when a drive signal having the second waveform but not having the first waveform is supplied to the drive element, a droplet is not discharged from the discharging portion.

BRIEF DESCRIPTION OF THE DRAWINGS

FIG. 6 is a view for describing five drive modes in which an individual designation signal Sd[m] can be obtained.

FIG. 24 is a view for describing five drive modes in a first modification example.

FIG. 26 is a view for describing six drive modes in a second modification example.

DESCRIPTION OF EXEMPLARY EMBODIMENTS

Figure 1:
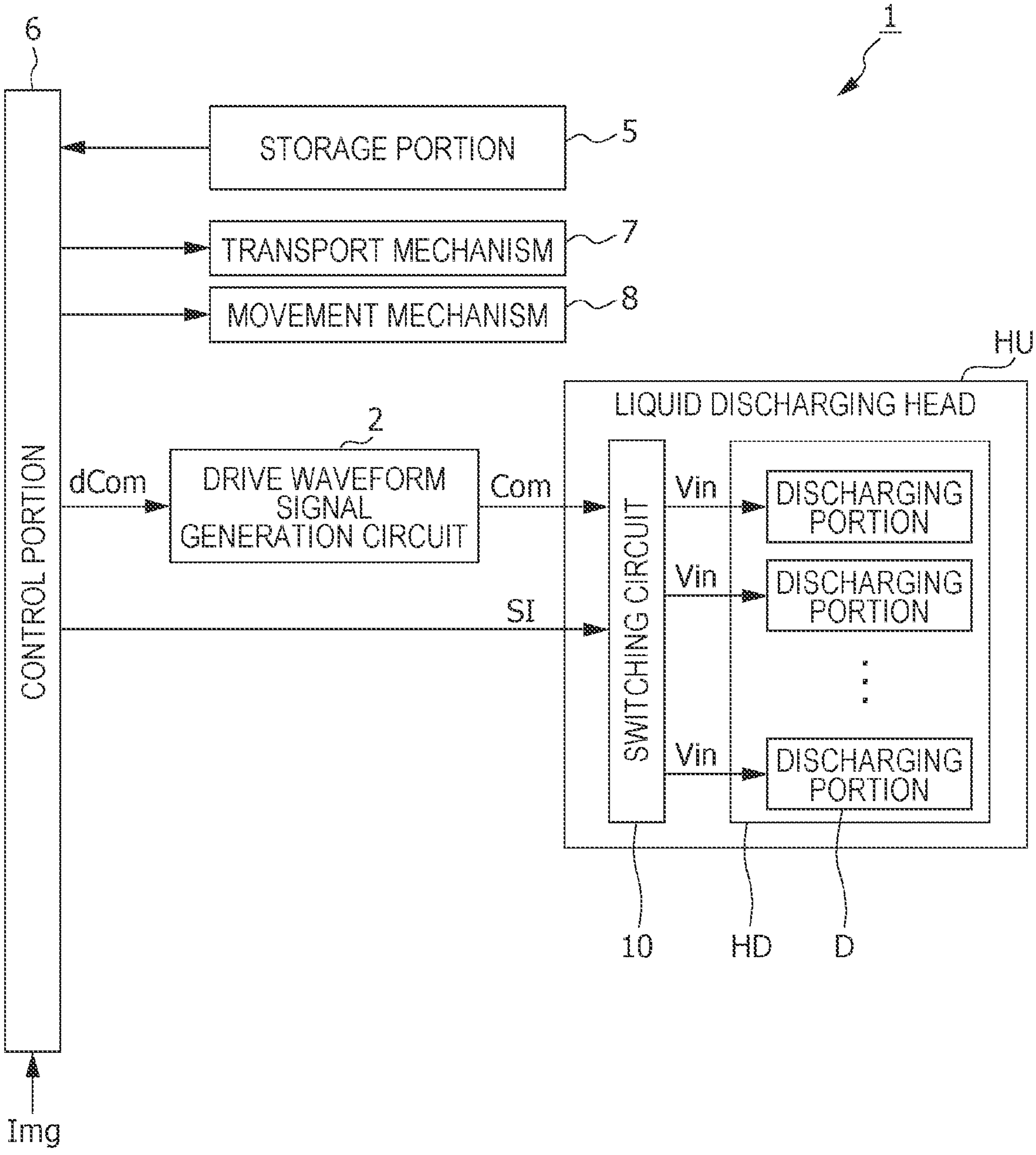
FIG. 1 is a functional block view illustrating an example of a configuration of an ink jet printer 1 according to a present embodiment.

Hereinafter, an embodiment for carrying out the present disclosure will be described with reference to the drawings. However, in each drawing, the size and scale of each part are appropriately different from the actual ones. Further, the embodiment described below is a desired specific example of the present disclosure, so various technically desirable limitations are attached, but the scope of the present disclosure is not limited to these forms unless otherwise stated to limit the present disclosure in the following description.

1. FIRST EMBODIMENT

In the present embodiment, a liquid discharging apparatus will be described by exemplifying an ink jet printer 1 that discharges ink on a recording paper P to form an image. The ink jet printer 1 is an example of a liquid discharging apparatus. The ink is an example of "liquid". The recording paper P is an example of a medium.

It is assumed that the ink in the present embodiment has a higher viscosity than general ink. Specifically, in the present embodiment, the viscosity of the ink is 20 millipascal seconds or more, desirably 40 millipascal seconds. Hereinafter, in the drawings, millipascal seconds may be referred to as "mPa s".

1.1. Overview of Ink Jet Printer 1

Figure 2:
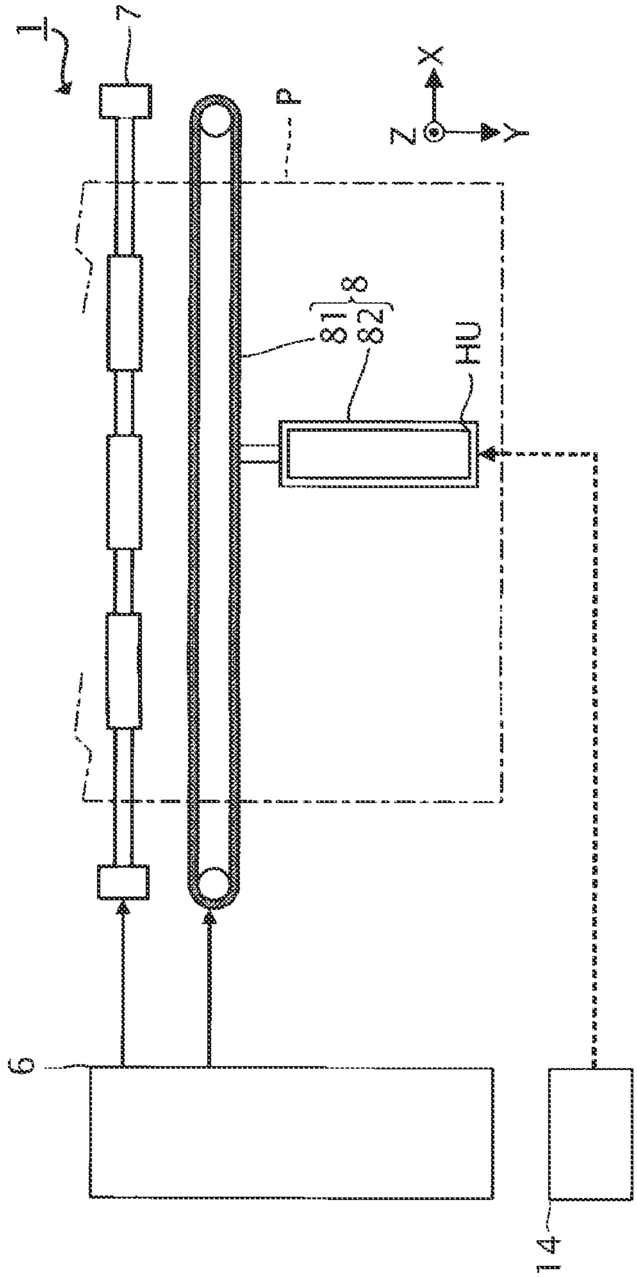
FIG. 2 is a schematic view illustrating the ink jet printer 1.

A configuration of the ink jet printer 1 according to the present embodiment will be described with reference to FIGS. 1 and 2. FIG. 1 is a functional block view illustrating an example of a configuration of the ink jet printer 1 according to the present embodiment. Further, FIG. 2 is a schematic view illustrating the ink jet printer 1.

The ink jet printer 1 is supplied with print data Img indicating an image to be formed by the ink jet printer 1 and information indicating the number of print copies of the image to be formed by the ink jet printer 1 from a host computer such as a personal computer or a digital camera. The ink jet printer 1 executes a printing process of forming the image, which is indicated by the print data Img supplied from the host computer, on a recording paper P.

As illustrated in FIG. 1, the ink jet printer 1 includes a liquid discharging head HU provided with a discharging portion D that discharges ink, a control portion 6 that controls an operation of each portion of the ink jet printer 1, a drive waveform signal generation circuit 2 that generates a drive waveform signal Com for driving the discharging portion D, a storage portion 5 that stores a control program and other information of the ink jet printer 1, a transport mechanism 7 that transports a recording paper P, and a movement mechanism 8 for moving the liquid discharging head HU.

In the present embodiment, the liquid discharging head HU includes a recording head HD provided with M discharging portions D and a switching circuit 10. In the present embodiment, "M" is an integer of 1 or more.

In the following, in order to distinguish each of the M discharging portions D provided in the recording head HD, M discharging portions D may be referred to as a first stage, a second stage, . . . , an M stage in order. Further, the m stage discharging portion D may be referred to as a discharging portion D[m]. The variable "m" is an integer satisfying 1 or more and M or less. Further, when a component, a signal, or the like of the ink jet printer 1 corresponds to a stage number m of the discharging portion D[m], a symbol for representing the component, the signal, or the like may be represented by adding a suffix[m] indicating that the component, the signal, or the like corresponds to the stages number m.

In the present embodiment, it is assumed that the ink jet printer 1 is a serial printer. Specifically, as illustrated in FIG. 2, the ink jet printer 1 executes a printing process by discharging the ink from the discharging portion D while transporting the recording paper P in a sub-scanning direction and moving the liquid discharging head HU in a main scanning direction. In the present embodiment, as illustrated in FIG. 2, the +X direction and the −X direction, which is an opposite direction of the +X direction, are the main scanning directions, and the +Y direction is the sub-scanning direction. Hereinafter, the +X direction and the −X direction are collectively referred to as the “X axis direction”, and hereinafter, the +Y direction and the −Y direction, which is an opposite direction of the +Y direction, are collectively referred to as the “Y axis direction”. Further, a direction perpendicular to the X axis direction and the Y axis direction, and which is a discharging direction of the ink is referred to as the −Z direction. The −Z direction and the +Z direction, which is an opposite direction of the −Z direction, are collectively referred to as the “Z axis direction”. The +Z direction is an example of a “pull-in direction”.

The recording head HD and the discharging portion D, which is provided on the recording head HD, will be described with reference to FIG. 3.

Figure 3:
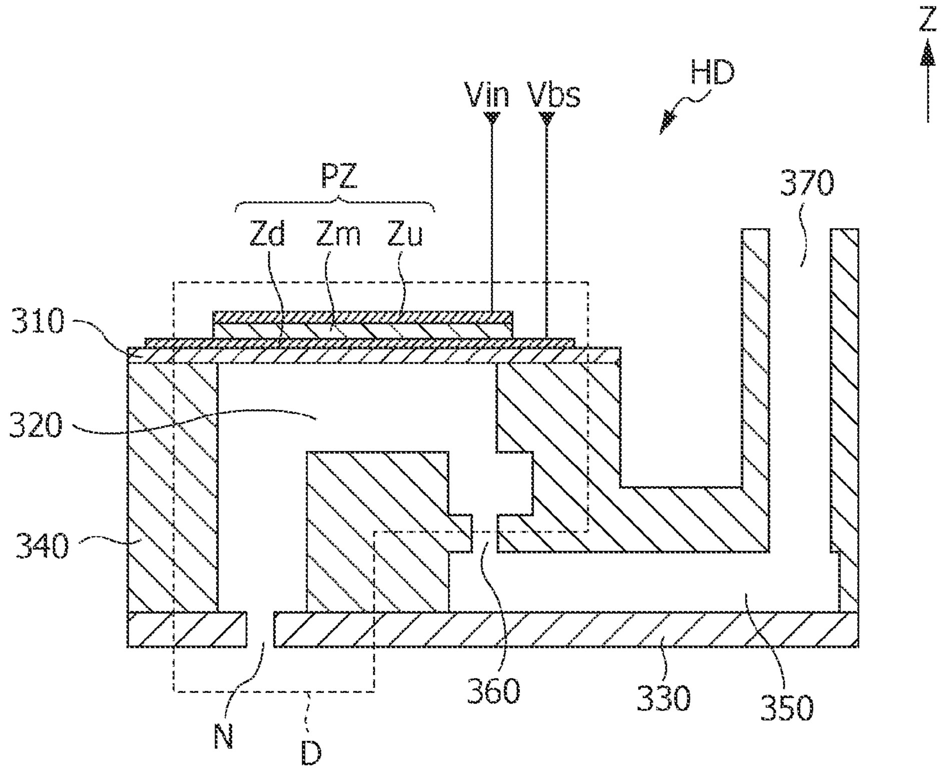
FIG. 3 is a schematic partial cross-sectional view of a recording head HD in which the recording head HD is cut so as to include a discharging portion D.

FIG. 3 is a schematic partial cross-sectional view of the recording head HD in which the recording head HD is cut so as to include the discharging portion D.

As illustrated in FIG. 3, the discharging portion D includes a piezoelectric element PZ that displaces by being supplied with the drive signal Vin having a waveform selected from a plurality of waveforms included in the drive waveform signal Com, a cavity 320 inside which pressure is increased or decreased according to the displacement of the piezoelectric element PZ, a nozzle N that communicates with the cavity 320 and is capable of discharging the ink that fills inside the cavity 320 according to the increase or decrease in the pressure inside the cavity 320 as droplets in the −Z direction, and a vibrating plate 310. The piezoelectric element PZ is an example of a “drive element”. The cavity 320 is an example of a “pressure chamber”. The cavity 320 is a space partitioned by a cavity plate 340, a nozzle plate 330 on which the nozzle N is formed, and the vibrating plate 310. The cavity 320 communicates with a reservoir 350 via an ink supply port 360. The reservoir 350 communicates with a liquid container 14 corresponding to the discharging portion D via an ink intake port 370.

In the present embodiment, a unimorph type as illustrated in FIG. 3 is used as the piezoelectric element PZ. The piezoelectric element PZ is not limited to the unimorph type, and a bimorph type, a laminated type, or the like may be used.

The piezoelectric element PZ has an upper electrode Zu, a lower electrode Zd, and a piezoelectric body Zm provided between the upper electrode Zu and the lower electrode Zd. The piezoelectric element PZ is a passive element that deforms in response to a change in potential of the drive signal Vin. When a voltage is applied between the upper electrode Zu and the lower electrode Zd by electrically coupling the lower electrode Zd to a feeder line LHb, which is set to a constant potential Vbs, and supplying the drive signal Vin to the upper electrode Zu, the piezoelectric element PZ displaces in the +Z direction or the −Z direction according to the applied voltage, and as a result of the displacement, the piezoelectric element PZ vibrates.

A vibrating plate 310 is installed on an upper surface opening portion of the cavity plate 340. The lower electrode Zd is bonded to the vibrating plate 310. Therefore, when the piezoelectric element PZ is driven by the drive signal Vin and vibrates, the vibrating plate 310 also vibrates. Thereafter, the volume of the cavity 320 changes due to the vibration of the vibrating plate 310, and the ink that fills the cavity 320 is discharged from the nozzle N. When the ink inside the cavity 320 is reduced due to the discharge of the ink, the ink is supplied from the reservoir 350.

The transport mechanism 7 transports the recording paper P in the +Y direction. Specifically, the transport mechanism 7 is provided with a transporting roller (not illustrated) whose rotation axis is parallel to the X axis direction, and a motor (not illustrated) that rotates the transporting roller under control by the control portion 6.

The movement mechanism 8 reciprocates the liquid discharging head HU along the X axis under the control of the control portion 6. As illustrated in FIG. 2, the movement mechanism 8 includes a transporting body 82 having a substantially box shape for accommodating the liquid discharging head HU, and an endless belt 81 to which the transporting body 82 is fixed.

The storage portion 5 includes a volatile memory such as RAM and a non-volatile memory such as ROM, EEPROM, or PROM, and stores various information such as print data Img supplied from the host computer and a control program of the ink jet printer 1. The RAM is an abbreviation for Random Access Memory. The ROM is an abbreviation for Read Only Memory. The EEPROM is an abbreviation for Electrically Erasable Programmable Read-Only Memory. The PROM is an abbreviation for Programmable ROM.

The control portion 6 includes a CPU. The CPU is an abbreviation for Central Processing Unit. However, the control portion 6 may include a programmable logic device such as an FPGA instead of the CPU. The FPGA is an abbreviation for Field Programmable Gate Array.

In the control portion 6, the CPU provided in the control portion 6 operates according to a control program stored in the storage portion 5, so that the ink jet printer 1 executes the printing process.

The control portion 6 generates a print signal SI for controlling the liquid discharging head HU, a waveform designation signal dCom for controlling the drive waveform signal generation circuit 2, a signal for controlling the transport mechanism 7, and a signal for controlling the movement mechanism 8.

The waveform designation signal dCom is a digital signal that defines a waveform of the drive waveform signal Com. Further, the drive waveform signal Com is an analog signal for driving the discharging portion D. The drive waveform signal generation circuit 2 includes a DA conversion circuit and generates the drive waveform signal Com having a waveform defined by the waveform designation signal dCom.

Further, the print signal SI is a digital signal for designating the type of operation of the discharging portion D. Specifically, the print signal SI designates whether or not the ink is discharged from the discharging portion D when the discharging portion D is driven by designating whether or not to supply the drive waveform signal Com with respect to the discharging portion D.

1.2. Configuration of Liquid Discharging Head HU

Hereinafter, a configuration of the liquid discharging head HU will be described with reference to FIG. 4.

Figure 4:
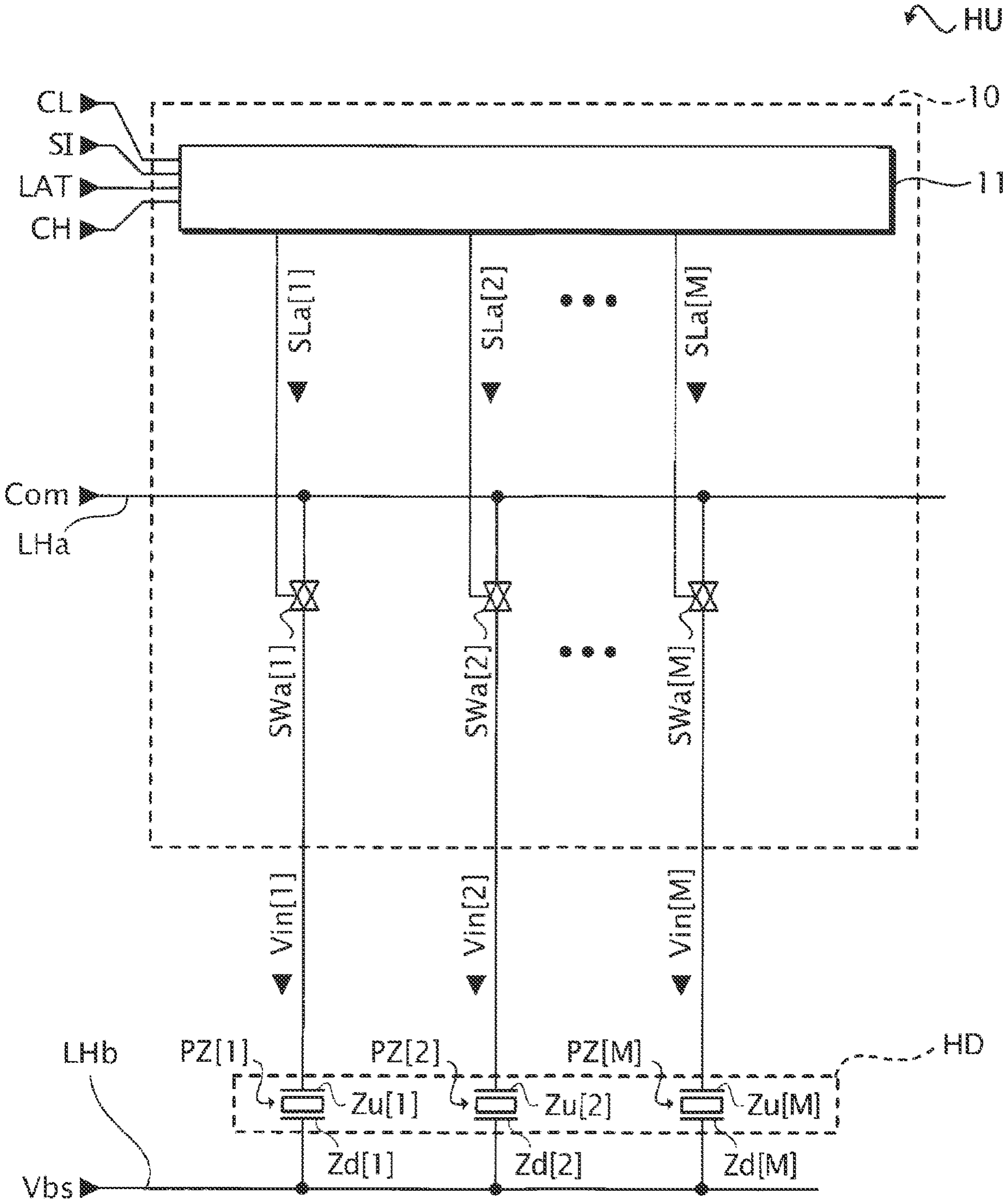
FIG. 4 is a block view illustrating an example of a configuration of a liquid discharging head HU.

FIG. 4 is a block view illustrating an example of the configuration of the liquid discharging head HU. As described above, the liquid discharging head HU includes the recording head HD and the switching circuit 10. Further, the liquid discharging head HU includes an internal wiring LHa to which the drive waveform signal Com is supplied from the drive waveform signal generation circuit 2.

As illustrated in FIG. 4, the switching circuit 10 includes switches Swa[1] to Swa[M] as M switches Swa and a coupling state designation circuit 11 for designating a coupling state of each switch. As each switch, for example, a transmission gate can be used.

The switch Swa[m] switches between conduction and non-conduction between the internal wiring Lha and the upper electrode Zu[m] of the piezoelectric element PZ[m] provided in the discharging portion D[m] according to the coupling state designation signal Sla[m]. For example, the switch Swa[m] turns on when the coupling state designation signal Sla[m] is at a high level and turns off when the coupling state designation signal Sla[m] is at a low level.

1.3. Operation of Head Unit

Hereinafter, an operation of the liquid discharging head HU will be described with reference to FIGS. 5 to 7.

In the present embodiment, an operating period of the ink jet printer 1 includes a plurality of recording periods Tu. It is assumed that the ink jet printer 1 according to the present embodiment executes the drive of each discharging portion D in the printing process in each recording period Tu. In the following description, the operating period of the ink jet printer 1 has I recording periods Tu. "I" is an integer of 2 or more. Further, the i-th recording period Tu may be referred to as a recording period Tu[i]. "i" is an integer from 1 to I.

In general, the ink jet printer 1 forms an image indicating the print data Img by repeatedly executing the printing process over a plurality of continuous or intermittent recording periods Tu to discharge the ink once or a plurality of times from each discharging portion D.

Figure 5:
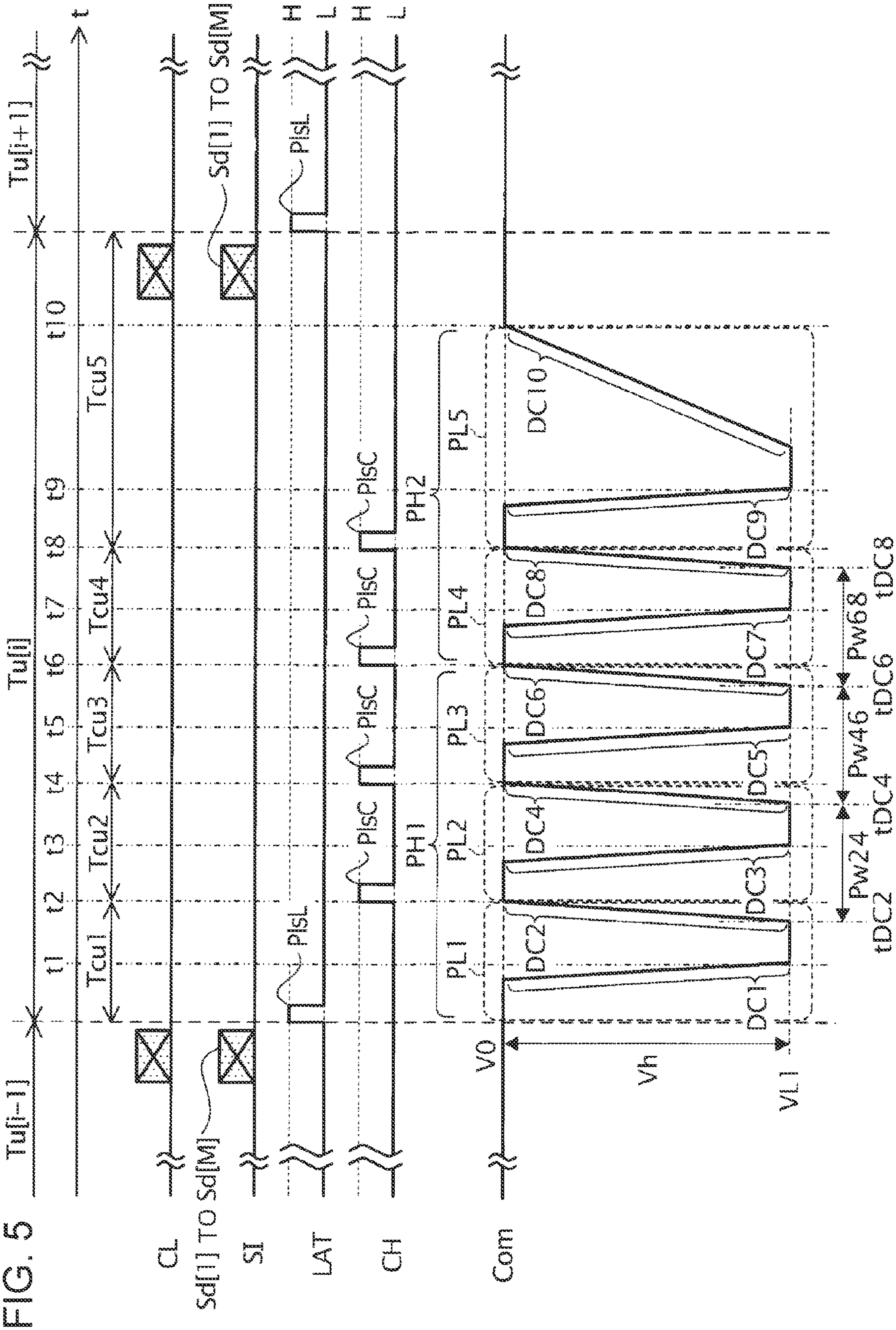
FIG. 5 is a view illustrating a timing chart for describing an operation of the ink jet printer 1 in a recording period Tu[i].

FIG. 5 is a timing chart for describing an operation of the ink jet printer 1 in the recording period Tu[i].

As illustrated in FIG. 5, the control portion 6 outputs the latch signal LAT having a pulse PlsL and the change signal CH having a pulse PlsC. As a result, the control portion 6 defines the recording period Tu[i] as a period from the rise of the pulse PlsL to the rise of the next pulse PlsL. Further, the control portion 6 divides the recording period Tu[i] into a control period Tcu1, a control period Tcu2, a control period Tcu3, a control period Tcu4, and a control period Tcu5 by the pulse PlsC.

As illustrated in FIG. 5, the drive waveform signal generation circuit 2 outputs the drive waveform signal Com. The drive waveform signal Com has a drive pulse PL1 provided in the control period Tcu1, a drive pulse PL2 provided in the control period Tcu2, a drive pulse PL3 provided in the control period Tcu3, a drive pulse PL4 provided in the control period Tcu4, and a drive pulse PL5 provided in the control period Tcu5. In the present embodiment, the drive pulse PL supplied to the piezoelectric element PZ in the control period Tcu1 to the control period Tcu3 is referred to as a waveform PH1, and the drive pulse PL supplied to the piezoelectric element PZ in the control period Tcu4 to the control period Tcu5 for discharging the droplets DR from the nozzle N is referred to as a waveform PH2. In the following description, the waveform PH1 and the waveform PH2 are sometimes collectively referred to as the "waveform PH", and the drive pulses PL1 to PL5 are sometimes collectively referred to as the "drive pulse PL".

The drive pulse PL1 has a drive component DC1 and a drive component DC2. The drive pulse PL2 has a drive component DC3 and a drive component DC4. The drive pulse PL3 has a drive component DC5 and a drive component DC6. The drive pulse PL4 has a drive component DC7 and a drive component DC8. The drive pulse PL5 has a drive component DC9 and a drive component DC10. The drive component DC1, the drive component DC3, the drive component DC5, the drive component DC7, and the drive component DC9 cause the pressure inside the cavity 320 to decrease. The drive component DC2, the drive component DC4, the drive component DC6, the drive component DC8, and the drive component DC10 cause the pressure inside the cavity 320 to increase. In the following description, the drive components DC1 to DC10 are sometimes collectively referred to as the "drive component DC".

As illustrated in FIG. 5, for any of the drive pulse PL1, the drive pulse PL2, the drive pulse PL3, the drive pulse PL4, and the drive pulse PL5, a potential at the start and a potential at the end are set to a reference potential V0. In the present embodiment, the reference potential V0 is also the highest potential of the drive pulses PL1 to PL5. The potential VL1 illustrated in FIG. 5 is the lowest potential of the drive pulses PL1 to PL5.

As illustrated in FIG. 5, a difference between the highest potential and the lowest potential in the drive pulses PL1 to PL5 is a potential difference Vh. That is, a difference between the highest potential and the lowest potential in the waveform PH1 is the potential difference Vh. Similarly, a difference between the highest potential and the lowest potential in the waveform PH2 is the potential difference Vh. In the following description, a difference between the highest potential and the lowest potential in the waveform PH is sometimes referred to as a "potential difference of the waveform PH". The potential difference of the waveform PH1 is substantially equal to the potential difference of the waveform PH2. The term "substantially equal" includes not only a case of being completely equal but also a case of being considered to be equal when the measurement error is taken into consideration. The potential difference of the waveform PH is 80% or more of the maximum potential difference capable of being supplied to the piezoelectric element PZ. Since the larger the potential difference of the waveform PH, the larger the discharging amount, the potential difference of the waveform PH is desirably closer to the maximum potential difference capable of being supplied to the piezoelectric element PZ. A designer of the ink jet printer 1 adjusts the potential difference of the waveform PH so as to approach the maximum potential difference capable of being supplied to the piezoelectric element PZ.

The print signal SI includes individual designation signals Sd[1] to Sd[M] that designate the driving aspects of the discharging portions D[1] to D[M] in each recording period Tu. Thereafter, when the printing process is executed in the recording period Tu[i], as illustrated in FIG. 5, the control portion 6 synchronizes the print signal SI including the individual designation signals Sd[1] to Sd[M] with the clock signal CL prior to the start of the recording period Tu[i] and supplies the print signal SI to the coupling state designation circuit 11. In this case, the coupling state designation circuit 11 generates a coupling state designation signal Sla[m] based on the individual designation signal Sd[m] in the recording period Tu[i].

The individual designation signal Sd[m] according to the present embodiment is a signal that designates any one of the drive modes among the five drive modes shown below from the drive mode $\alpha$1 to the drive mode $\alpha$5 in each recording period Tu. In the present embodiment, as an example, it is assumed that the individual designation signal Sd[m] is a 5-bit digital signal.

FIG. 6 is a view for describing the five drive modes in which the individual designation signal Sd[m] can be obtained. The individual designation signal Sd[m] indicates any one of values among a value indicating the drive mode α1 (1,1,1,1,1), a value indicating the drive mode α2 (0,0,0, 1,1), a value indicating the drive mode α3 (0,0,1,1,1), a value indicating the drive mode α4 (0,1,1,1,1), and a value indicating the drive mode α5 (0,0,0,0,0). The coupling state designation circuit 11 sets the coupling state designation signal Sla[m] to a high level in the control period Tcux when the x-th bit of the individual designation signal Sd[m] is "1", and sets the coupling state designation signal Sla[m] to a low level in the control period Tcux when the x-th bit is "0". "x" is an integer from 1 to 5.

Specifically, when the individual designation signal Sd[m] indicates the drive mode α1, the coupling state designation circuit 11 sets the coupling state designation signal Sla[m] to a high level in the control period Tcu1, the control period Tcu2, the control period Tcu3, the control period Tcu4, and the control period Tcu5. When the individual designation signal Sd[m] indicates the drive mode α2, the coupling state designation circuit 11 sets the coupling state designation signal Sla[m] to a low level in the control period Tcu1, the control period Tcu2, and the control period Tcu3, and sets the coupling state designation signal Sla[m] to a high level in the control period Tcu4 and the control period Tcu5. When the individual designation signal Sd[m] indicates the drive mode α3, the coupling state designation circuit 11 sets the coupling state designation signal Sla[m] to a low level in the control period Tcu1 and the control period Tcu2, and sets the coupling state designation signal Sla[m] to a high level in the control period Tcu3, the control period Tcu4, and the control period Tcu5. When the individual designation signal Sd[m] indicates the drive mode α4, the coupling state designation circuit 11 sets the coupling state designation signal Sla[m] to a low level in the control period Tcu1, and sets the coupling state designation signal Sla[m] to a high level in the control period Tcu2, the control period Tcu3, the control period Tcu4, and the control period Tcu5. When the individual designation signal Sd[m] indicates the drive mode α5, the coupling state designation circuit 11 sets the coupling state designation signal Sla[m] to a low level in the control period Tcu1, the control period Tcu2, the control period Tcu3, the control period Tcu4, and the control period Tcu5. As an example of the drive signal Vin, the drive signal Vin based on the individual designation signal Sd[m] of the drive mode α2 is illustrated with reference to FIG. 7.

In the present embodiment, which will be described in detail later, in a stationary state of the discharging portion D to which the reference potential V0 is supplied to the piezoelectric element PZ and a state in which a position of the meniscus MS is stationary at an initial position Z0, when the drive signal Vin based on the individual designation signal Sd[m] of the drive mode α1 is supplied to the piezoelectric element PZ, the droplets DR are discharged from the nozzle N in the control period Tcu4 to the control period Tcu5.

Figure 7:
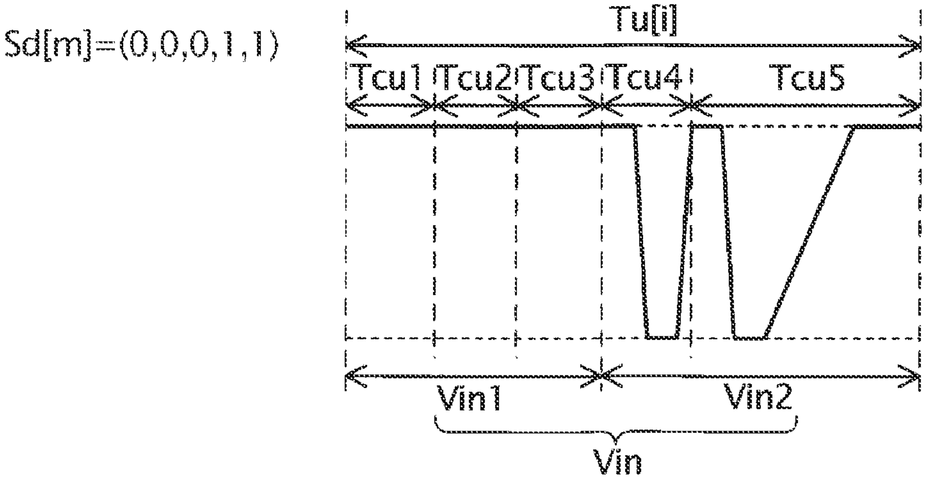
FIG. 7 is a view for describing a drive signal Vin based on the individual designation signal Sd[m] of the drive mode α2.

FIG. 7 is a view for describing the drive signal Vin based on the individual designation signal Sd[m] of the drive mode α2. The drive signal Vin includes a drive signal Vin1 and a drive signal Vin2. The drive signal Vin1 is the drive signal Vin from the start of the control period Tcu1 to the end of the control period Tcu3. The drive signal Vin2 is the drive signal Vin from the start of the control period Tcu4 to the end of the control period Tcu5. As illustrated in FIG. 7, the drive signal Vin1 included in the drive signal Vin based on the individual designation signal Sd[m] of the drive mode α2 does not drive the discharging portion D from the start of the control period Tcu1 to the end of the control period Tcu3. The drive signal Vin2 included in the drive signal Vin based on the individual designation signal Sd[m] of the drive mode α2 drives the discharging portion D from the start of the control period Tcu4 to the end of the control period Tcu5. In other words, the drive signal Vin based on the individual designation signal Sd[m] of the drive mode α2 does not have the waveform PH1 but has the waveform PH2.

The drive signal Vin1 is an example of a "first drive signal". The drive signal Vin2 is an example of a "second drive signal".

1.4. Relationship Between Drive Signal Vin and Liquid Surface of Discharging Portion D Next, due to the high viscosity of the ink, the following examples will be described with reference to FIGS. 8 to 17. In the stationary state of the discharging portion D to which the reference potential V0 is supplied to the piezoelectric element PZ and the state in which the position of the meniscus MS is stationary at the initial position Z0, when the drive signal Vin based on the individual designation signal Sd[m] of the drive mode α2 to the drive mode α5 is supplied to the piezoelectric element PZ, the droplet DR is not discharged from the nozzle N, and when the drive signal Vin based on the individual designation signal Sd[m] of the drive mode α1 is supplied to the piezoelectric element PZ, the droplet DR is discharged from the nozzle N. A state of the liquid surface of the discharging portion D at each of the time point t1, the time point t2, the time point t3, the time point t4, the time point t5, the time point t6, the time point t7, the time point t8, the time point t9, and the time point t10 illustrated in FIG. 5 will be described. FIGS. 8 to 17 illustrate cross-sectional views when the vicinity of the nozzle N is cut along the XZ plane at time points t1 to t10. The liquid surface inside the discharging portion D indicates the liquid surface inside the nozzle N. The liquid surface inside the nozzle N is a liquid surface positioned inside a wall surface of the nozzle N when the discharging portion D is viewed along the −Z direction. Therefore, in a case where the discharging portion D is viewed in a direction perpendicular to the −Z direction, for example, along the Y axis direction, when a liquid surface is positioned inside the wall surface of the nozzle N when the discharging portion D is viewed along the −Z direction, a liquid surface positioned outside the wall surface of the nozzle N, that is, a liquid surface protruding from the nozzle N in the −Z direction is also included in the liquid surface inside the nozzle N. Hereinafter, the liquid surface inside the nozzle N is referred to as the "meniscus MS".

Figure 8:
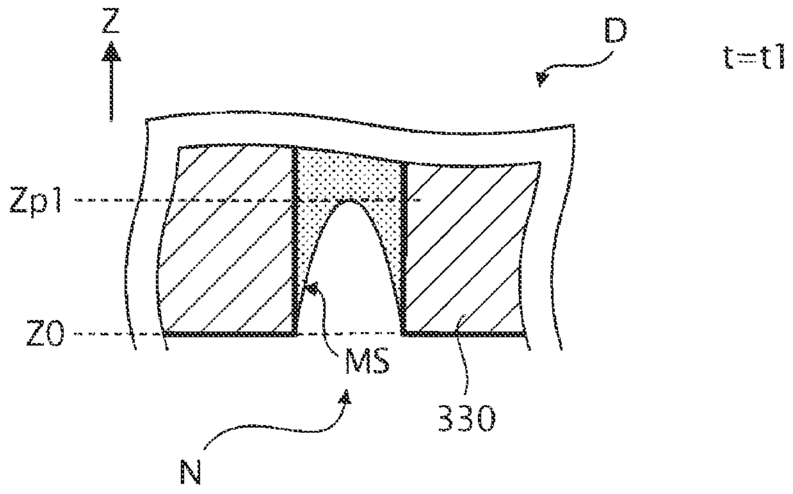
FIG. 8 is a view describing a meniscus MS at time point t1.

In a first embodiment, in the stationary state of the discharging portion D to which the reference potential V0 is supplied to the piezoelectric element PZ and a state in which the position of the meniscus MS is in the stationary state at the initial position Z0 illustrated in FIG. 8 or the like, even when the drive signal Vin having only one drive pulse PL is supplied to the piezoelectric element PZ, the viscosity of the liquid is high and the pressure fluctuation of the ink inside the cavity 320 cannot be increased, and thus the discharging portion D does not discharge the droplet DR. The initial position Z0 is a state in which the position of the meniscus MS substantially coincides with the surface of the nozzle plate 330 in the −Z direction in the Z axis direction. In practice, since the ink inside the discharging portion D is in an appropriate negative pressure state so that the ink does not drip from the nozzle N, the center of the meniscus MS has a recessed curve surface shape dented toward the cavity 320 side. In the first embodiment, the discharging portion D discharges the droplets by supplying the drive signal Vin having the drive pulses PL1, PL2, PL3, PL4, and PL5 to the piezoelectric element PZ. The discharging portion D discharges the droplets even when the drive signal Vin having the drive pulses PL1, PL2, PL3, and PL4 but not having the drive pulse PL5 is supplied to the piezoelectric element PZ. A more stable discharge can be realized by supplying the drive signal Vin having the drive pulses PL1, PL2, PL3, PL4, and PL5 to the piezoelectric element PZ as compared with the mode in which the drive signal Vin having the drive pulses PL1, PL2, PL3, and PL4 but not having the drive pulse PL5 is supplied to the piezoelectric element PZ.

FIG. 8 is a view describing the meniscus MS at the time point t1. The time point t1 is within the control period Tcu1 and is a time point at which the supply of the drive component DC1 is ended. By supplying the drive signal Vin having the drive component DC1 to the piezoelectric element PZ by the switching circuit 10, the center part of the meniscus MS pulls the meniscus MS, which has a recessed curve surface shape dented toward the cavity 320 side, that is, toward the +Z direction side, in the +Z direction while stretching the recessed curve surface shape in the Z axis direction. At this time, the most pulled-in part of the meniscus MS in the +Z direction is pulled to a pull-in position Zp1. The most pulled-in part of the meniscus MS in the +Z direction is a center part of the meniscus MS in a plan view in the Z axis direction and corresponds to a bottom part of the recessed curve surface shape. In a plan view in the Z axis direction, the center part of the meniscus MS substantially coincides with a center part of the nozzle N. Hereinafter, for the sake of brevity, the center part of the meniscus MS in a plan view in the Z axis direction is simply referred to as a "center part of the meniscus MS". Further, the periphery of the center part of the meniscus MS is simply referred to as a "peripheral part of the meniscus MS". The pull-in position Zp1 is positioned in the +Z direction with respect to the initial position Z0.

Figure 9:
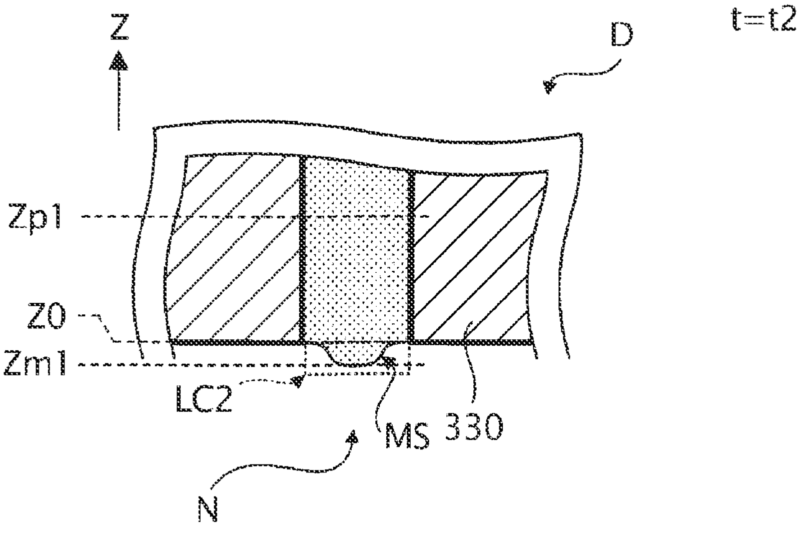
FIG. 9 is a view describing a meniscus MS at time point t2.

FIG. 9 is a view describing the meniscus MS at the time point t2. The time point t2 is at an end time point of the control period Tcu1 and is a time point at which the supply of the drive component DC2 is ended. By supplying the drive signal Vin having the drive component DC2 to the piezoelectric element PZ by the switching circuit 10, the meniscus MS is pushed in the −Z direction, and a liquid column LC2 protruding in the −Z direction is formed in the center part of the meniscus MS. In the following description, the liquid column is defined as a protruding columnar or pyramidal liquid surface positioned from a position on the most +Z direction side to a position on the most −Z direction side in the meniscus MS. A front end of the liquid column LC2 in the −Z direction is positioned at a push-out position Zm1. The push-out position Zm1 is positioned in the −Z direction with respect to the initial position Z0.

Figure 10:
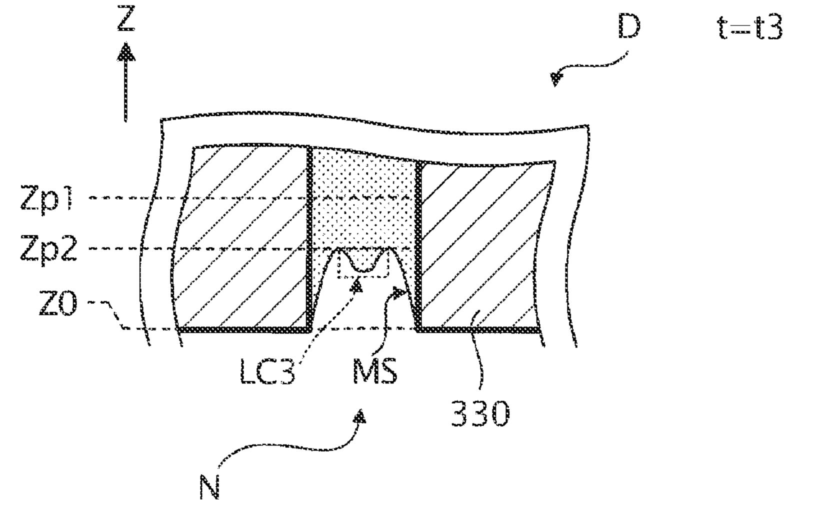
FIG. 10 is a view describing a meniscus MS at time point t3.

FIG. 10 is a view describing the meniscus MS at the time point t3. The time point t3 is within the control period Tcu2 and is a time point at which the supply of the drive component DC3 is ended. By supplying the drive signal Vin having the drive component DC3 to the piezoelectric element PZ by the switching circuit 10, the meniscus MS is pulled in the +Z direction in which the peripheral part of the meniscus MS has a recessed shape dented toward the +Z direction while the center part of the meniscus MS has a liquid column LC3 protruding in the −Z direction. At this time, the most pulled-in part of the meniscus MS in the +Z direction is pulled to a pull-in position Zp2. The pull-in position Zp2 at the time point t3 is positioned in the +Z direction with respect to the initial position Z0 and is positioned in the −Z direction with respect to the pull-in position Zp1 at the time point t1. That is, by supplying the drive component DC3 to the piezoelectric element PZ, despite the fact that the pressure of the ink inside the cavity 320 is decreased and the ink inside the nozzle N is pulled in the +Z direction, as illustrated in FIG. 10, at time point t3, the liquid column LC3 protruding in the −Z direction is formed in the center part of the meniscus MS. The liquid column LC3 is formed in the center part of the meniscus MS. When viewed in the −Z direction from the pull-in position Zp2, it can be said that a projection shape is formed in the center part of the meniscus MS. The liquid surface around the liquid column LC3 is recessed in the +Z direction.

Figure 11:
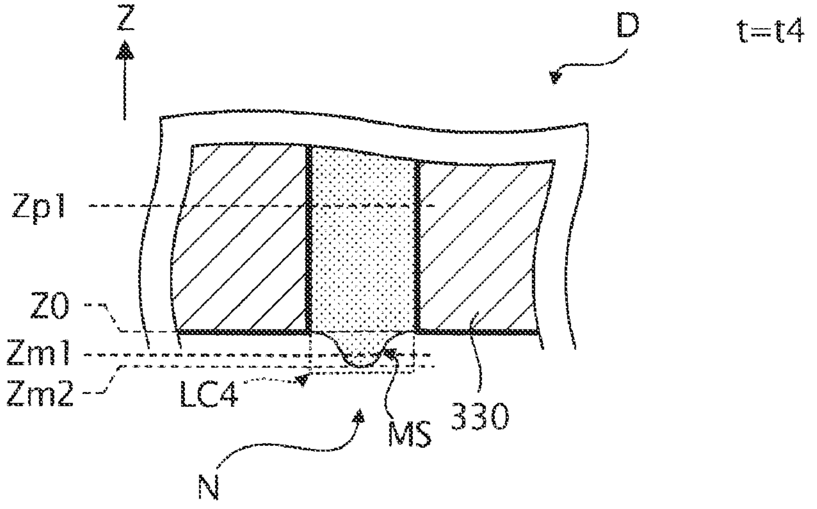
FIG. 11 is a view describing a meniscus MS at time point t4.

FIG. 11 is a view describing the meniscus MS at the time point t4. The time point t4 is at an end time point of the control period Tcu2 and is a time point at which the supply of the drive component DC4 is ended. By supplying the drive signal Vin having the drive component DC4 to the piezoelectric element PZ by the switching circuit 10, the meniscus MS is pushed in the −Z direction, and a liquid column LC4 protruding in the −Z direction is formed in the center part of the meniscus MS. A front end of the liquid column LC4 in the −Z direction is positioned at a push-out position Zm2. The push-out position Zm2 at the time point t4 is positioned in the −Z direction with respect to the push-out position Zm1 at the time point t2.

Figure 12:
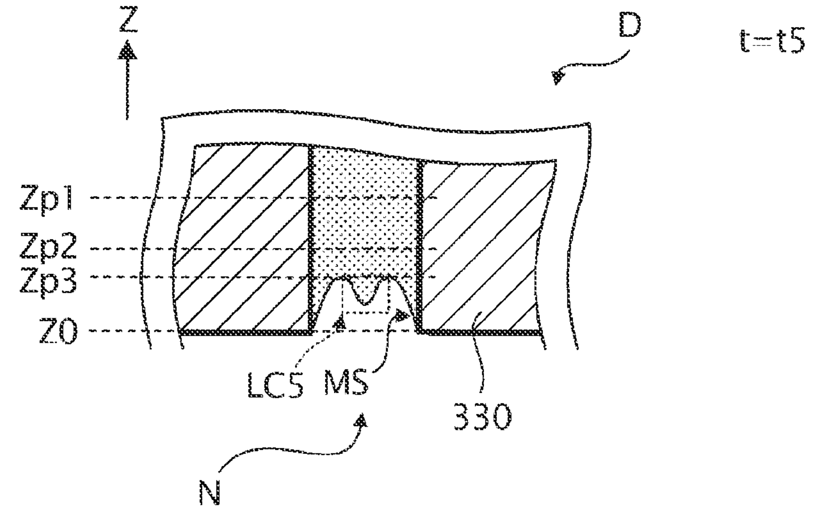
FIG. 12 is a view describing a meniscus MS at time point t5.

FIG. 12 is a view describing the meniscus MS at the time point t5. The time point t5 is within the control period Tcu3 and is a time point at which the supply of the drive component DC5 is ended. By supplying the drive signal Vin having the drive component DC5 to the piezoelectric element PZ by the switching circuit 10, the meniscus MS is pulled in the +Z direction in which the peripheral part of the meniscus MS has a recessed shape dented toward the +Z direction while the center part of the meniscus MS has a liquid column LC5 protruding in the −Z direction. At this time, the most +Z direction part of the meniscus MS is pulled in toward the pull-in position Zp3. The pull-in position Zp3 at the time point t5 is positioned in the +Z direction with respect to the initial position Z0 and is positioned in the −Z direction with respect to the pull-in position Zp2 at the time point t3. That is, by supplying the drive component DC5 to the piezoelectric element PZ, despite the fact that the pressure of the ink inside the cavity 320 is decreased and the ink inside the nozzle N is pulled in the +Z direction, as illustrated in FIG. 12, at time point t5, the liquid column LC5 protruding in the −Z direction is formed in the center part of the meniscus MS. The liquid column LC5 at the time point t5 is larger than the liquid column LC3 at the time point t3. The liquid column LC5 is formed in the center part of the meniscus MS. When viewed in the −Z direction from the pull-in position Zp3, it can be said that a projection shape is formed in the center part of the meniscus MS. The liquid surface around the liquid column LC5 is recessed in the +Z direction.

Figure 13:
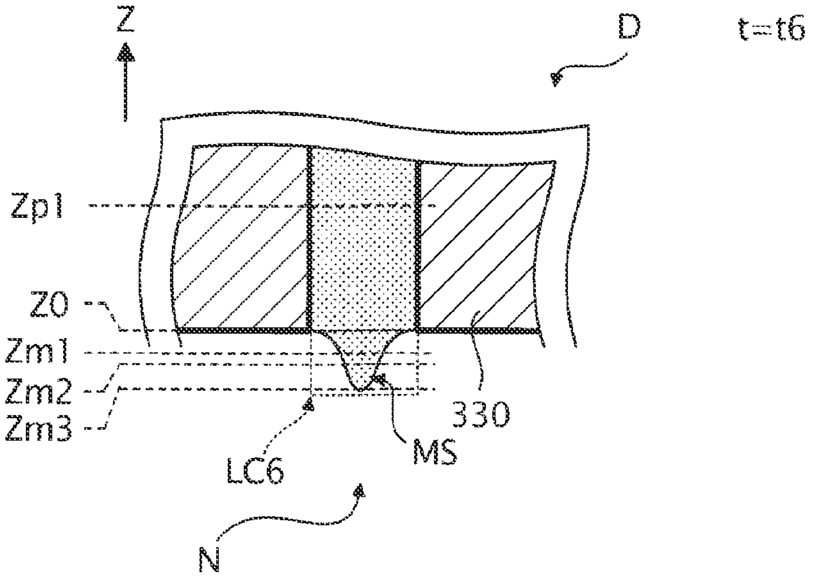
FIG. 13 is a view describing a meniscus MS at time point t6.

FIG. 13 is a view describing the meniscus MS at the time point t6. The time point t6 is at an end time point of the control period Tcu3 and is a time point at which the supply of the drive component DC6 is ended. By supplying the drive signal Vin having the drive component DC6 to the piezoelectric element PZ by the switching circuit 10, the meniscus MS is pushed in the −Z direction, and a liquid column LC6 protruding in the −Z direction is formed. A front end of the liquid column LC6 in the −Z direction is positioned at a push-out position Zm3. The push-out position Zm3 at the time point t6 is positioned in the −Z direction with respect to the push-out position Zm2 at the time point t4.

Figure 14:
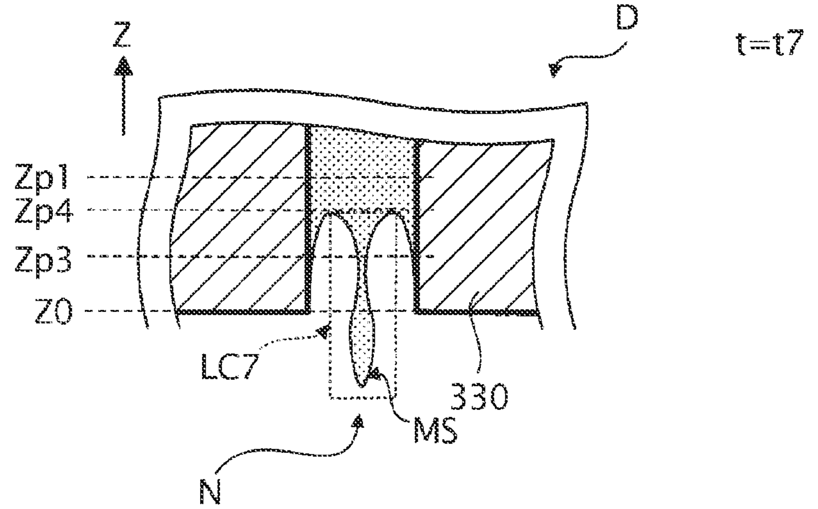
FIG. 14 is a view describing a meniscus MS at time point t7.

FIG. 14 is a view describing the meniscus MS at the time point t7. The time point t7 is within the control period Tcu4 and is a time point at which the supply of the drive component DC7 is ended. By supplying the drive signal Vin having the drive component DC7 to the piezoelectric element PZ by the switching circuit 10, the meniscus MS is pulled in the +Z direction in which the peripheral part of the meniscus MS has a recessed shape dented toward the +Z direction while the center part of the meniscus MS has a liquid column LC7 protruding in the −Z direction. At this time, the most pulled-in part of the meniscus MS in the +Z direction is pulled to a pull-in position Zp4. The pull-in position Zp4 at the time point t7 is positioned in the +Z direction with respect to the pull-in position Zp3 at the time point t5 and is positioned in the −Z direction with respect to the pull-in position Zp1 at the time point t1. That is, by supplying the drive component DC7 to the piezoelectric element PZ, despite the fact that the pressure of the ink inside the cavity 320 is decreased and the ink inside the nozzle N is pulled in the +Z direction, as illustrated in FIG. 14, at time point t7, the liquid column LC7 protruding in the −Z direction is formed in the center part of the meniscus MS. The liquid column LC7 at the time point t7 is larger than the liquid column LC5 at the time point t5.

FIG. 14 illustrates the meniscus MS at the time point t7 when the drive signal Vin having the drive pulses PL1, PL2, PL3, PL4, and PL5 is supplied to the piezoelectric element PZ. That is, the state of the meniscus MS illustrated in FIG. 14 is a case where the drive pulses PL1 to PL3 are supplied to the piezoelectric element PZ before the drive pulse PL4 is supplied to the piezoelectric element PZ. When the drive signal Vin having only the drive pulse PL4 is supplied to the piezoelectric element PZ, since the drive pulse PL4 is supplied to the piezoelectric element PZ in the stationary state of the discharging portion D to which the reference potential V0 is supplied to the piezoelectric element PZ and the state in which the position of the meniscus MS is stationary at the initial position Z0, the meniscus MS at the time point t7 becomes equivalent to the meniscus MS at the time point t1 illustrated in FIG. 8. That is, when the drive signal Vin having only the drive pulse PL4 is supplied to the piezoelectric element PZ, the meniscus MS has a recessed curve surface shape dented toward the +Z direction side in the center part thereof, and the position of the most pulled-in part of the meniscus MS in the +Z direction is the pull-in position Zp1.

Figure 15:
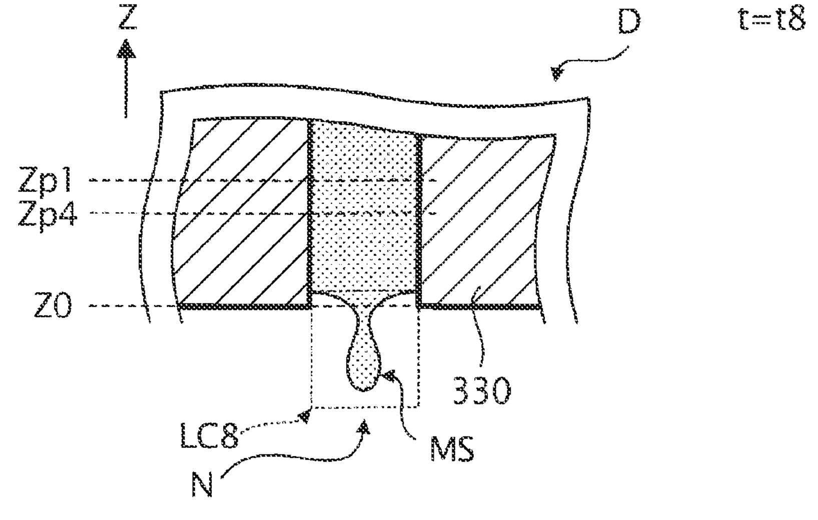
FIG. 15 is a view describing a meniscus MS at time point t8.

FIG. 15 is a view describing the meniscus MS at the time point t8. The time point t8 is at an end time point of the control period Tcu4 and is a time point at which the supply of the drive component DC8 is ended. By supplying the drive signal Vin having the drive component DC8 to the piezoelectric element PZ by the switching circuit 10, the meniscus MS is pushed in the −Z direction, and a liquid column LC8 protruding in the −Z direction is formed in the center part of the meniscus MS. The length of the liquid column LC8 at the time point t8 in the Z axis direction is shorter than that of the liquid column LC7 at the time point t7. Regarding the liquid column LC8, the front end of the liquid column LC8 in the −Z direction has a spherical shape, and a constriction is formed in the middle of the liquid column LC8.

Figure 16:
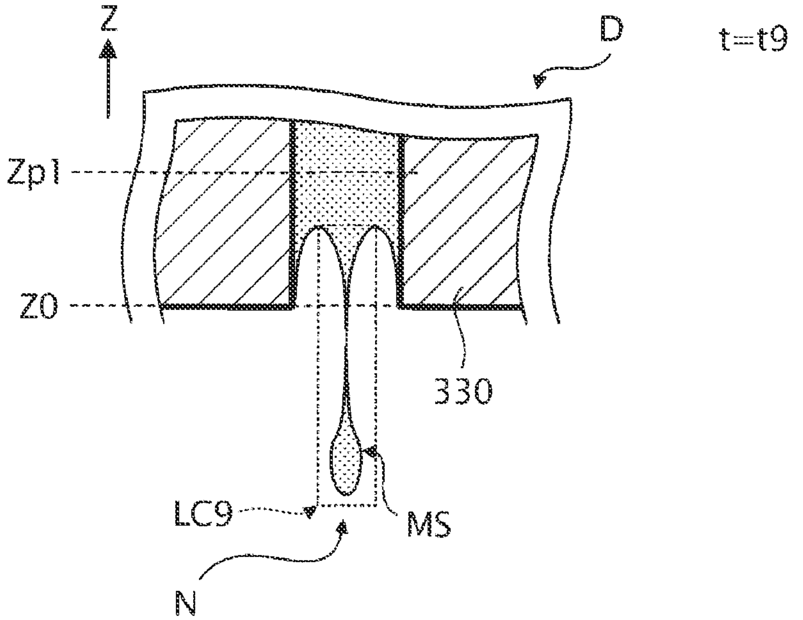
FIG. 16 is a view describing a meniscus MS at time point t9.

FIG. 16 is a view describing the meniscus MS at the time point t9. The time point t9 is within the control period Tcu5 and is a time point at which the supply of the drive component DC9 is ended. By supplying the drive signal Vin having the drive component DC9 to the piezoelectric element PZ by the switching circuit 10, the meniscus MS is pulled in the +Z direction in which the peripheral part of the meniscus MS has a recessed shape dented toward the +Z direction while the center part of the meniscus MS has a liquid column LC9 protruding in the −Z direction. At this time, the most pulled-in part of the meniscus MS in the +Z direction is pulled more in the +Z direction than the initial position Z0. On the other hand, by supplying the drive component DC9 to the piezoelectric element PZ, despite the fact that the pressure of the ink inside the cavity 320 is decreased and the ink inside the nozzle N is pulled in the +Z direction, the front end of the liquid column LC8 of the meniscus MS formed at the time point t8 continues to move in the −Z direction, and the liquid column LC9 is formed in the center part of the meniscus MS. When the constricted part of the liquid column LC9 becomes thin and long, the front end part of the liquid column LC9 in the −Z direction is separated from the meniscus MS and flies in the −Z direction as the droplet DR. By supplying the drive signal Vin having the drive component DC9 to the piezoelectric element PZ while the front end of the liquid column LC8, which is formed at the time point t8, continues to move in the −Z direction, the pressure of the ink inside the cavity 320 is decreased, the ink inside the nozzle N is pulled in the +Z direction, and the peripheral part of the meniscus MS moves in the +Z direction, thereby the droplet DR is torn off from the liquid column LC9. FIG. 16 illustrates a state immediately before the droplet DR is separated from the meniscus MS.

Figure 17:
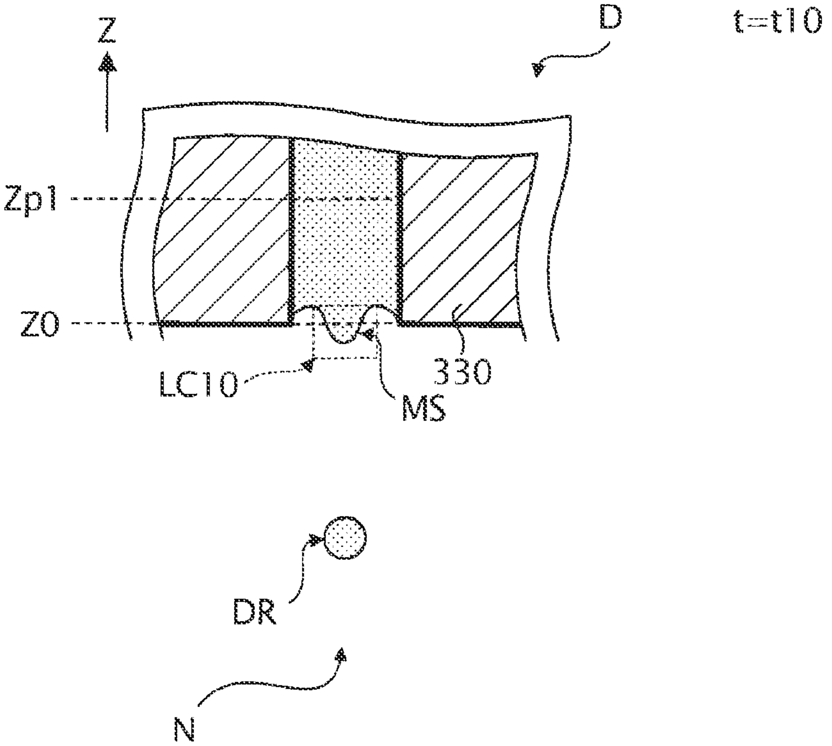
FIG. 17 is a view describing a meniscus MS at time point t10.

FIG. 17 is a view describing the meniscus MS at the time point t10. The time point t10 is within the control period Tcu5 and is a time point at which the supply of the drive component DC10 is ended. By supplying the drive signal Vin having the drive component DC10 to the piezoelectric element PZ by the switching circuit 10, the meniscus MS approaches the initial position Z0. As illustrated in FIG. 17, the liquid column LC10 protruding in the −Z direction is formed in the center part of the meniscus MS. However, the meniscus MS is vibrating, and after the time point t10, the center part of the meniscus MS is pulled in the +Z direction. In FIG. 17, the droplet DR separated immediately after the time point t9 is displayed.

By supplying the drive component DC10 to the piezoelectric element PZ, the position of the meniscus MS is returned to the initial position Z0 without further discharging the droplet DR continuously from the discharging portion D, the change amount of the potential per unit period in the drive component DC10 is smaller as compared with that in the drive components DC2, DC4, DC6, and DC8. Further, in the first embodiment, the change amount of the potential per unit period in the drive component DC10 may be constant while the drive component DC10 is being supplied but may change while the drive component DC10 is being supplied. The change amount of the potential per unit period in the drive components DC1, DC3, DC5, DC7, and DC9 are substantially equal. The change amount of the potential per unit period in the drive components DC2, DC4, DC6, and DC8 are substantially equal.

As illustrated in FIGS. 8 to 17, in a case where the drive signal Vin based on the individual designation signal Sd[m] that designates the drive mode α1 is supplied to the piezoelectric element PZ, when the drive component DC1 of the first drive pulse PL1 is supplied to the piezoelectric element PZ, the meniscus MS is pulled in the most +Z direction, and thereafter each time the drive pulse PL2 and the drive pulse PL3 are supplied to the piezoelectric element PZ, the meniscus MS is pushed out in the −Z direction, and thus the liquid column formed in the center part of the meniscus MS also grows along the Z axis direction. Further, when the drive pulse PL4 is supplied to the piezoelectric element PZ, the liquid column grows longer and thinner in the Z axis direction, and a part of the liquid column LC9 flies in the −Z direction as the droplet DR. When the drive signal Vin based on the individual designation signal Sd[m] that designates the drive mode α5 is supplied to the piezoelectric element PZ, the droplet DR does not fly. An example of supplying the drive signal Vin based on the individual designation signal Sd[m] that designates any of the drive mode α2, the drive mode α3, and the drive mode α4, to the piezoelectric element PZ will be described later with reference to FIGS. 21 to 25.

1.5. Pressure Fluctuation Caused by Drive Signal Vin

Figure 18:
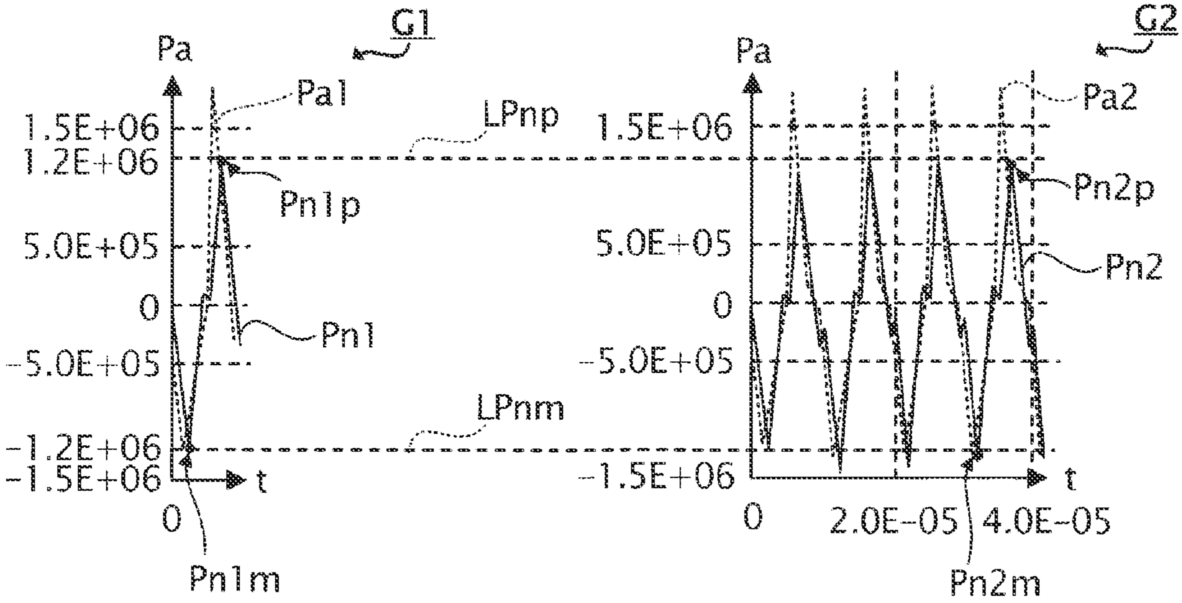
FIG. 18 is a view for describing a pressure fluctuation characteristic caused by the drive signal Vin.

In FIGS. 8 to 17, the description has been made focusing on the movement of the meniscus MS when the drive pulse PL1 to the drive pulse PL5 are sequentially supplied to the piezoelectric element PZ. Next, the fluctuation in pressure of the cavity 320 caused by the drive signal Vin will be described with reference to FIG. 18. Graphs G1 and G2 illustrated in FIG. 18 show fluctuations in pressure inside the cavity 320 obtained by using a fluid analysis simulation. The horizontal axis of the graph G1 and the horizontal axis of the graph G2 indicate time, and the vertical axis of the graph G1 and the vertical axis of the graph G2 indicate pressure. The pressure of the cavity 320, which is in the stationary state, of the discharging portion D to which the reference potential V0 is supplied to the piezoelectric element PZ is set to zero on the vertical axis of the graph G1 and the vertical axis of the graph G2. The unit of pressure is Pascal and is represented as “Pa” in the graphs G1 and G2. When the pressure is a positive value, it indicates that the volume of the cavity 320 is being reduced and the pressure inside the cavity 320 is being increased, and when the pressure is a negative value, it indicates that the volume of the cavity 320 is being expanded and the pressure inside the cavity 320 is being decreased. “E+0i” in the graphs G1 and G2 indicates $10^{+i}$. “i” is 5 or 6.

FIG. 18 is a view for describing a pressure fluctuation characteristic caused by the drive signal Vin. The graph G1 shows a pressure fluctuation characteristic Pa1 indicating behavior of the pressure fluctuation applied to the ink inside the cavity 320 by the piezoelectric element PZ, and a pressure fluctuation characteristic Pn1 indicating behavior of the pressure fluctuation applied to the ink inside the nozzle N by the piezoelectric element PZ when the drive signal Vin having the drive pulse PL4 but not having the drive pulses PL1, PL2, PL3, and PL5 is supplied to the piezoelectric element PZ. That is, the graph G1 shows the pressure fluctuation characteristic Pa1 of the ink inside the cavity 320 and the pressure fluctuation characteristic Pn1 of the ink inside the nozzle N when the drive signal Vin having only the waveform PH2 but not having the waveform PH1 is supplied to the piezoelectric element PZ. A point Pn1*p* in the pressure fluctuation characteristic Pn1 indicates the highest pressure of the pressure that can be applied to the ink inside the nozzle N and a time point when this pressure is generated in a case where only the drive pulse PL4 is supplied to the piezoelectric element PZ. The pressure indicated by the point Pn1*p* is substantially $1.2\times10^{06}$ Pascal. Further, the pressure indicated by the point Pn1*p* corresponds to an increment amount that is a fluctuation amount of the pressure of the ink inside the nozzle N when only the drive pulse PL4 is supplied to the piezoelectric element PZ, and that is the fluctuation amount from the pressure of the ink inside the nozzle N where the discharging portion D is in the stationary state to a positive pressure side. A point Pn1*m* in the pressure fluctuation characteristic Pn1 indicates the lowest pressure of the pressure that can be applied to the ink inside the nozzle N and a time point when this pressure is generated. The pressure indicated by the point Pn1*m* is substantially $-1.2\times10^{06}$ Pascal. Further, the pressure indicated by the point Pn1*m* corresponds to a decrement amount that is a fluctuation amount of the pressure of the ink inside the nozzle N when only the drive pulse PL4 is supplied to the piezoelectric element PZ, and that is the fluctuation amount from the pressure of the ink inside the nozzle N where the discharging portion D is in the stationary state to a negative pressure side.

The graph G2 shows a pressure fluctuation characteristic Pa2 indicating behavior of the pressure fluctuation applied to the ink inside the cavity 320 by the piezoelectric element PZ, and a pressure fluctuation characteristic Pn2 indicating behavior of the pressure fluctuation applied to the ink inside the nozzle N by the piezoelectric element PZ when the drive signal Vin having the drive pulses PL1, PL2, PL3, and PL4 is supplied to the piezoelectric element PZ. That is, the graph G2 shows the pressure fluctuation characteristic Pa2 of the ink inside the cavity 320 and the pressure fluctuation characteristic Pn2 of the ink inside the nozzle N when the drive signal Vin having both the waveform PH1 and the waveform PH2 is supplied to the piezoelectric element PZ. The point Pn2*p* in the pressure fluctuation characteristic Pn2 indicates the highest pressure of the pressure that can be applied to the ink inside the nozzle N and a time point when this pressure is generated while the drive pulse PL4 is being supplied to the piezoelectric element PZ in the period that the drive signal Vin having the drive pulses PL1, PL2, PL3, and PL4 is being supplied to the piezoelectric element PZ. The pressure indicated by the point Pn2*p* is substantially $1.2\times10^{06}$ Pascal. Further, the pressure indicated by the point Pn2*p* corresponds to an increment amount that is a fluctuation amount of the pressure of the ink inside the nozzle N when the drive pulse PL4 is supplied to the piezoelectric element PZ while the drive signal Vin having the drive pulses PL1, PL2, PL3, and PL4 is being supplied to the piezoelectric element PZ, and that is the fluctuation amount from the pressure of the ink inside the nozzle N where the discharging portion D is in the stationary state to the positive pressure side.

The point Pn2*m* in the pressure fluctuation characteristic Pn2 indicates the lowest pressure of the pressure that can be applied to the ink inside the nozzle N and a time point when this pressure is generated while the drive pulse PL4 is being supplied to the piezoelectric element PZ in the period that the drive signal Vin having the drive pulses PL1, PL2, PL3, and PL4 is being supplied to the piezoelectric element PZ. The pressure indicated by the point Pn2*m* is substantially $-1.2\times10^{06}$ Pascal. Further, the pressure indicated by the point Pn2*m* corresponds to a decrement amount that is a fluctuation amount of the pressure of the ink inside the nozzle N when the drive pulse PL4 is supplied to the piezoelectric element PZ while the drive signal Vin having the drive pulses PL1, PL2, PL3, and PL4 is being supplied to the piezoelectric element PZ, that is the fluctuation amount from the pressure of the ink inside the nozzle N where the discharging portion D is in the stationary state to the negative pressure side.

The time point indicated by the point Pn1$m$ and the time point indicated by the point Pn2$m$ coincide with the time point at which the supply of the drive component DC7 is ended. Further, the time point indicated by the point Pn1$p$ and the time point indicated by the point Pn2$p$ coincide with the time point at which the supply of the drive component DC8 is ended.

As shown in the graph G1 in FIG. 18, the fluctuation amount of the pressure inside the nozzle N on the positive pressure side and the negative pressure side when the drive signal Vin having only the drive pulse PL4 is supplied to the piezoelectric element PZ is substantially equal to the fluctuation amount of the ink pressure inside the nozzle N on the positive pressure side and the negative pressure side when the drive signal Vin having the drive pulses PL1, PL2, PL3, and PL4 is supplied to the piezoelectric element PZ. The fluctuation amount of the pressure is a general term for the increment amount of the pressure and the decrement amount of the pressure. Specifically, the pressure indicated by the point Pn1$p$ is substantially equal to the pressure indicated by the point Pn2$p$, as indicated by a line segment LPnp indicating substantially $1.2\times10^{06}$ Pascal. Further, the pressure indicated by the point Pn1$m$ is substantially equal to the pressure indicated by the point Pn2$m$, as indicated by a line segment LPnm indicating substantially $-1.2\times10^{06}$ Pascal.

Normally, when the ink with a viscosity of less than 20 millipascal seconds is used, by setting intervals between a plurality of drive pulses as resonance timing, the pressure fluctuation caused by the rear side drive pulse resonates with the pressure fluctuation caused by the preceding drive pulse and becomes larger, and along with this, the fluctuation amount of the pressure of the liquid inside the nozzle at the time of supplying the rear side drive pulse to the piezoelectric element is larger than the fluctuation amount of the pressure of the liquid inside the nozzle at the time of supplying the preceding drive pulse to the piezoelectric element. However, in the present embodiment, the fluctuation amount of the pressure of the liquid inside the nozzle at the time of supplying only the drive pulse PL4 shown in the graph G1 is substantially equal as described above to the fluctuation amount of the pressure of the liquid inside the nozzle at the time of continuously supplying the drive pulses PL1, PL2, PL3, and PL4 shown in the graph G2 to the piezoelectric element PZ. This is considered to indicate that the pressure fluctuation caused by the preceding drive pulse PL and the pressure fluctuation caused by the subsequent drive pulse PL do not resonate because the ink according to the present embodiment has a high viscosity.

1.6. Volume Velocity Caused by Drive Signal Vin

Figure 19:
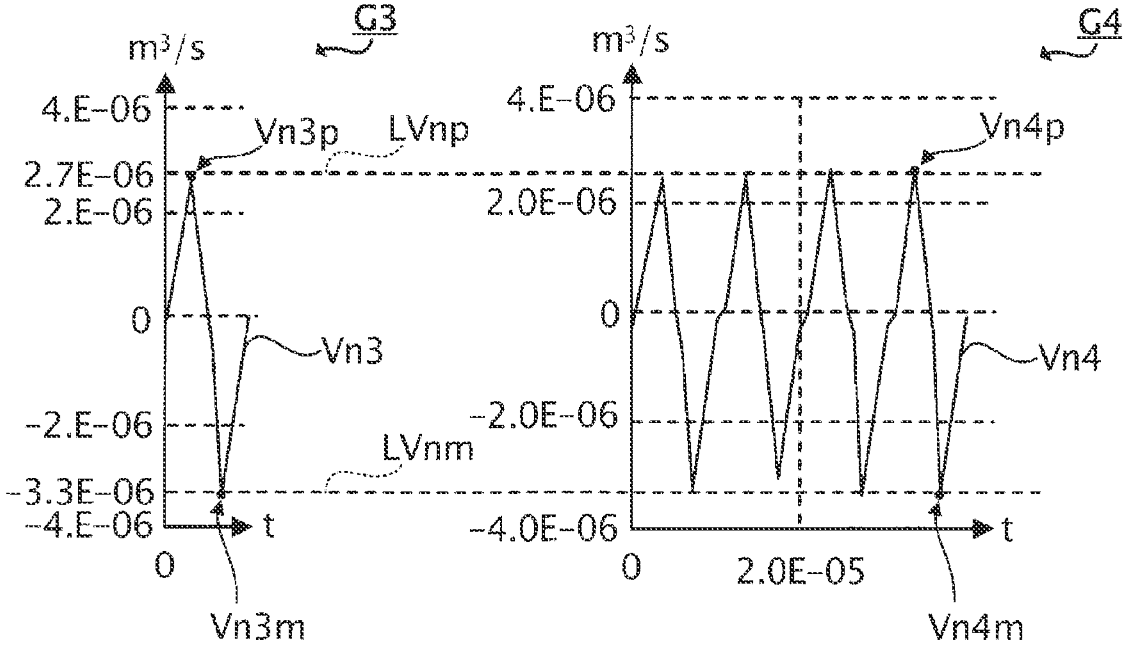
FIG. 19 is a view describing a fluctuation characteristic of a volume velocity of ink inside a nozzle N.

Next, the volume velocity of the ink inside the nozzle N caused by the drive signal Vin will be described with reference to FIG. 19. The volume velocity of the ink inside the nozzle N is a movement speed of the ink inside the nozzle N in the Z axis direction. The graphs G3 and G4 illustrated in FIG. 19 show volume velocities obtained by using a fluid analysis simulation. The horizontal axis of the graph G3 and the horizontal axis of the graph G4 indicate time, and the vertical axis of the graph G3 and the vertical axis of the graph G4 indicate the volume velocity of the ink inside the nozzle N. The unit of volume velocity is cubic meters per second and is represented as "$m^3/s$" in graphs G3 and G4. The volume velocity of the ink inside the nozzle N is the volume of movement of the ink inside the nozzle N per unit period. When the volume velocity of the ink inside the nozzle N is a positive value, it indicates that the ink moves in the +Z direction, and when the volume velocity of the ink inside the nozzle N is a negative value, it indicates that the ink moves in the −Z direction. "E-06" in the graphs G3 and G4 indicates $10^{-06}$.

FIG. 19 is a view describing a fluctuation characteristic of the volume velocity of the ink inside a nozzle N. The graph G3 shows a fluctuation characteristic Vn3 indicating the behavior of the volume velocity of the ink inside the nozzle N when the drive signal Vin having the drive pulse PL4 but not having the drive pulses PL1, PL2, PL3, and PL5 is supplied to the piezoelectric element PZ. A point Vn3$p$ in the fluctuation characteristic Vn3 indicates the volume velocity of the ink inside the nozzle N, which is the largest in the +Z direction, and a time point when this volume velocity is generated. The volume velocity indicated by the point Vn3$p$ is substantially $2.7\times10^{-6}$ cubic meters per second. A point Vn3$m$ in the fluctuation characteristic Vn3 indicates the volume velocity, which is the largest in the −Z direction, and a time point when this volume velocity is generated. The volume velocity indicated by the point Vn3$m$ is substantially $-3.3\times10^{-6}$ cubic meters per second.

The graph G4 shows a fluctuation characteristic Vn4 indicating the behavior of the volume velocity of the ink inside the nozzle N when the drive signal Vin having the drive pulses PL1, PL2, PL3, and PL4 is supplied to the piezoelectric element PZ. A point Vn4$p$ in the fluctuation characteristic Vn4 indicates the volume velocity of the ink inside the nozzle N, which is the largest in the +Z direction, and a time point when this volume velocity is generated when the drive pulse PL4 is supplied to the piezoelectric element PZ. The volume velocity indicated by the point Vn4$p$ is substantially $2.7\times10^{-06}$ cubic meters per second. A point Vn4$m$ in the fluctuation characteristic Vn4 indicates the volume velocity, which is the largest in the −Z direction, and a time point when this volume velocity is generated when the drive pulse PL4 is supplied to the piezoelectric element PZ. The volume velocity indicated by the point Vn4$m$ is substantially $-3.3\times10^{-6}$ cubic meters per second.

The time point indicated by the point Vn3$p$ and the time point indicated by the point Vn4$p$ coincide with the time point at which the supply of the drive component DC7 is ended. Further, the time point indicated by the point Vn3$m$ and the time point indicated by the point Vn4$m$ coincide with the time point at which the supply of the drive component DC8 is ended.

As illustrated in FIG. 19, the volume velocity of the ink inside the nozzle N when the drive signal Vin having only the drive pulse PL4 is supplied to the piezoelectric element PZ is substantially equal to the volume velocity of the ink inside the nozzle N when the drive signal Vin having the drive pulses PL1, PL2, PL3, and PL4 is supplied to the piezoelectric element PZ. Specifically, the volume velocity indicated by the point Vn3$p$ is substantially equal to the volume velocity indicated by the point Vn4$p$, as indicated by a line segment LVnp indicating substantially $2.7\times10^{-06}$ cubic meters per second. Further, the volume velocity indicated by the point Vn3$m$ is substantially equal to the volume velocity indicated by the point Vn4$m$, as indicated by a line segment LVnm indicating substantially $-3.3\times10^{6}$ cubic meters per second.

Similar to the pressure fluctuation characteristic caused by the drive signal Vin described above with reference to FIG. 18, this is considered to indicate that the pressure fluctuation caused by the preceding drive pulse PL and the pressure fluctuation caused by the subsequent drive pulse PL do not resonate because the ink according to the present embodiment has a high viscosity.

1.7. Appropriate Conditions for Drive Waveform Signal Com

Referring back to FIG. 5. As illustrated in FIG. 5, the period Pw24 from the time point tDC2 to the time point tDC4, the period Pw46 from the time point tDC4 to the time point tDC6, and the period Pw68 from the time point tDC6 to the time point tDC8 are substantially the same. The term "substantially the same" includes not only a case of being completely the same but also a case of being considered to be the same when the measurement error is taken into consideration. In the following description, the period Pw24, the period Pw46, and the period Pw68 are sometimes collectively referred to as the "period Pw". The time point tDC2 is a time point when the supply of the drive component DC2 is started. The time point tDC4 is a time point when the supply of the drive component DC4 is started. The time point tDC6 is a time point when the supply of the drive component DC6 is started. The time point tDC8 is a time point when the supply of the drive component DC8 is started. It can also be said that the period Pw is an interval of a start timing of the drive component DC that causes the pressure inside the cavity 320 to increase in the continuous drive pulse PL. A relationship between the period Pw and a discharge performance value will be described with reference to FIG. 20.

Figure 20:
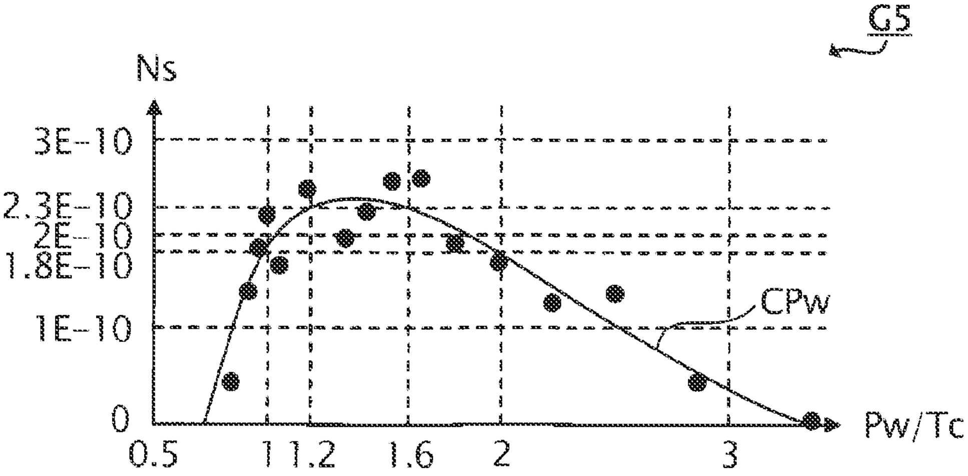
FIG. 20 is a view for describing a relationship between a period Pw and a discharge performance value.

FIG. 20 is a view for describing a relationship between the period Pw and the discharge performance value. The discharge performance value is a value obtained by multiplying the volume of the droplet DR by the flying speed of the droplet DR discharged from the nozzle N. The unit of the discharge performance value is Newton seconds and is represented as "Ns" in the graph G5 illustrated in FIG. 20. "E-10" in the graph G5 indicates $10^{-10}$. The horizontal axis of the graph G5 illustrated in FIG. 20 is a value obtained by dividing the period Pw by a natural vibration cycle TC of the discharging portion D.

The natural vibration cycle TC is the reciprocal of a natural frequency of the discharging portion D and can be generally represented by using the following equation (1).

In the above equation (1), M indicates inertia of a flow path, and C indicates a sum of a compliance $C_v$ of the vibrating plate 310 and a compressibility $C_L$ of the ink. $\zeta$ is a value less than 1 and can be represented by using the following equation (2).

In the above equation (2), R indicates a viscosity resistance of the flow path and is proportional to the viscosity of the ink.

Hereinafter, a value obtained by dividing the period Pw by the natural vibration cycle TC of the discharging portion D is referred to as a "pulse interval ratio". The vertical axis of the graph G5 shows the above-mentioned discharge performance value. Each of a plurality of black circles in the graph G5 indicates the pulse interval ratio and the discharge performance value obtained by experiments. Further, in the graph G5, a characteristic CPw of the pulse interval ratio calculated based on the pulse interval ratio and the discharge performance value obtained by the experiments is shown. The characteristic CPw is calculated based on, for example, the method of least squares.

As shown in the graph G5, in a mode in which the pulse interval ratio is 1 or more and 2 or less, the discharge performance value is substantially $1.8\times10^{10}$ Newton seconds or more, and as compared with a mode in which the pulse interval ratio is less than 1 and a mode in which the pulse interval ratio is larger than 2, the discharge performance value can be increased. For example, when the period Pw68 is less than the pulse interval ratio 1, the drive component DC8 is started while the volume of the cavity 320 is still being expanded. That is, when the period Pw68 is less than the pulse interval ratio 1, the discharge performance value is lowered because the drive component DC8 is started in a state in which the volume of the cavity 320 is smaller than the volume of the cavity 320 at the time point tDC8 where the drive component DC8 is started when the pulse interval ratio is 1 or more and 2 or less for the period Pw68.

In a mode in which the pulse interval ratio is 1.2 or more and 1.6 or less, the discharge performance value is substantially $2.3\times10^{-10}$ Newton seconds or more, and as compared with a mode in which the pulse interval ratio is less than 1.2 and a mode in which the pulse interval ratio is larger than 1.6, the discharge performance value can be increased. Note that, substantially $1.8\times10^{-10}$ Newton seconds correspond to 20 ng×9 m/s, and substantially $2.3\times10^{-10}$ Newton seconds correspond to 23 ng×10 m/s. "1 ng" indicates $10^{-9}$ grams.

1.8. Recording Method Using Drive Waveform Signal Com

As illustrated in FIG. 17, the liquid column is still present in the meniscus MS even after the droplet DR is discharged. There is a possibility that the liquid column is continuously present in the meniscus MS even in the recording period Tu[j] that is started at the end time point of the recording period Tu[i] after the droplet DR is discharged within the recording period Tu[i]. "j" is an integer from 2 to I and is greater than "i" by 1. When the liquid column is present in the meniscus MS in the recording period Tu[j] and the drive signal Vin based on the individual designation signal Sd[m] that designates the drive mode α1 is supplied to the piezoelectric element PZ, there is a possibility that the droplet DR is discharged before the drive component DC8 is supplied. Since the liquid discharging head HU and the recording paper P move relative to each other at a predetermined speed, when the droplet DR is discharged at a time when it is not the timing at which the droplet DR should be originally discharged, a position where the droplet DR lands on the recording paper P deviates from the position where the droplet DR should land, and the printing quality deteriorates. In order for the droplet DR to land at the position where the droplet DR should originally land, in the first embodiment, when discharging the droplet DR in the recording period Tu[j], a waveform of the drive signal Vin supplied to the piezoelectric element PZ in the recording period Tu[j] is determined based on a waveform of the drive signal Vin supplied to the piezoelectric element PZ in a predetermined recording period Tux preceding the recording period Tu[j]. More specifically, the control portion 6 generates the individual designation signal Sd[m] of the recording period Tu[j] based on the individual designation signal Sd[m] of the predetermined recording period Tux preceding the recording period Tu[j].

The process of the control portion 6 will be described more specifically. When discharging the droplet DR is from the nozzle N in the recording period Tu[j], the control portion 6 generates the individual designation signal Sd[m] of the recording period Tu[j] based on the individual designation signal Sd[m] of the recording period Tu[j−1], the individual designation signal Sd[m] of the recording period Tu[j−2], and the individual designation signal Sd[m] of the recording period Tu[j−3], which are the individual designation signals Sdx of the predetermined recording period Tux preceding the recording period Tu[j]. More specifically, when discharging the droplet DR from the nozzle N in the recording period Tu[j], the control portion 6 determines whether or not the drive signal Vin1 of the drive signal Vin, which is supplied in the recording period Tu[j], selects each of the drive pulse PL1, the drive pulse PL2, and the drive pulse PL3 based on the individual designation signal Sd[m] of the recording period Tu[j−1], the individual designation signal Sd[m] of the recording period Tu[j−2], and the individual designation signal Sd[m] of the recording period Tu[j−3], which are the individual designation signals Sdx of the predetermined recording period Tux preceding the recording period Tu[j]. On the other hand, when discharging the droplet DR in the recording period Tu[j], the control portion 6 determines that the drive signal Vin2 of the drive signal Vin, which is supplied in the recording period Tu[j], has the waveform PH2 including the drive pulse PL4 and the drive pulse PL5 regardless of the individual designation signal Sd[m] of the recording period Tu[j−1], the individual designation signal Sd[m] of the recording period Tu[j−2], and the individual designation signal Sd[m] of the recording period Tu[j−3], which are the individual designation signals Sdx of the predetermined recording period Tux preceding the recording period Tu[j]. A more specific recording method will be described with reference to FIGS. 21 and 22.

Figure 21:
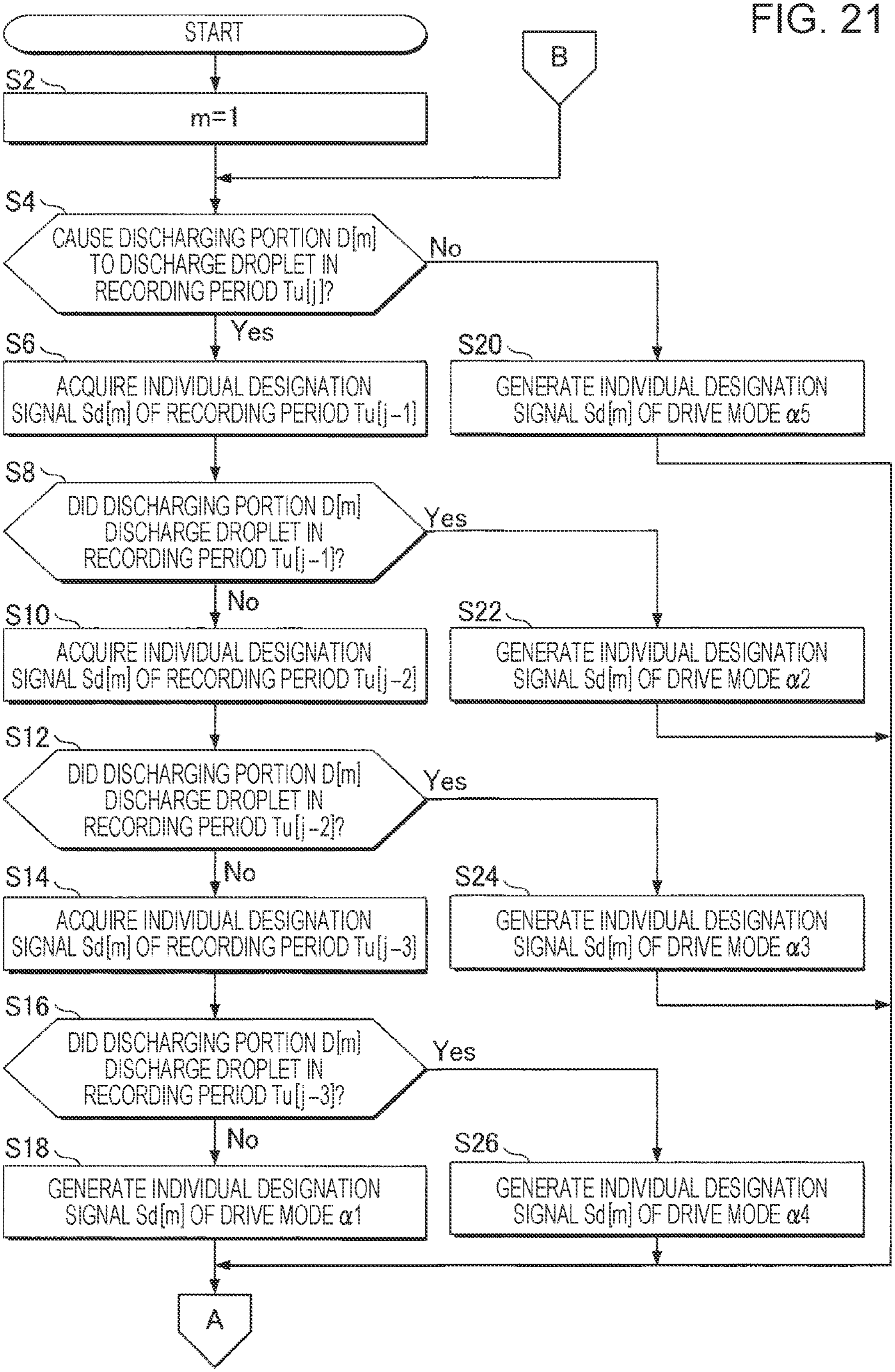
FIG. 21 is a flowchart illustrating an example of the generation of individual designation signals Sd[1] to Sd[m].
Figure 22:
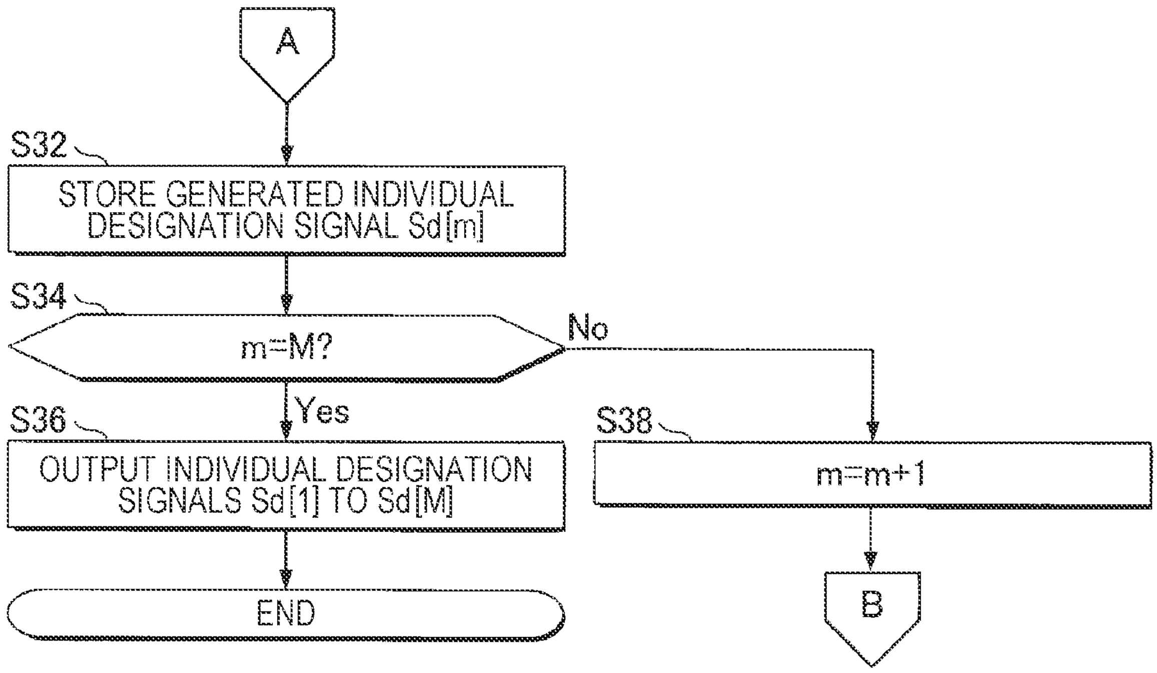
FIG. 22 is a flowchart illustrating an example of the generation of individual designation signals Sd[1] to Sd[m].

FIGS. 21 and 22 are flowcharts illustrating an example of the generation of individual designation signals Sd[1] to Sd[m] in the recording period Tu[j]. The flowcharts illustrated in FIGS. 21 and 22 displays only when the value of j is 4 or more for the simplification of illustration. The case where the value of j is 2 and the case where the value of j is 3 will be described after the description of the flowcharts illustrated in FIGS. 21 and 22.

In step S2, the control portion 6 substitutes 1 for the variable m. Next, in step S4, the control portion 6 determines whether or not to cause the discharging portion D[m] to discharge the droplet in the recording period Tu[j] based on the print data Img. When the determination result in step S4 is positive, in step S6, the control portion 6 acquires the individual designation signal Sd[m] of the recording period Tu[i], that is the recording period Tu[j−1] from the storage portion 5. Next, in step S8, the control portion 6 determines whether or not the discharging portion D[m] discharges the droplet DR in the recording period Tu[j−1] based on the individual designation signal Sd[m] of the recording period Tu[j−1]. For example, when the individual designation signal Sd[m] of the recording period Tu[j−1] designates any of the drive modes α1, α2, α3, and α4, the control portion 6 determines that the droplet DR is discharged from the discharging portion D[m] in the recording period Tu[j−1]. On the other hand, when the individual designation signal Sd[m] of the recording period Tu[j−1] designates the drive mode α5, the control portion 6 determines that the droplet DR is not discharged from the discharging portion D[m] in the recording period Tu[j−1].

When the determination result in step S8 is negative, in step S10, the control portion 6 acquires the individual designation signal Sd[m] of the recording period Tu[j−2] from the storage portion 5. Next, in step S12, the control portion 6 determines whether or not the discharging portion D[m] discharges the droplet DR in the recording period Tu[j−2] based on the individual designation signal Sd[m] of the recording period Tu[j−2].

When the determination result in step S12 is negative, in step S14, the control portion 6 acquires the individual designation signal Sd[m] of the recording period Tu[j−3] from the storage portion 5. Next, in step S16, the control portion 6 determines whether or not the discharging portion D[m] discharges the droplet DR in the recording period Tu[j−3] based on the individual designation signal Sd[m] of the recording period Tu[j−3].

When the determination result in step S16 is negative, that is, when the droplet DR is not discharged from the discharging portion D[m] in the three preceding recording periods Tu of the recording period Tu[j−1], the recording period Tu[j−2], and the recording period Tu[j−3], in step S18, the control portion 6 generates the individual designation signal Sd[m] of the drive mode α1. In the process in step S18, it can be said that the control portion 6 determines that the drive signal Vin1 has the waveform PH1 including the three drive pulses PL of the drive pulse PL1, the drive pulse PL2, and the drive pulse PL3. After the process in step S18 is ended, in step S32, the control portion 6 stores the generated individual designation signal Sd[m] in the storage portion 5.

When the determination result in step S4 is negative, that is, when the droplet DR is not discharged from the discharging portion D[m] in the recording period Tu[j], in step S20, the control portion 6 generates the individual designation signal Sd[m] of the drive mode α5. Thereafter, in step S32, the control portion 6 stores the generated individual designation signal Sd[m] in the storage portion 5.

When the determination result in step S8 is positive, that is, when the droplet DR is discharged from the discharging portion D[m] in the recording period Tu[j−1], in step S22, the control portion 6 generates the individual designation signal Sd[m] of the drive mode α2. In the process in step S22, it can be said that the control portion 6 determines that the drive signal Vin1 has zero drive pulse PL, that is, has no waveform PH1. Further, in the process in step S8, the control portion 6 determines whether or not the waveform PH1 is included in the drive signal Vin supplied to the piezoelectric element PZ in the recording period Tu[j] based on the waveform of the drive signal Vin supplied to the piezoelectric element PZ in the predetermined recording period Tux.

After the process in step S22 is ended, in step S32, the control portion 6 stores the generated individual designation signal Sd[m] in the storage portion 5.

When the determination result in step S12 is positive, that is, when the droplet DR is not discharged from the discharging portion D[m] in the recording period Tu[j−1] but the droplet DR is discharged from the discharging portion D[m] in the recording period Tu[j−2], in step S24, the control portion 6 generates the individual designation signal Sd[m] of the drive mode α3. In the process in step S24, it can be said that the control portion 6 determines that the drive signal Vin1 has the waveform PH1 including one drive pulse PL of the drive pulse PL3. After the process in step S22 is ended, in step S32, the control portion 6 stores the generated individual designation signal Sd[m] in the storage portion 5.

When the determination result in step S16 is positive, that is, when the droplet DR is not discharged from the discharging portion D[m] in the recording period Tu[j−1] and the recording period Tu[j−2] but the droplet DR is discharged from the discharging portion D[m] in the recording period Tu[j−3], in step S26, the control portion 6 generates the individual designation signal Sd[m] of the drive mode α4. In the process in step S26, it can be said that the control portion 6 determines that the drive signal Vin1 has the waveform PH1 including the two drive pulses PL of the drive pulse PL2 and the drive pulse PL3. After the process in step S26 is ended, in step S32, the control portion 6 stores the generated individual designation signal Sd[m] in the storage portion 5.

In the processes of steps S12 and S16, the control portion 6 further determines the number of drive pulses PL included in the waveform PH1 based on the waveform of the drive signal Vin supplied to the piezoelectric element PZ in the predetermined recording period Tux when it is determined that the waveform PH1 is included in the drive signal Vin1 supplied to the piezoelectric element PZ in the recording period Tu[j].

Further, in the processes of steps S8, S12, and S16, the control portion 6 determines the waveform of the drive signal Vin supplied to the piezoelectric element PZ in the recording period Tu[j] such that the number of drive pulses PL included in the drive signal Vin1 supplied to the piezoelectric element PZ in the recording period Tu[j] when the droplet DR is not discharged from the discharging portion D in the recording period Tu[j−1] is larger than the number of drive pulses PL included in the drive signal Vin1 supplied to the piezoelectric element PZ in the recording period Tu[j] when the droplet DR is discharged from the discharging portion D in the recording period Tu[j−1].

After the process in step S32 is ended, in step S34, the control portion 6 determines whether or not the variable m reaches M, which is the number of discharging portions D. When the determination result in step S34 is negative, in step S38, the control portion 6 increases the value of the variable m by one and returns the process to step S4. When the determination result in step S34 is positive, in step S36, the control portion 6 outputs the individual designation signals Sd[1] to Sd[M] to the switching circuit 10. After the process in step S36 is ended, the control portion 6 ends a series of processes illustrated in FIGS. 21 and 22.

The case where the value of the variable j is 2 will be described. When the determination result in step S8 is negative, the control portion 6 executes the process in step S18 instead of the process in step S10. Next, the case where the value of the variable j is 3 will be described. When the determination result in step S12 is negative, the control portion 6 executes the process in step S18 instead of the process in step S14. Since the process after the process in step S18 is ended is the same as the series of processes illustrated in FIGS. 21 and 22, the description after the process in step S18 is ended will be omitted. Further, in the recording period Tu[1], the control portion 6 determines whether or not to cause the discharging portion D[m] to discharge the droplet in the recording period Tu[1] based on the print data Img. When the discharging portion D[m] discharges the droplet, the control portion 6 generates the individual designation signal Sd[m] of the drive mode α1. When the discharging portion D[m] does not discharge the droplet, the control portion 6 generates the individual designation signal Sd[m] of the drive mode α5.

Figure 23:
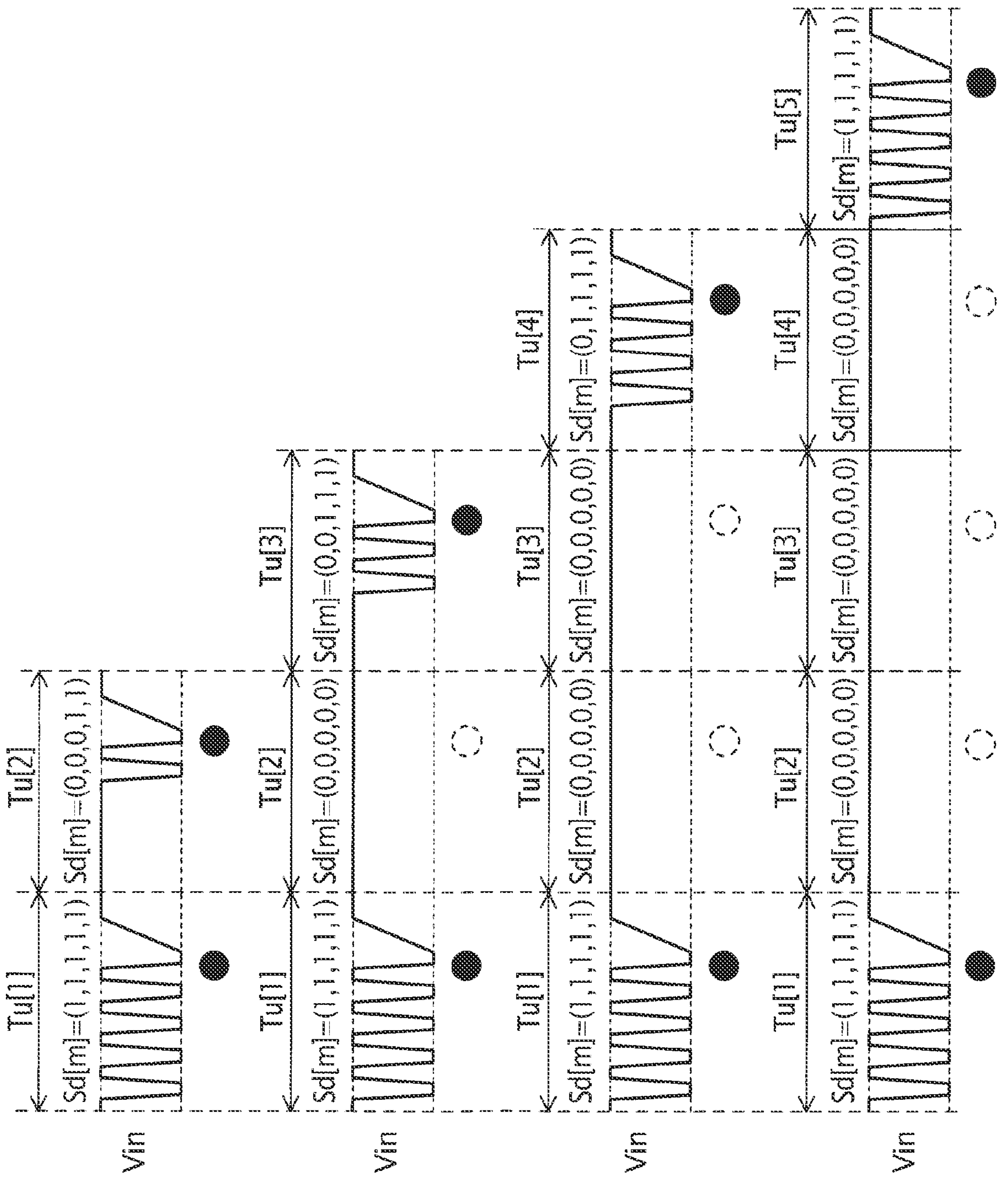
FIG. 23 is a view illustrating a specific example of a recording method using a drive waveform signal Com.

FIG. 23 is a view illustrating a specific example of the recording method using the drive waveform signal Com. FIG. 23 illustrates four discharge modes in the discharging portion D[m]. In FIG. 23, a black circle or a white circle drawn by a broken line is displayed a lower side of each recording period Tu. The black circle means that the droplet DR is discharged in this recording period Tu, and the white circle drawn by the broken line means that the droplet DR is not discharged in this recording period Tu. The black circles and the white circles drawn by the broken lines illustrated in FIGS. 25, 27, and 28 after FIG. 23 have the same meaning as the black circles and the white circles drawn by the broken lines illustrated in FIG. 23. Hereinafter, the recording period Tu in which the droplet DR is discharged is sometimes referred to as a "discharge recording period Tu-D", and the recording period Tu in which the droplet DR is not discharged is sometimes referred to as a "non-discharge recording period Tu-N".

The discharge mode illustrated in a first stage in FIG. 23 is a mode in which the droplet DR is discharged in the recording period Tu[1] and the recording period Tu[2]. Regarding the recording period Tu[1], the control portion 6 generates the individual designation signal Sd[m] of the drive mode α1 and outputs the generated individual designation signal Sd[m] to the switching circuit 10. As a result, the discharging portion D[m] is supplied with the drive signal Vin having the drive pulses PL1, PL2, PL3, PL4, and PL5 in the recording period Tu[1].

Regarding the recording period Tu[2], the control portion 6 executes the processes in the flowcharts illustrated in FIGS. 21 and 22 in a state where the value of the variable j is 2. Since the determination result in step S8 is positive, the control portion 6 generates the individual designation signal Sd[m] of the drive mode α2 by executing the process in step S22 and outputs the generated individual designation signal Sd[m] to the switching circuit 10. As a result, the discharging portion D[m] is supplied with the drive signal Vin having the drive pulses PL4 and PL5 in the recording period Tu[1].

The discharge mode illustrated in a second stage in FIG. 23 is a mode in which the droplet DR is discharged in the recording period Tu[1] and the recording period Tu[3] and the droplet DR is not discharged in the recording period Tu[2]. Since the recording period Tu[1] is the same as the recording period Tu[1] in the first stage in FIG. 23, the description thereof will be omitted. Regarding the recording period Tu[2], the control portion 6 executes the processes in the flowcharts illustrated in FIGS. 21 and 22 in a state where the value of the variable j is 2. Since the recording period Tu[2] is non-discharge recording period Tu-N, the determination result in step S4 is negative, and the control portion 6 generates the individual designation signal Sd[m] of the drive mode α5 by executing the process in step S20 and outputs the generated individual designation signal Sd[m] to the switching circuit 10. As a result, the discharging portion D[m] is supplied with the drive signal Vin that does not drive the discharging portion D in the recording period Tu[2].

Regarding the recording period Tu[3], the control portion 6 executes the processes in the flowcharts illustrated in FIGS. 21 and 22 in a state where the value of the variable j is 3. Since the determination result in step S12 is positive, the control portion 6 generates the individual designation signal Sd[m] of the drive mode α3 by executing the process in step S24 and outputs the generated individual designation signal Sd[m] to the switching circuit 10. As a result, the discharging portion D[m] is supplied with the drive signal Vin having the drive pulses PL3, PL4, and PL5 in the recording period Tu[3].

The discharge mode illustrated in a third stage in FIG. 23 is a mode in which the droplet DR is discharged in the recording period Tu[1] and the recording period Tu[4] and the droplet DR is not discharged in the recording period Tu[2] and the recording period Tu[3]. Since the recording period Tu[1] and the recording period Tu[2] are the same as the recording period Tu[1] and the recording period Tu[2] in the second stage in FIG. 23, the description thereof will be omitted. Regarding the recording period Tu[3], the control portion 6 executes the processes in the flowcharts illustrated in FIGS. 21 and 22 in a state where the value of the variable j is 3. Since the recording period Tu[3] is non-discharge recording period Tu-N, the determination result in step S4 is negative, and the control portion 6 generates the individual designation signal Sd[m] of the drive mode α5 by executing the process in step S20 and outputs the generated individual designation signal Sd[m] to the switching circuit 10. As a result, the discharging portion D[m] is supplied with the drive signal Vin that does not drive the discharging portion D in the recording period Tu[3].

Regarding the recording period Tu[4], since the determination result in step S16 is positive, the control portion 6 generates the individual designation signal Sd[m] of the drive mode α4 by executing the process in step S26 and outputs the generated individual designation signal Sd[m] to the switching circuit 10. As a result, the discharging portion D[m] is supplied with the drive signal Vin having the drive pulses PL2, PL3, PL4, and PL5 in the recording period Tu[4].

The discharge mode illustrated in a fourth stage in FIG. 23 is a mode in which the droplet DR is discharged in the recording period Tu[1] and the recording period Tu[5] and the droplet DR is not discharged in the recording period Tu[2], the recording period Tu[3], and the recording period Tu[4]. Since the recording period Tu[1], the recording period Tu[2], and the recording period Tu[3] are the same as the recording period Tu[1], the recording period Tu[2], and the recording period Tu[3] in the third stage in FIG. 23, the description thereof will be omitted. Since the recording period Tu[4] is non-discharge recording period Tu-N, the determination result in step S4 is negative, and the control portion 6 generates the individual designation signal Sd[m] of the drive mode α5 by executing the process in step S20 and outputs the generated individual designation signal Sd[m] to the switching circuit 10. As a result, the discharging portion D[m] is supplied with the drive signal Vin that does not drive the discharging portion D in the recording period Tu[4].

Regarding the recording period Tu[5], since the determination result in step S16 is negative, the control portion 6 generates the individual designation signal Sd[m] of the drive mode α1 by executing the process in step S18 and outputs the generated individual designation signal Sd[m] to the switching circuit 10. As a result, the discharging portion D[m] is supplied with the drive signal Vin having the drive pulses PL1, PL2, PL3, PL4, and PL5 in the recording period Tu[5].

1.9. Round-Up of First Embodiment

The round-up of the first embodiment is described below.

1.9.1. Round-Up of Waveform PH1 and Waveform PH2

As described above, the liquid discharging head HU according to the first embodiment has M discharging portions D. The discharging portion D includes the piezoelectric element PZ that displaces by being supplied with the drive signal Vin, the cavity 320 inside which pressure is increased or decreased according to the displacement of the piezoelectric element PZ, and the nozzle N that communicates with the cavity 320 and is capable of discharging the ink that fills inside the cavity 320 according to the increase or decrease in the pressure inside the cavity 320 as droplets in the −Z direction. The liquid discharging head HU executes a drive method including the following first step and a second step. In the first step, the meniscus MS forms the liquid column LC6 protruding in the −Z direction by supplying the piezoelectric element PZ with the drive signal Vin1 having the waveform PH1 including the drive pulses PL1, PL2, and PL3 having drive components DC1, DC3, and DC5 that cause the pressure inside the cavity 320 to decrease and the drive components DC2, DC4, and DC6 that cause the pressure inside the cavity 320 to increase. In the second step, when the liquid column LC6 is formed, a part or all of the ink constituting the liquid column LC8 is discharged as the droplet DR after the meniscus MS forms the liquid column LC8 protruding in the −Z direction by supplying the piezoelectric element PZ with the drive signal Vin2 having the waveform PH2 including the drive pulses PL4 and PL5 having drive components DC7 and DC9 that cause the pressure inside the cavity 320 to decrease and the drive components DC8 and DC10 that cause the pressure inside the cavity 320 to increase. When the drive signal Vin having the waveform PH1 but not having the waveform PH2 is supplied to the piezoelectric element PZ, the droplet DR is not discharged from the discharging portion D, and when the drive signal Vin having the waveform PH2 but not having the waveform PH1 is supplied to the piezoelectric element PZ, the droplet DR is not discharged from the discharging portion D.

The drive signal Vin having the waveform PH1 is specifically a drive signal Vin based on the individual designation signal Sd[m] that designates the drive mode α1, the drive mode α3, and the drive mode α4.

In the section "Round-up of Waveform PH1 and Waveform PH2", the waveform PH1 is an example of a "first waveform". The waveform PH2 is an example of a "second waveform". The liquid column LC6 is an example of a "first liquid column". The liquid column LC8 is an example of a "second liquid column". Further, the drive pulses PL1, PL2, and PL3 are examples of "first drive pulses", and the drive pulses PL4 and PL5 are examples of "second drive pulses". Further, the drive components DC1, DC3, and DC5 are examples of "first drive components that cause the pressure inside the pressure chamber to decrease", the drive components DC2, DC4, and DC6 are examples of "second drive components that cause the pressure inside the pressure chamber to increase", the drive components DC7 and DC9L are examples of "third drive components that cause the pressure inside the pressure chamber to decrease", and the drive components DC8 and DC10 are examples of "fourth drive components that cause the pressure inside the pressure chamber to increase".

When the viscosity of the ink becomes 20 millipascal seconds or more, there is a possibility that the droplet DR cannot be discharged with one drive pulse PL1 in a standby state in which the ink inside the discharging portion D is held under constant negative pressure. In order to discharge the ink having a high viscosity, it is conceivable to increase the difference between the highest potential and the lowest potential of the drive signal Vin, but there is a physical limit. Further, it is conceivable to increase the excluded volume of the cavity 320, but when the capacitance of the cavity 320 is increased, a structure of the discharging portion D is easily deformed by the force applied to the structure, that is, a compliance of the flow path in the discharging portion D is increased. The excluded volume means the fluctuation amount of the volume of the pressure chamber caused by the vibration of the vibrating plate 310. When the compliance of the flow path in the discharging portion D is increased, the pressure fluctuation generated by the displacement of the piezoelectric element PZ is easily alleviated by the deformation of the structure of the discharging portion D, so that it becomes difficult to discharge the droplet DR. Further, when the capacitance of the cavity 320 is increased, the pressure generated by the displacement of the piezoelectric element PZ is easily absorbed by the compression of the ink so that it becomes difficult to discharge the droplet DR.

Therefore, according to the first embodiment, when the liquid column LC6 is formed by the drive signal Vin1 having the waveform PH1, by supplying the drive signal Vin2 having the waveform PH2 to the piezoelectric element PZ, the liquid column formed in the Meniscus MS can be grown, and a part or all of the ink constituting the liquid column LC8 can be discharged as the droplet DR.

Further, a first decrement amount, which is the fluctuation amount of the pressure of the ink inside the nozzle N toward the negative pressure side at the time of supplying the drive component DC7 of the waveform PH2 included in the drive signal Vin to the piezoelectric element PZ when the drive signal Vin having the waveform PH2 but not having the waveform PH1 is supplied to the piezoelectric element PZ, is substantially equal to a second decrement amount, which is the fluctuation amount of the pressure of the ink inside the nozzle N toward the negative pressure side at the time of supplying the drive component DC7 of the waveform PH2 included in the drive signal Vin to the piezoelectric element PZ when the drive signal Vin having the waveform PH1 and the waveform PH2 is supplied to the piezoelectric element PZ. Further, a first increment amount, which is the fluctuation amount of the pressure of the ink inside the nozzle toward the positive pressure side at the time of supplying the drive component DC8 of the waveform PH2 included in the drive signal Vin to the piezoelectric element PZ when the drive signal Vin having the waveform PH2 but not having the waveform PH1 is supplied to the piezoelectric element PZ, is substantially equal to a second increment amount, which is the fluctuation amount of the pressure of the ink inside the nozzle N toward the positive pressure side at the time of supplying the drive component DC8 of the waveform PH2 included in the drive signal Vin to the piezoelectric element PZ when the drive signal Vin having the waveform PH1 and the waveform PH2 is supplied to the piezoelectric element PZ.

The higher the viscosity of the ink, the faster the attenuation of residual vibration. Therefore, after the waveform PH1 is supplied to the piezoelectric element PZ, the attenuation of the residual vibration occurs due to the waveform PH1 at the time point when the waveform PH2 is supplied to the piezoelectric element PZ, and resonance cannot be generated due to the synchronization of the waveform PH2 with the residual vibration caused by the waveform PH1. In the first embodiment, the first decrement amount and the second decrement amount described above are substantially equal, and further, the first increment amount and the second increment amount are substantially equal, so that the residual vibration caused by the waveform PH1 and the pressure vibration generated by the waveform PH2 do not resonate. However, in the first embodiment, since the droplet DR is discharged by forming the liquid column to be formed in the meniscus MS by a plurality of times of the drive pulses PL, the waveform PH1 and the waveform PH2 are not adjusted such that the waveform PH2 is generated to resonate with the residual vibration caused by the waveform PH1 but are adjusted so as to form the meniscus MS by the plurality of times of the drive pulses PL. Therefore, according to the first embodiment, even when the ink has a high viscosity, the droplet DR can be discharged by forming the liquid column to be formed in the meniscus MS by the waveform PH1 and the waveform PH2.

The pull-in position Zp4, which is a position of the most pulled-in part of the meniscus MS inside the discharging portion D in the +Z direction, at the time of supplying the drive component DC7 of the waveform PH2 to the piezoelectric element PZ when the drive signal Vin2 having the waveform PH2 is supplied to the piezoelectric element PZ following the drive signal Vin1 having the waveform PH1, is positioned in the +Z direction with respect to the pull-in position Zp1 that corresponds to the most pulled-in part of the meniscus MS in the +Z direction, at the time of supplying the drive component DC7 of the waveform PH2 to the piezoelectric element PZ when the drive signal Vin2 having the waveform PH2 is supplied to the piezoelectric element PZ without supplying the drive signal Vin1 having the waveform PH1 to the piezoelectric element PZ.

As described above, in the first embodiment, by supplying the plurality of drive pulses PL to the piezoelectric element PZ, the most pulled-in part of the meniscus MS in the +Z direction moves in the −Z direction so that the liquid column formed in the meniscus MS also moves in the −Z direction. As the liquid column moves in the −Z direction, the front end of the liquid column in the −Z direction moves away from the initial position Z0 in the −Z direction so that a part or all of the liquid column can be easily separated, and the droplet DR separated from the liquid column can be discharged.

Further, in the second step, when the front end of the liquid column LC8 moves in the −Z direction, the drive component DC9 included in the drive pulse PL5 of the drive signal Vin is supplied to the piezoelectric element PZ.

When the front end of the liquid column LC8 moves in the −Z direction, the droplet DR is torn off from the liquid column LC9 by supplying the drive signal Vin having the drive component DC9 to the piezoelectric element PZ. According to the present embodiment, a more stable discharge can be realized as compared with an aspect in which the drive signal Vin not having the drive component DC9 is supplied to the piezoelectric element PZ.

The waveform PH1 includes the drive pulses PL1, PL2, and PL3. The drive pulse PL1 includes the drive component DC1 and the drive component DC2. The drive pulse PL2 includes the drive component DC3 and the drive component DC4. The drive pulse PL3 includes the drive component DC5 and the drive component DC6.

As described with reference to FIGS. 8 to 17, as indicated by the behavior of the meniscus MS when the drive signal Vin based on the individual designation signal Sd[m] that designates the drive mode α1 is supplied to the piezoelectric element PZ, when the ink has a high viscosity, it is not possible to generate the pressure fluctuation in the discharging portion D to the extent that the droplet DR is discharged from the nozzle N with only one drive pulse PL. That is, by continuously supplying the plurality of drive pulses PL to the piezoelectric element PZ and repeating the decrease and increase of the pressure inside the cavity 320, the liquid column is formed in the Meniscus MS, and the liquid column is further grown, and thus a part or all of the liquid column can be made to fly from the nozzle N in the −Z direction as the droplet DR.

In the present embodiment, since the waveform PH1 has three drive pulses PL, even when the droplet DR cannot be discharged with one drive pulse PL, the liquid column to be formed in the Meniscus MS can be grown by supplying the drive signal Vin having the waveform PH1 including two or three drive pulses PL to the piezoelectric element PZ, and thus a part or all of the ink constituting the liquid column LC8 can be discharged by the waveform PH2 as the droplet DR.

As described with reference to FIGS. 21 and 22, when the predetermined recording period Tux preceding the recording period Tu[j] is the non-discharge recording period Tu-N, in the same manner as when the droplet DR is discharged from the discharging portion D after the drive component DC8 of the waveform PH2 is supplied to the piezoelectric element PZ in the recording period Tu[j], the drive signal Vin including the drive pulse PL2 and the drive pulse PL3, or the drive pulses PL1, PL2, and PL3 is supplied to the piezoelectric element PZ in the recording period Tu[j].

Further, the viscosity of the ink in the liquid discharging head HU is 20 millipascal seconds or more, desirably 40 millipascal seconds. When the viscosity of the ink becomes 20 millipascal seconds or more, it may not be possible to discharge the droplet DR with only one drive pulse PL4 of the waveform PH2, but by the drive method according to the present embodiment in which the waveform PH1 is provided before the waveform PH2, the droplet DR can be discharged even for the ink that has a viscosity of 20 millipascal seconds or more.

The difference between the highest potential and the lowest potential in the waveform PH1 is substantially equal to the difference between the highest potential and the lowest potential in the waveform PH2. More specifically, the lowest potential in the waveform PH1 and the lowest potential in the waveform PH2 are the potentials VL1 and are substantially equal to each other, and the highest potential in the waveform PH1 and the highest potential in the waveform PH2 are the reference potentials V0 and are substantially equal to each other. The highest potential that can be realized in the ink jet printer 1 is defined as the highest potential of the waveform PH1 and the waveform PH2, and by setting the lowest potential that can be realized in the ink jet printer 1 to the lowest potential of the waveform PH1 and the waveform PH2, even when the ink has a high viscosity, the liquid column can grow in the meniscus MS by the waveform PH1, and the droplet DR can be discharged by the waveform PH2.

1.9.2. Round-Up of Appropriate Conditions for Drive Waveform Signal Com

As described above, the liquid discharging head HU in the first embodiment executes the drive method including the first step and the second step described above. The waveform PH1 has three drive pulses PL having the drive components DC1, DC3, and DC5 that cause the pressure inside the cavity 320 to decrease and the drive components DC2, DC4, and DC6 that cause the pressure inside the cavity 320 to increase. The waveform PH2 has two drive pulses PL having the drive components DC7 and DC9 that cause the pressure inside the cavity 320 to decrease and the drive components DC8 and DC10 that cause the pressure inside the cavity 320 to increase. The waveform PH2 is started at the end time point of the waveform PH1. The period Pw68, which is an interval between the rearmost drive pulse PL3 of the drive pulse PL of the waveform PH1 and the foremost drive pulse PL4 of the drive pulse PL of the waveform PH2, is 1 time or more and 2 times or less the natural vibration cycle TC of the discharging portion D. The period Pw68 is a period from the time point tDC6 when the supply of the drive component DC6 included in the rearmost drive pulse PL3 of the three drive pulses PL included in the waveform PH1 is started to the time point tDC8 when the supply of the drive component DC8 included in the foremost drive pulse PL4 of the two drive pulses PL included in the waveform PH2 is started.

By the fact that the period Pw68 is 1 time or more and 2 times or less the natural vibration cycle TC, the discharge performance value can be increased as compared with an aspect in which the period Pw68 is less than 1 time the natural vibration cycle TC and an aspect in which the period Pw68 is larger than 2 times the natural vibration cycle TC.

The drive pulses PL1, PL2, and PL3 included in the waveform PH1 are examples of the "first drive pulses". The drive components DC1, DC3, and DC5 are examples of the "first drive components". The drive components DC2, DC4, and DC6 are examples of the "second drive components". The drive pulses PL4 and PL5 included in the waveform PH2 are examples of the "second drive pulses". The drive components DC7 and DC9 are examples of the "third drive components". The drive components DC8 and DC10 are examples of the "fourth drive components". The period Pw68 corresponds to a "first period".

Further, the period Pw68 is 1.2 times or more and 1.6 times or less the natural vibration cycle TC. By the fact that the period Pw68 is 1.2 times or more and 1.6 times or less of the natural vibration cycle TC, the discharge performance value can be increased as compared with an aspect in which the period Pw68 is less than 1.2 times the natural vibration cycle TC and an aspect in which the period Pw68 is larger than 1.6 times the natural vibration cycle TC.

Further, the periods Pw24 and Pw46, which are intervals of pulses of the drive pulses PL1 to PL3 included in the waveform PH1, are 1 time or more and 2 times or less the natural vibration cycle TC. The period Pw24 is a period from the time point tDC2 when the supply of the drive component DC2 included in the drive pulse PL1 of the three drive pulses PL included in the waveform PH1 is started to the time point tDC4 when the supply of the drive component DC4 included in the next drive pulse PL2 of the drive pulse PL1 is started. The period Pw46 is a period from the time point tDC4 when the supply of the drive component DC4 included in the drive pulse PL2 of the three drive pulses PL included in the waveform PH1 is started to the time point tDC6 when the supply of the drive component DC6 included in the next drive pulse PL3 of the drive pulse PL2 is started.

By the fact that the periods Pw24 and Pw46 are 1 time or more and 2 times or less the natural vibration cycle TC, the discharge performance value can be increased as compared with an aspect in which the periods Pw24 and Pw46 are less than 1 time the natural vibration cycle TC and an aspect in which the periods Pw24 and Pw46 are larger than 2 times the natural vibration cycle TC.

The periods Pw24 and Pw46 are examples of "second periods". When the period Pw24 is an example of the "second period", the drive pulse PL1 corresponds to the "one of the first drive pulses", and the drive pulse PL2 corresponds to the "one of the next first drive pulses of the first drive pulse". When the period Pw46 is an example of the "second period", the drive pulse PL2 corresponds to the "one of the first drive pulses", and the drive pulse PL3 corresponds to the "one of the next first drive pulses of the first drive pulse".

Further, the periods Pw24 and Pw46 are 1.2 times or more and 1.6 times or less the natural vibration cycle TC. By the fact that the periods Pw24 and Pw46 are 1.2 times or more and 1.6 times or less the natural vibration cycle TC, the discharge performance value can be increased as compared with an aspect in which the periods Pw24 and Pw46 are less than 1.2 times the natural vibration cycle TC and an aspect in which the periods Pw24 and Pw46 are larger than 1.6 times the natural vibration cycle TC.

1.9.3. Round-Up of Recording Method Using Drive Waveform Signal Com

As described above, the liquid discharging head HU according to the first embodiment has M discharging portions D. The discharging portion D includes the piezoelectric element PZ, the cavity 320, and the nozzle N. The piezoelectric element PZ displaces according to the drive signal Vin including the drive signal Vin1 and the drive signal Vin2 supplied in each of the plurality of recording periods Tu including the recording period Tu[j]. The control portion 6 executes the recording method having the first step. In the first step, when discharging the droplet DR from the nozzle N in the recording period Tu[j], a waveform of the drive signal Vin supplied to the piezoelectric element PZ in the recording period Tu[j] is determined based on a waveform of the drive signal Vin supplied to the piezoelectric element PZ in the recording periods Tu[j−1] to Tu[j−3], which are the recording periods Tu preceding the recording period Tu[j]. When the drive signal Vin having the waveform determined in the first step has the waveform PH1 in the drive signal Vin1 and has the waveform PH2 in the drive signal Vin2, by supplying the drive signal Vin1 to the piezoelectric element PZ in the recording period Tu[j], the meniscus MS forms the liquid column LC6 protruding in the −Z direction, and when the liquid column LC6 is formed, by supplying the drive signal Vin2 to the piezoelectric element PZ, the meniscus MS forms the liquid column LC8 protruding in the −Z direction, and thereafter a part or all of the ink constituting the liquid column LC8 is discharged as the droplet.

For example, in a case where the drive signal Vin based on the individual designation signal Sd[m] that designates the drive mode α1 is supplied to the piezoelectric element PZ in the stationary state of the discharging portion D, after discharging the droplet DR within the recording period Tu[j−1] preceding the recording period Tu[j] for the ink having a viscosity to the extent that the droplet DR is discharged at the timing when the waveform PH2 is supplied, when the drive signal Vin based on the individual designation signal Sd[m] that designates the drive mode α1 is supplied to the piezoelectric element PZ in the recording period Tu[j], there is a possibility that the droplet DR is discharged when the waveform PH1 is being supplied, for example, which is not the timing at which the droplet DR should be originally discharged, and the printing quality deteriorates.

A state of the meniscus MS at the start time point of the recording period Tu[j] can be estimated by using the waveform of the drive signal Vin supplied to the piezoelectric element PZ in the predetermined recording period Tux preceding the recording period Tu[j]. Therefore, by determining the waveform of the drive signal Vin supplied to the piezoelectric element PZ in the recording period Tu[j] based on the waveform of the drive signal Vin supplied to the piezoelectric element PZ in the predetermined recording period Tux preceding the recording period Tu[j], the droplet DR can be discharged so as to approach the timing at which the droplet DR should be originally discharged, and thus the deterioration of the printing quality can be reduced.

The recording period Tu[j] is an example of a "first recording period", and the predetermined recording periods Tux, which precede the recording period Tu[j] and are used for determining the drive signal Vin supplied to the piezoelectric element PZ in the recording period Tu[j], that is the recording periods Tu[j−1] to Tu[j−3] in the present embodiment, are examples of "predetermined recording periods preceding the first recording period".

The predetermined recording period Tux, which precedes the recording period Tu[j] and is used for determining the drive signal Vin supplied to the piezoelectric element PZ in the recording period Tu[j], includes the recording period Tu[j−1] that is ended at the start of the recording period Tu[j]. Of the two or more recording periods Tu that are ended before the start of the recording period Tu[j], the most influential factor on the meniscus MS at the start time point of the recording period Tu[j] is the waveform of the drive signal Vin supplied to the piezoelectric element PZ in the recording period Tu[j−1]. Therefore, by determining the individual designation signal Sd[m] of the recording period Tu[j] based on the individual designation signal Sd[m] of the predetermined recording period Tux preceding the recording period Tu[j] including the recording period Tu[j−1], the deterioration of the printing quality can be reduced as compared with an aspect of determining the individual designation signal Sd[m] of the recording period Tu[j] based on the individual designation signal Sd[m] of the predetermined recording period Tu preceding the recording period Tu[j] that does not include the recording period Tu[j−1].

The recording period Tu[j−1] is an example of a "second recording period".

In the first step in the section "Round-up of Recording Method Using Drive Waveform Signal Com", the predetermined recording period Tux, which precedes the recording period Tu[j] and is used for determining the drive signal Vin supplied to the piezoelectric element PZ in the recording period Tu[j], includes the recording period Tu[j−1] and includes the continuous recording periods Tu[j−1] to Tu[j−3] that are ended before the start of the recording period Tu[j].

The most influential factor on the meniscus MS at the start time point of the recording period Tu[j] is the waveform of the drive signal Vin supplied to the piezoelectric element PZ in the recording period Tu[j−1], but the waveform of the drive signal Vin supplied to the piezoelectric element PZ in the recording period Tu before the recording period Tu[j−1] is also an influential factor on the meniscus MS at the start time point of the recording period Tu[j]. Therefore, according to the present embodiment, as compared with an aspect of determining the waveform of the drive signal Vin supplied to the piezoelectric element PZ in the recording period Tu[j] based only on the waveform of the drive signal Vin supplied to the piezoelectric element PZ in the recording period Tu[j−1], the state of the meniscus MS at the start time point of the recording period Tu[j] can be estimated more precisely, and thus the deterioration of the printing quality can be further reduced.

The recording periods Tu[j−1] to Tu[j−3] are examples of "two or more consecutive recording periods including the second recording period and ended before the start of the first recording period".

In the first step in the section "Round-up of Recording Method Using Drive Waveform Signal Com", the waveform of the drive signal Vin1 supplied to the piezoelectric element PZ in the recording period Tu[j] is determined based on the waveform of the drive signal Vin supplied to the piezoelectric element PZ in the predetermined recording period Tux preceding the recording period Tu[j].

By adjusting the waveform of the drive signal Vin1, the droplet DR can be discharged so as to approach the timing at which the droplet DR should be originally discharged so that deterioration of the printing quality can be further reduced.

Further, in the first step in the section "Round-up of Recording Method Using Drive Waveform Signal Com", in the predetermined recording period Tux preceding the recording period Tu[j], which is used for determining the drive signal Vin supplied to the piezoelectric element PZ in the recording period Tu[j], it is determined whether or not the waveform PH1 is included in the drive signal Vin1 supplied to the piezoelectric element PZ in the recording period Tu[j] based on the waveform of the drive signal Vin supplied to the piezoelectric element PZ.

Further, in the first step in the section "Round-up of Recording Method Using Drive Waveform Signal Com", in the predetermined recording period Tux preceding the recording period Tu[j], which is used for determining the drive signal Vin supplied to the piezoelectric element PZ in the recording period Tu[j], when it is determined that the waveform PH1 is included in the drive signal Vin1 supplied to the piezoelectric element PZ in the recording period Tu[j] based on the waveform of the drive signal Vin supplied to the piezoelectric element PZ, the number of drive pulses PL included in the waveform PH1 is further determined.

As in the present embodiment, an aspect, in which the number of drive pulses PL included in the drive signal Vin1 is adjusted, can be realized by a simple configuration as compared with an aspect in which the lowest potential and the highest potential of the drive pulse PL included in the drive signal Vin1 are adjusted. The aspect, in which the lowest potential and the highest potential of the drive pulse PL are adjusted, can be realized by, for example, the following configuration. The drive waveform signal generation circuit 2 generates a first drive waveform signal Com-A and a second drive waveform signal Com-B. The difference between the lowest potential and the highest potential of the drive pulse PL corresponding to the drive signal Vin1 of the first drive waveform signal Com-A is larger than the difference between the lowest potential and the highest potential of the drive pulse PL corresponding to the drive signal Vin1 of the second drive waveform signal Com-B. The switching circuit 10 supplies one of the first drive waveform signal Com-A and the second drive waveform signal Com-B to the piezoelectric element PZ. However, in the above configuration, when the types of the drive waveform signal Com are increased, the drive waveform generation circuit becomes large, and the configuration becomes more complicated as compared with the present embodiment. Further, although there is a limit to the lowest potential and the highest potential capable of being supplied to the piezoelectric element PZ in the ink jet printer 1, as described above, by supplying a plurality of drive pulses PL to the piezoelectric element PZ, the pressure inside the cavity 320 is repeatedly decreased and increased, thereby even when the ink has a high viscosity, the liquid column can be grown and discharged as the droplet DR.

Therefore, according to the present embodiment, with a simpler configuration, it is possible to generate the waveform of the drive signal Vin1 that matches the state of the meniscus MS at the start time point of the recording period Tu[j] as compared with the aspect in which the lowest potential and the highest potential of the drive pulse PL included in the drive signal Vin1 are adjusted.

The predetermined recording period Tux, which precedes the recording period Tu[j] and is used for determining the drive signal Vin supplied to the piezoelectric element PZ in the recording period Tu[j], includes the recording period Tu[j−1]. Further, in the first step in the section "Round-up of Recording Method Using Drive Waveform Signal Com", the waveform of the drive signal Vin1 supplied to the piezoelectric element PZ in the recording period Tu[j] is determined such that a first of the number of drive pulses PL included in the drive signal Vin1 supplied to the piezoelectric element PZ in the recording period Tu[j] when the droplet DR is not discharged from the discharging portion D in the recording period Tu[j−1] is larger than a second of the number of drive pulses PL included in the drive signal Vin1 supplied to the piezoelectric element PZ in the recording period Tu[j] when the droplet DR is discharged from the discharging portion D in the recording period Tu[j−1].

A liquid column formed in the meniscus MS at the start time point of the recording period Tu[j] in a first situation where the recording period Tu[j−1] is the non-discharge recording period Tu-N is smaller than a liquid column formed in the meniscus MS at the start time point of the recording period Tu[j] in a second situation where the recording period Tu[j−1] is the discharge recording period Tu-D. Therefore, in order to discharge the droplet DR at the timing at which the droplet DR should be originally discharged in the first situation, it is necessary to supply the drive signal Vin1 having a larger number of drive pulses PL to the piezoelectric element PZ as compared with the second situation. Therefore, the droplet DR can be discharged at the timing at which the droplet DR should be originally discharged by determining the waveform of the drive signal Vin1 supplied to the piezoelectric element PZ in the recording period Tu[j] such that the first of the number of drive pulses PL is larger than the second of the number of drive pulses PL.

When discharging the droplet from nozzle N in the recording period Tu[j], the drive signal Vin2 in the drive signal Vin supplied to the piezoelectric element PZ in the recording period Tu[j] has a predetermined waveform PH2 regardless of the waveform of the drive signal Vin supplied to the piezoelectric element PZ in the predetermined recording period Tux preceding the recording period Tu[j], which is used for determining the drive signal Vin supplied to the piezoelectric element PZ in the recording period Tu[j]. Therefore, when generating the drive signal Vin that matches the state of the meniscus MS at the start time point of the recording period Tu[j], only the waveform of the drive signal Vin1 needs to be adjusted, and the waveform of the drive signal Vin2 does not need to be adjusted.

1.9.4. Round-Up of Relationship Between Drive Signal Vin and Meniscus MS

As described above, it can be said that the liquid discharging head HU executes the drive method including the first step and the second step described below. In the first step, by supplying the drive signal having the waveform PH1 to the piezoelectric element PZ, the liquid column LC6 in which the meniscus MS protrudes in the discharging direction is formed. In the second step, when the liquid column LC6 is formed, by supplying a drive signal having the waveform PH2 to the piezoelectric element PZ, the liquid column LC8 in which the meniscus MS protrudes in the −Z direction is formed, and thereafter a part or all of the ink constituting the liquid column LC8 is discharged as the droplet DR. The waveform PH2 includes two the drive component DC7 that causes the pressure inside the cavity 320 to decrease and the drive component DC8 that causes the pressure inside the cavity 320 to increase. In the second step, by supplying the drive component DC7 to the piezoelectric element PZ before the liquid column LC8 is formed, the meniscus MS forms the liquid column LC7 protruding in the −Z direction. In the second step, when the liquid column LC7 is formed, by supplying the drive component DC8 to the piezoelectric element PZ, the liquid column LC8 is formed.

According to the first embodiment, when the liquid column LC6 is formed, by supplying the drive signal Vin having the drive component DC7 to the piezoelectric element PZ, the liquid column formed in the meniscus MS can be grown, and further, when the liquid column LC7 is formed, by supplying the drive signal Vin having the drive component DC8 to the piezoelectric element PZ, a part or all of the ink constituting the liquid column LC8 can be discharged as the droplet DR.

In the section "Round-up of Relationship between Drive Signal Vin and Meniscus MS", the waveform PH1 is an example of the "first waveform". The waveform PH2 is an example of a "second waveform". The drive component DC7 is an example of a "first pull-in drive component". The drive component DC8 is an example of a "first push-out drive component". The liquid column LC6 is an example of the "first liquid column". The liquid column LC7 is an example of the "third liquid column". The liquid column LC8 is an example of a "second liquid column".

The waveform PH1 has three drive pulses PL having a first drive component that causes the pressure inside the cavity 320 to decrease and a second drive component that causes the pressure inside the cavity 320 to increase. In the first step in the section "Round-up of Relationship between Drive Signal Vin and Meniscus MS", when the drive signal having the drive component DC1 included in the foremost drive pulse PL1 of the three drive pulses PL included in the waveform PH1 is supplied to the piezoelectric element PZ, a liquid surface having a recessed curve surface shape inside the discharging portion D is pulled in toward the +Z direction, and by supplying the drive signal having the drive component DC5 included in the rearmost drive pulse PL3 of the three drive pulses PL included in the waveform PH1 to the piezoelectric element PZ, the meniscus MS, which forms the liquid column LC5 protruding in the −Z direction, is pulled in toward the +Z direction.

According to the first embodiment, in a state in which the drive signal having the drive component DC1 of the first drive pulse PL1 of the waveform PH1 is supplied to the piezoelectric element PZ, the liquid column is not generated in the meniscus MS, and the center part of the meniscus MS has a recessed curve surface shape dented toward the +Z direction side, but by supplying the drive component DC2 of the drive pulse PL1 and the drive components DC3 and DC4 of the drive pulse PL2 to the piezoelectric element PZ, the drive component DC5 of the drive pulse PL3 is supplied to the piezoelectric element PZ, and thus the liquid column LC5 can be formed in the center part of the meniscus MS.

In the section "Round-up of Relationship between Drive Signal Vin and Meniscus MS", the drive components DC1, DC3, and DC5 are examples of the "first drive components". The drive components DC2, DC4, and DC6 are examples of the "second drive components". The meniscus MS forming the liquid column LC5 is an example of the "liquid surface that protrudes in the discharging direction by supplying the first drive component included in the rearmost drive pulse of the plurality of drive pulses included in the first waveform to the drive element".

In the first step in the section "Round-up of Relationship between Drive Signal Vin and Meniscus MS", by supplying the drive signal having the drive component DC3 included in the drive pulse PL2 between the foremost drive pulse PL1 and the rearmost drive pulse PL3 among the three drive pulses PL included in the waveform PH1 to the piezoelectric element PZ, the meniscus MS, which forms the liquid column LC3, is pulled in toward the +Z direction. The liquid column LC3 formed by the drive component DC3 of the drive pulse PL2 is smaller than the liquid column LC6 formed by the drive component DC5 of the drive pulse PL3.

In this way, by repeatedly supplying the drive pulse PL to the piezoelectric element PZ, the liquid column can gradually grow large. By growing the liquid column large, even when the ink has a high viscosity, the droplet DR can be discharged when the waveform PH2 is supplied to the piezoelectric element PZ.

The liquid column LC3 is an example of the "fourth liquid column".

2. MODIFICATION EXAMPLE

Each of the above embodiments can be modified in various ways. A specific aspect of the modification is exemplified below. Two or more aspects randomly selected from the following exemplifications can be appropriately merged within a range not inconsistent with each other. In the modification examples illustrated below, the elements having the same operations and functions as those of the embodiment will be denoted by the reference numerals referred to in the above description, and detailed description thereof will be appropriately omitted.

2.1. First Modification Example

In the first embodiment, when the recording period Tu[j] is the non-discharge recording period Tu-N, the control portion 6 generates the individual designation signal Sd[m] of the drive mode α5 but may generate the individual designation signal Sd[m] of the drive mode other than the drive mode α5.

FIG. 24 is a view for describing the five drive modes in which the individual designation signal Sd[m] can be obtained in a first modification example. In the first modification example, the individual designation signal Sd[m] is a signal that designates any one of the drive modes among the five drive modes of the drive mode α1 to the drive mode α4 and the drive mode α6. The individual designation signal Sd[m] of the drive mode α6 is generated when the discharging portion D[m] does not discharge the droplet. That is, the first modification example is different from the first embodiment in that when the discharging portion D[m] does not discharge the droplet, control portion 6 generates the individual designation signal Sd[m] of the drive mode α6 instead of the individual designation signal Sd[m] of the drive mode α5. The value indicating the individual designation signal Sd[m] of the drive mode α6 is (0,0,0,1,0). When the individual designation signal Sd[m] indicates the drive mode α6, the coupling state designation circuit 11 sets the coupling state designation signal Sla[m] to a low level in the control period Tcu1, the control period Tcu2, the control period Tcu3, and the control period Tcu5, and sets the coupling state designation signal Sla[m] to a high level in the control period Tcu4.

Figure 25:
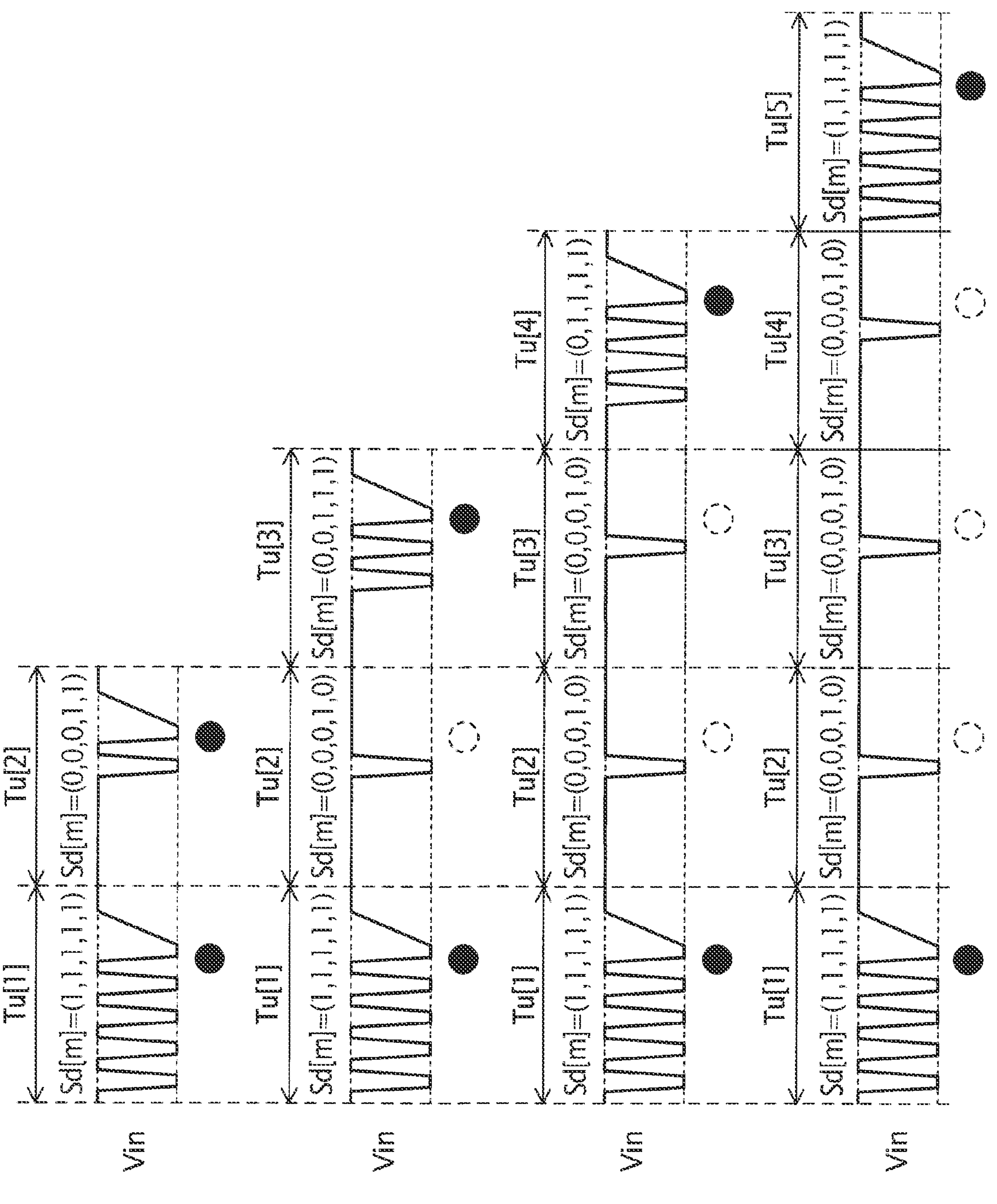
FIG. 25 is a view illustrating a specific example of a recording method using a drive waveform signal Com in the first modification example.

FIG. 25 is a view illustrating a specific example of a recording method using the drive waveform signal Com in the first modification example. As compared with FIG. 23 described in the first embodiment, in the first modification example, the individual designation signal Sd[m] in the recording period Tu in which the droplet DR is not discharged is replaced from the drive mode α5 to the drive mode α6. More specifically, the individual designation signals Sd[m] are replaced from the drive mode α5 to the drive mode α6 in the recording period Tu[2] indicated in the second stage in FIG. 25, the recording period Tu[2] and the recording period Tu[3] indicated in the third stage in FIG. 25, and the recording period Tu[2], the recording period Tu[3], and the recording period Tu[4] indicated in the fourth stage in FIG. 25.

According to the first modification example, even in the recording period Tu[j] that is the non-discharge recording period Tu-N, by supplying the drive pulse PL to the piezoelectric element PZ to the extent that the droplet DR is not discharged, the meniscus MS at the start time point of the next recording period Tu[j+1] of the non-discharge recording period Tu-N can easily maintain the liquid column or can easily form the liquid column in the recording period Tu[j]. When the next recording period Tu[j+1] is the discharge recording period Tu-D, the fluctuation of the meniscus MS in the recording period Tu[j−1] can be used.

In the first modification example, in the non-discharge recording period Tu-N, as the drive pulse PL in which the droplet DR is not discharged, the drive signal Vin2 having the drive pulse PL4 is selected as the drive pulse PL supplied to the piezoelectric element PZ, but the drive pulse PL to be selected is not limited to this. For example, any one of the drive pulses may be selected among the drive pulses PL1, PL2, PL3, PL4, and PL5, or a plurality of drive pulses PL may be selected. However, the drive pulse PL to be selected in the recording period Tu[j], which is the non-discharge recording period Tu-N, is desirably a drive pulse PL close to the drive pulse PL4 in the next recording period Tu[j+1]. This is because when the next recording period Tu[j+1] is the discharge recording period Tu-D, by selecting the drive pulse PL close to the drive pulse PL4 included in the waveform PH2, which is a discharging timing of the droplet DR in the recording period Tu[j+1], as the drive signal Vin for the recording period Tu[j], which is the non-discharge recording period Tu-N, the interval between the drive pulse PL selected within the recording period Tu[j] and the drive pulse PL selected within the recording period Tu[j+1] becomes shorter, and thereby the possibility that the liquid column, which is formed in the meniscus MS in the recording period Tu[j], or the fluctuation in meniscus MS can be used in the recording period Tu[j+1], is increased. Further, when the recording period Tu[j−1] immediately before the recording period Tu[j], which is the non-discharge recording period Tu-N, is the discharge recording period Tu-D, by selecting the drive pulse PL separated from the drive pulse PL4 included in the waveform PH2, which is the discharging timing of the droplet DR in the recording period Tu[j−1] as the drive signal Vin for the recording period Tu[j], the discharging of the droplet DR can be reduced in the recording period Tu[j], which is the non-discharge recording period Tu-N, due to the liquid column, which is formed after discharging the droplet DR in the recording period Tu[j−1], or the fluctuation in meniscus MS.

Further, when the droplet is not discharged from the nozzle N in the recording period Tu[j], the drive signal Vin having at least one of the waveform PH1, which includes at least one of the drive pulses PL1, PL2, and PL3, and, and the waveform PH2, which includes at least one of the drive pulses PL4 and PL5, is supplied to the piezoelectric element PZ so as to increase or decrease the pressure of the ink inside the cavity 320 to the extent that the droplet is not discharged from the nozzle N in the recording period Tu[j]. With the above processes, even in the recording period Tu[j] in which the droplet is not discharged from the nozzle N, by supplying the drive signal Vin having at least one of the waveform PH1 and the waveform PH2 to the piezoelectric element PZ, the vibration of the ink inside the discharging portion D can be maintained in the recording period Tu[j], and the vibration can be used in the recording period Tu[j+1]. In a case where the droplet DR is discharged from the nozzle N in the recording period Tu[j+1], when vibration is applied in the recording period Tu[j] by the waveform PH2 closer to the recording period Tu[j+1], the vibration can be used in the recording period Tu[j+1] before the vibration applied in the recording period Tu[j] become smaller as compared when the vibration is applied in the recording period Tu[j] only by the waveform PH1. Further, in a case where the droplet DR is discharged from the nozzle N in the recording period Tu[j−1], when the drive signal Vin that does not include the waveform PH1 closer to the recording period Tu[j+1] is supplied in the recording period Tu[j], the discharging of the droplet DR can be prevented even in the recording period Tu[j].

2.2. Second Modification Example

In the first embodiment and the first modification example, when the recording period Tu[j] is the non-discharge recording period Tu-N, the control portion 6 at all time generates the individual designation signal Sd[m] having the same drive mode but may generate the individual designation signals Sd[m] having different drive modes between a plurality of non-discharge recording periods Tu-N.

FIG. 26 is a view for describing six drive modes in which the individual designation signal Sd[m] can be obtained in a second modification example. In the second modification example, the individual designation signal Sd[m] is a signal that designates any one of the drive modes among the six drive modes of the drive mode α1 to the drive mode α4, drive mode α7, and the drive mode α8. The individual designation signal Sd[m] of the drive mode α7 and the individual designation signal Sd[m] of the drive mode α8 are generated when the discharging portion D[m] does not discharge the droplet. That is, the second modification example is different from the first embodiment in that when the discharging portion D[m] does not discharge the droplet, control portion 6 generates the individual designation signal Sd[m] of the drive mode α7 or the individual designation signal Sd[m] of the drive mode α8 instead of the individual designation signal Sd[m] of the drive mode α5.

The value indicating the individual designation signal Sd[m] of the drive mode α7 is (0,1,0,0,0). When the individual designation signal Sd[m] indicates the drive mode α7, the coupling state designation circuit 11 sets the coupling state designation signal Sla[m] to a low level in the control period Tcu1, the control period Tcu3, the control period Tcu4, and the control period Tcu5, and sets the coupling state designation signal Sla[m] to a high level in the control period Tcu2. The value indicating the individual designation signal Sd[m] of the drive mode α8 is (1,0,1,0,0). When the individual designation signal Sd[m] indicates the drive mode α8, the coupling state designation circuit 11 sets the coupling state designation signal Sla[m] to a low level in the control period Tcu2, the control period Tcu4, and the control period Tcu5, and sets the coupling state designation signal Sla[m] to a high level in the control period Tcu1 and the control period Tcu3.

Regarding which of the individual designation signal Sd[m] of the drive mode α7 and the individual designation signal Sd[m] of the drive mode α8 is generated, in the second modification example, it is assumed a situation with a continuous non-discharge recording period Tu-N. The control portion 6 generates the individual designation signal Sd[m] of the drive mode α7 in the k-th non-discharge recording period Tu-N among the continuous non-discharge recording period Tu-N and generates the individual designation signal Sd[m] of the drive mode α8 in the (k+1)-th non-discharge recording period Tu-N. The variable "k" is an integer from 1 to the continuous non-discharge recording period Tu-N.

Figure 27:
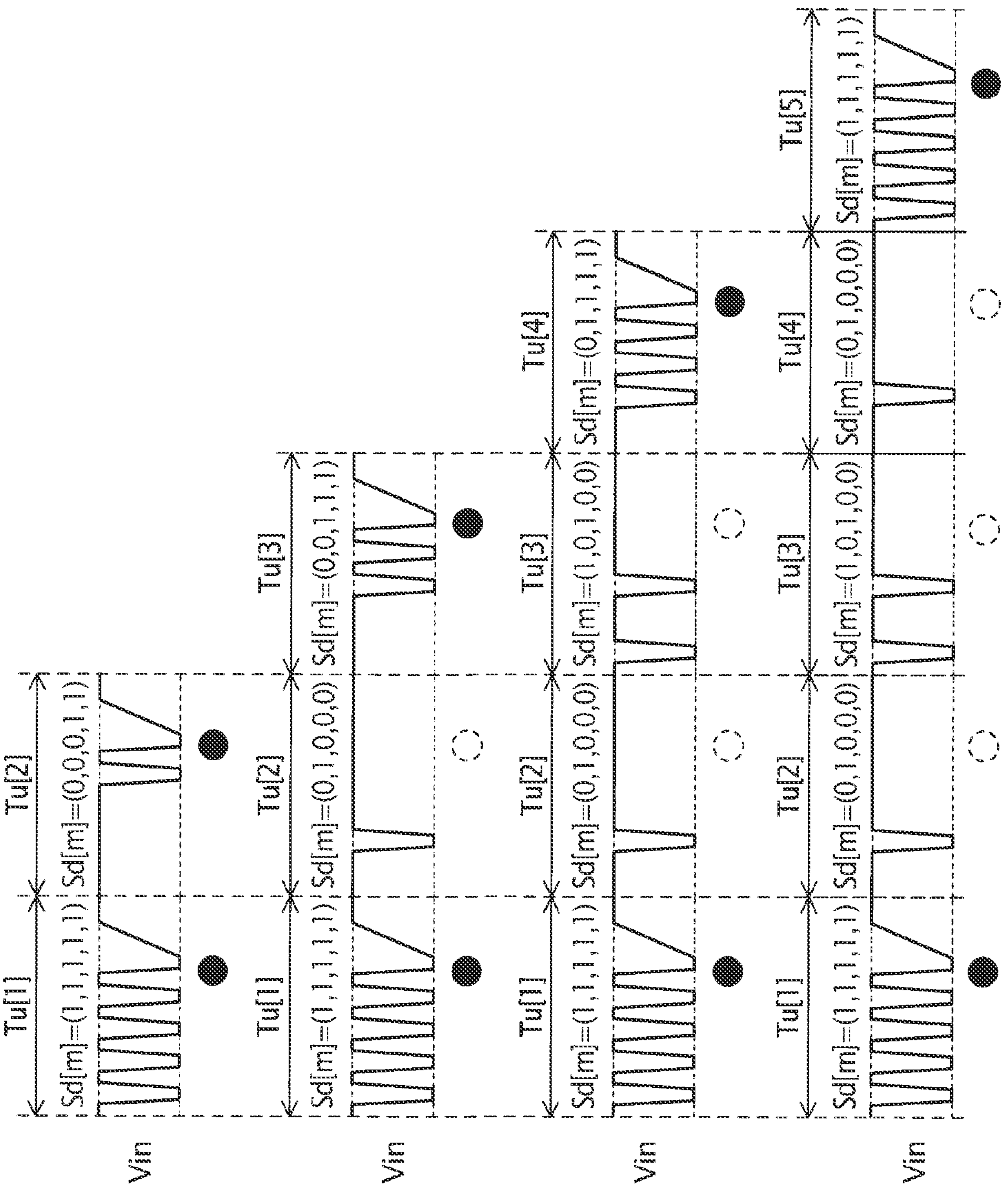
FIG. 27 is a view illustrating a specific example of a recording method using a drive waveform signal Com in the second modification example.

FIG. 27 is a view illustrating a specific example of a recording method using the drive waveform signal Com in the second modification example. As compared with FIG. 23 described in the first embodiment, in the second modification example, the individual designation signal Sd[m] in the recording period Tu in which the droplet DR is not discharged is replaced from the drive mode α5 to the drive mode α7 or the drive mode α8. More specifically, the individual designation signals Sd[m] are replaced from the drive mode α5 to the drive mode α7 in the recording period Tu[2] indicated in the second stage in FIG. 27, the recording period Tu[2] indicated in the third stage in FIG. 27, and the recording period Tu[2] and the recording period Tu[4] indicated in the fourth stage in FIG. 27, and the individual designation signals Sd[m] are replaced from the drive mode α5 to the drive mode α8 in the recording period Tu[3] indicated in the third stage in FIG. 27 and the recording period Tu[3] indicated in the fourth stage in FIG. 27. The control portion 6 may select any of the drive modes α5 to α8 for the individual designation signal Sd[m] in the non-discharge recording period Tu-N. Further, the drive signal Vin supplied in the non-discharge recording period Tu-N may include one or more drive pulses PL among the drive pulses PL1 to PL4.

As shown in the second modification example, the control portion 6 may adjust the number of drive pulses PL supplied in the non-discharge recording period Tu-N to the extent that the droplet DR is not discharged in the non-discharge recording period Tu-N. Regarding the specific number of drive pulses PL, the designer of the ink jet printer 1 specifies the relationship between the viscosity and the number of drive pulses PL by experiments and stores in the storage portion 5 a table indicating the relationship between the viscosity of the ink and the number of drive pulses PL or a calculation equation for calculating the number of drive pulses PL by using the viscosity of the ink.

Further, as a modification example of the second modification example, the control portion 6 may change the drive pulse PL supplied in the non-discharge recording period Tu-N to the extent that the droplet DR is not discharged in the non-discharge recording period Tu-N. For example, the control portion 6 may generate the individual designation signal Sd[m] that generates the drive signal Vin having only the drive pulse PL3 in the k-th non-discharge recording period Tu-N among the continuous non-discharge recording periods Tu-N and generate the individual designation signal Sd[m] that generates the drive signal Vin having only the drive pulse PL4 in the (k+1)-th non-discharge recording period Tu-N. The variable "k" is an integer from 1 to the continuous non-discharge recording period Tu-N.

2.3. Third Modification Example

In the first embodiment, the first modification example, and the second modification example, in the stationary state of the discharging portion D where the reference potential V0 is supplied to the piezoelectric element PZ and a state where the position of the meniscus MS is stationary at the initial position Z0, when the drive signal Vin based on the individual designation signal Sd[m] of the drive mode α1 is supplied to the piezoelectric element PZ within one recording period Tu[i], the viscosity of the ink is such that the droplet DR can be discharged within one recording period Tu[i] but even when the drive signal Vin based on the individual designation signal Sd[m] of the drive mode α1 is supplied to the piezoelectric element PZ within the recording period Tu[i], in some cases, the viscosity of the ink has a high viscosity that the ink cannot be discharged within one recording period Tu[i]. In a third modification example, when the printing process starts from the recording period Tu[1], by supplying a drive signal causing nonprint micro-vibration to the piezoelectric element PZ immediately before the recording period Tu[1], the droplet DR can be discharged in the recording period Tu[1], and thereafter, by using the liquid column, which is formed in the meniscus MS in the recording period Tu[j−1], or the fluctuation in meniscus MS, the droplet DR can be discharged in the recording period Tu[j].

Figure 28:
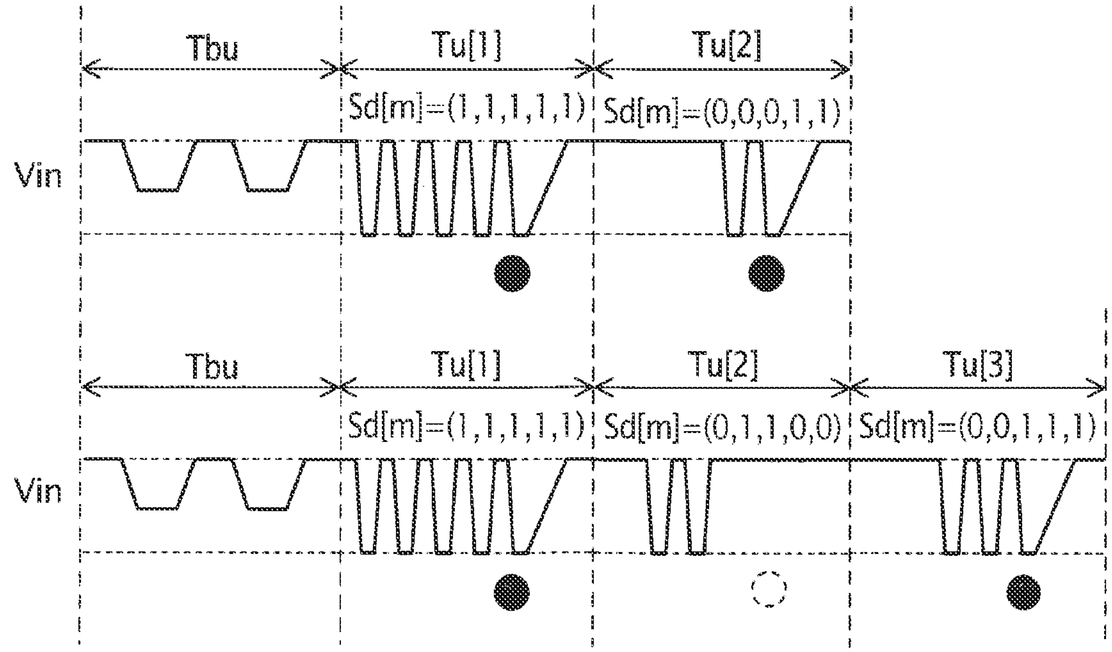
FIG. 28 is a view for describing a drive signal Vin when a droplet DR is discharged in a third modification example.

FIG. 28 is a view for describing the drive signal Vin when the droplet DR is discharged in the third modification example. The discharge mode indicated in the first stage in FIG. 28 is a mode in which the droplet DR is discharged in the first recording period Tu[1] and the subsequent recording period Tu[2] of the printing process. In a period Tbu, which is a period immediately before the recording period Tu[1], the control portion 6 supplies the drive signal Vin causing the nonprint micro-vibration to the piezoelectric element PZ. As a result, the discharging portion D[m] is supplied with the drive signal Vin that causes the nonprint micro-vibration in the period Tbu. The drive signal Vin that causes the nonprint micro-vibration includes a waveform that has a plurality of pulses including the drive component that causes the pressure inside the cavity 320 to decrease and the drive component that causes the pressure inside the cavity 320 to increase.

Regarding the recording period Tu[1], the control portion 6 generates the individual designation signal Sd[m] of the drive mode α1 and outputs the generated individual designation signal Sd[m] to the switching circuit 10. As a result, the discharging portion D[m] is supplied with the drive signal Vin having the drive pulses PL1, PL2, PL3, PL4, and PL5 in the recording period Tu[1]. The liquid column is formed in the meniscus MS due to the nonprint micro-vibration at the start time point of the recording period Tu[1], or the meniscus MS fluctuates so that the discharging portion D can discharge the droplet DR in the recording period Tu[1].

Regarding the recording period Tu[2], the control portion 6 generates the individual designation signal Sd[m] of the drive mode α2 and outputs the generated individual designation signal Sd[m] to the switching circuit 10. As a result, the discharging portion D[m] is supplied with the drive signal Vin having the drive pulses PL4 and PL5 in the recording period Tu[2]. By supplying the drive signal Vin having the drive pulses PL1, PL2, PL3, PL4, and PL5 in the recording period Tu[1], the liquid column is formed in the meniscus MS at the start time point of the recording period Tu[2], or the meniscus MS fluctuates so that the discharging portion D can discharge the droplet DR in the recording period Tu[1].

The discharge mode illustrated in a second stage in FIG. 28 is a mode in which the droplet DR is discharged in the recording period Tu[1] and the recording period Tu[3] and the droplet DR is not discharged in the recording period Tu[2]. Since the period Tbu and the recording period Tu[1] are the same as the period Tbu and the recording period Tu[1] in the first stage in FIG. 28, the description thereof will be omitted. Since the recording period Tu[2] is the non-discharge recording period Tu-N, the drive signal Vin including the drive pulse PL in which the droplet DR is not discharged, for example, the drive signal Vin having the drive pulses PL2 and PL3, is supplied.

Regarding the recording period Tu[3], since the preceding predetermined recording period Tux is the non-discharge recording period Tu-N, the drive signal Vin having more drive pulses PL than in the case of the recording period Tu[2], in which the immediately before recording period Tu[1] indicated in the first stage in FIG. 28 is the discharge recording period Tu-D, for example, the drive signal Vin having drive pulses PL3, PL4 and PL5 is supplied. By supplying the drive signal Vin having the drive pulses PL2 and PL3 in the recording period Tu[2], the liquid column is formed in the meniscus MS at the start time point in the recording period Tu[3], or the meniscus MS fluctuates so that the discharging portion D can discharge the droplet DR in the recording period Tu[3].

In the third modification example, in the first recording period Tu[1] of the printing process, the waveform PH1 included in the drive signal Vin of the nonprint micro-vibration and the recording period Tu[1] is another example of the "first waveform" described in the above-described embodiment and modification examples, and the waveform PH2 included in the drive signal Vin in the recording period Tu[1] is another example of the "second waveform" described in the above-described embodiment and modification examples. Further, in the recording period Tu after the first recording period Tu[1] of the printing process, the waveform PH1 included in the drive signal Vin in the recording period Tu[j−1] and the drive signal Vin in the recording period Tu[j] is another example of the "first waveform" described in the above-described embodiment and modification examples, and the waveform PH2 included in the drive signal Vin in the recording period Tu[j] is another example of the "second waveform" described in the above-described embodiment and modification examples. Further, in the first recording period Tu[1] of the printing process, a plurality of pulses included in the drive signal Vin that causes the nonprint micro-vibration and the drive pulse PL included in the waveform PH1 included in the drive signal Vin in the recording period Tu[1] are other examples of the "first drive pulses" described in the above-described embodiment and modification examples, and the drive pulse PL included in the waveform PH2 included in the drive signal Vin in the recording period Tu[1] is another example of the "second drive pulse" described in the above-described embodiment and modification examples. Further, in the recording period Tu after the first recording period Tu[1] of the printing process, the drive pulse PL included in the drive signal Vin in the recording period Tu[j−1] and the drive pulse PL included in the waveform PH1 included in the drive signal Vin in the recording period Tu[j] are other examples of the "first drive pulses" described in the above-described embodiment and modification examples, and the drive pulse PL included in the waveform PH2 included in the drive signal Vin in the recording period Tu[j] is another example of the "second waveform" described in the above-described embodiment and modification examples.

2.4. Fourth Modification Example

In the third modification example, an example has been described in which even in a case where the drive signal Vin based on the individual designation signal Sd[m] of the drive mode α1 is supplied to the piezoelectric element PZ within the recording period Tu[i], when the viscosity of the ink has a high viscosity that the ink cannot be discharged within one recording period Tu[i], the droplet DR is discharged in the recording period Tu[1] by supplying the drive signal that causes the nonprint micro-vibration to the piezoelectric element PZ immediately before the first recording period Tu[1] of the printing process, but the present disclosure is not limited to this. In a fourth modification example, from the stationary state of the discharging portion D in which the reference potential V0 is supplied to the piezoelectric element PZ and the state in which the position of the meniscus MS is stationary at the initial position Z0, by supplying the drive signal Vin to the piezoelectric element PZ over the plurality of recording periods Tu[i], it is possible to discharge one droplet DR from the discharging portion D in the plurality of recording periods Tu[i].

Figure 29:
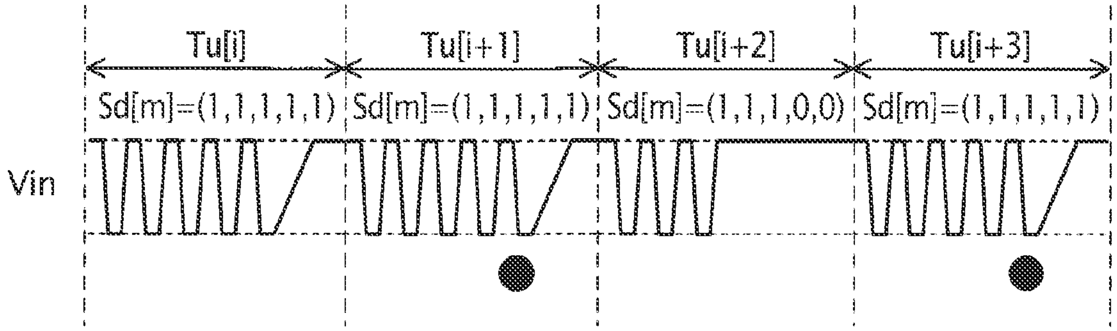
FIG. 29 is a view for describing a drive signal Vin when a droplet DR is discharged in a fourth modification example.

FIG. 29 is a view for describing the drive signal Vin when the droplet DR is discharged in the fourth modification example. The control portion 6 associates a predetermined number of recording periods Tu with one dot in order to align the discharge intervals, in other words, the dot intervals, among the plurality of discharging portions D. The predetermined number is an integer of 2 or more. FIG. 29 illustrates an example in which the predetermined number is 2. The control portion 6 controls a movement mechanism 8 such that the movement speed of the liquid discharging head HU becomes a value obtained by dividing the movement speed of the liquid discharging head HU in the first embodiment by a predetermined number.

In FIG. 29, at the start time point of the recording period Tu[i], the stationary state of the discharging portion D in which the reference potential V0 is supplied to the piezoelectric element PZ and the state in which the position of the meniscus MS is stationary at the initial position Z0, is assumed. One dot is printed in two of the recording period Tu[i] and the recording period Tu[i+1]. In the recording period Tu[i] and the recording period Tu[i+1], the control portion 6 generates the individual designation signal Sd[m] of the drive mode α1.

Subsequently, one dot is printed even in the two of the recording period Tu[i+2] and the recording period Tu[i+3] following the recording period Tu[i+1]. In the recording period Tu[i+2], the control portion 6 generates an individual designation signal Sd[m] having a value (1,1,1,0,0), and in the recording period Tu[i+3], the control portion 6 generates the individual designation signal Sd[m] of the drive mode α1.

In the fourth modification example, the waveform PH1 included in the drive signal Vin in the recording period Tu[i] and the drive signal Vin in the recording period Tu[i+1] are other examples of the "first waveforms" described in the above-described embodiment and modification examples, and the waveform PH2 included in the drive signal Vin in the recording period Tu[i+1] is another example of the "second waveform" described in the above-described embodiment and modification examples. Further, the waveform PH1 included in the drive signal Vin in the recording period Tu[i+2] and the drive signal Vin in the recording period Tu[i+3] are other examples of the "first waveforms" described in the above-described embodiment and modification examples, and the waveform PH2 included in the drive signal Vin in the recording period Tu[i+3] is another example of the "second waveform" described in the above-described embodiment and modification examples. Further, the drive pulse PL included in the drive signal Vin in the recording period Tu[i] and the drive pulse PL included in the waveform PH1 included in the drive signal Vin in the recording period Tu[i+1] are other examples of the "first drive pulses" described in the above-described embodiment and modification examples, and the drive pulse PL included in the waveform PH2 included in the drive signal Vin in the recording period Tu[i+1] is another example of the "second drive pulse" described in the above-described embodiment and modification examples. Further, the drive pulse PL included in the drive signal Vin in the recording period Tu[i+2] and the drive pulse PL included in the waveform PH1 included in the drive signal Vin in the recording period Tu[i+3] are other examples of the "first drive pulses" described in the above-described embodiment and modification examples, and the drive pulse PL included in the waveform PH2 included in the drive signal Vin in the recording period Tu[i+3] is another example of the "second drive pulse" described in the above-described embodiment and modification examples.

As described in the first embodiment, when discharging the droplet DR in the two of the recording period Tu[j] and the recording period Tu[j+1], a waveform of the drive signal Vin supplied to the piezoelectric element PZ in the two of the recording period Tu[j] and the recording period Tu[j+1] is determined based on the waveform of the drive signal Vin supplied to the piezoelectric element PZ in the predetermined recording period Tux preceding the two of the recording period Tu[j] and the recording period Tu[j+1]. Since the droplet DR is discharged in the recording period Tu[i+1] preceding the two of the recording period Tu[i+2] and the recording period Tu[i+3], the number of drive pulses PL included in the drive signal Vin in the recording period Tu[i+2] is smaller than the number of drive pulses PL included in the drive signal Vin in the recording period Tu[i] in which the droplet DR is not discharged in the preceding period.

Further, in the fourth modification example, as in the third modification example, the drive signal that causes the nonprint micro-vibration can be supplied to the piezoelectric element PZ immediately before the start of the printing process. By causing the nonprint micro-vibration before the first recording period Tu[1] of the printing process, as compared with the case where the nonprint micro-vibration is not caused, the number of recording periods Tu corresponding to one dot can be reduced, and the slowdown of the movement speed of the liquid discharging head HU can be reduced.

2.5. Fifth Modification Example

In the first embodiment and the first modification example to the fourth modification example, when discharging the droplet DR in the recording period Tu[j], the waveform of the drive signal Vin supplied to the piezoelectric element PZ in the recording period Tu[j] is determined based on the waveform of the drive signal Vin supplied to the piezoelectric element PZ in the predetermined recording period Tux preceding the recording period Tu[j], specifically, it is determined which of the drive modes α1 to α4 is selected in the recording period Tu[j] based on the waveform of the drive signal Vin supplied to the piezoelectric element PZ in the predetermined recording period Tux, but the present disclosure is not limited to this. In a fifth modification example, the waveform of the drive signal Vin may be determined based on the viscosity of the ink, specifically, the number of drive pulses PL included in the drive signal Vin may be changed.

Figures 30, 31:
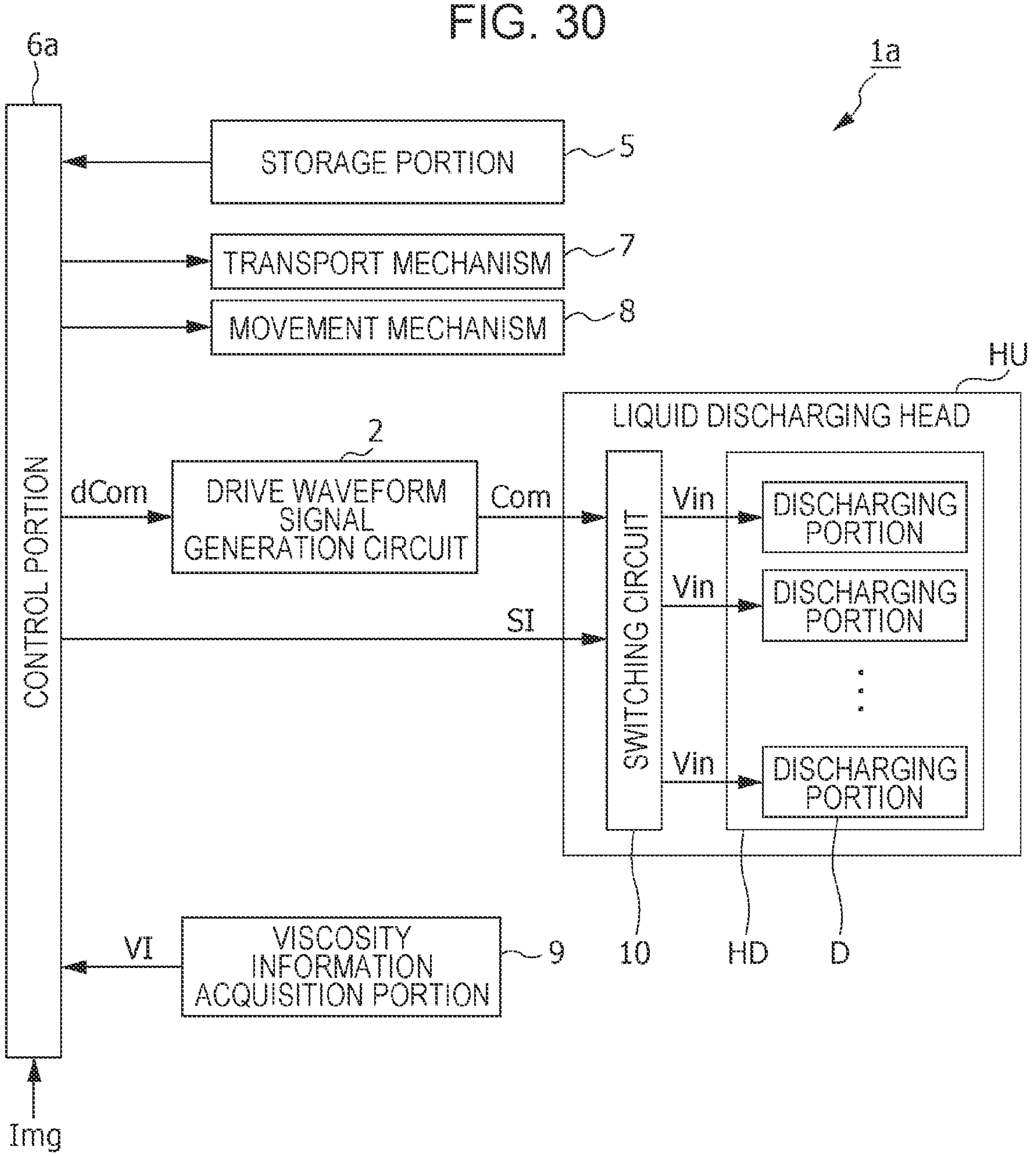
FIG. 30 is a functional block view illustrating an example of a configuration of an ink jet printer 1*a* according to a fifth modification example.
FIG. 31 is a view for describing an example of the determination of the number of drive pulses PL included in a drive signal Vin1.

FIG. 30 is a functional block view illustrating an example of a configuration of an ink jet printer 1*a* according to the fifth modification example. The ink jet printer 1*a* differs from the ink jet printer 1 in that a viscosity information acquisition portion 9 is included and the control portion 6*a* is included instead of the control portion 6.

The viscosity information acquisition portion 9 acquires viscosity information VI indicating the viscosity of the liquid in the liquid discharging head HU. The viscosity information VI is an example of "physical property information".

The viscosity information acquisition portion 9 acquires the viscosity information VI by using, for example, any one of the following three methods. In a first method, the viscosity information acquisition portion 9 acquires the viscosity information VI based on the waveform of the residual vibration of the vibrating plate 310. In a second method, the viscosity information acquisition portion 9 acquires the viscosity information VI of the ink contained in the liquid container 14. In a third method, a user inputs the viscosity information VI of the ink, and the viscosity information acquisition portion 9 acquires the viscosity information VI input by the user.

The control portion 6*a* determines the waveform of the drive signal Vin based on the viscosity information VI. Specifically, the control portion 6*a* determines the number of drive pulses PL of the waveform PH1 included in the drive signal Vin1 based on the viscosity information VI. An example of determining the number of drive pulses PL of the waveform PH1 included in the drive signal Vin1 will be described with reference to FIG. 31.

FIG. 31 is a view for describing an example of determining the number of drive pulses PL of the waveform PH1 included in the drive signal Vin1. As illustrated in FIG. 31, when the viscosity indicated by the viscosity information VI is less than 20 millipascal seconds, the control portion 6*a* determines the number of drive pulses PL of the waveform PH1 included in the drive signal Vin1 to be zero. When the viscosity indicated by the viscosity information VI is 20 millipascal seconds or more and less than 30 millipascal seconds, the control portion 6*a* determines the number of drive pulses PL of the waveform PH1 included in the drive signal Vin1 to be one. When the viscosity indicated by the viscosity information VI is 30 millipascal seconds or more and less than 50 millipascal seconds, the control portion 6*a* determines the number of drive pulses PL of the waveform PH1 included in the drive signal Vin1 to be two. When the viscosity indicated by the viscosity information VI is 50 millipascal seconds or more and less than 70 millipascal seconds, the control portion 6*a* determines the number of drive pulses PL of the waveform PH1 included in the drive signal Vin1 to be three.

When the number of drive pulses PL of the waveform PH1 included in the drive signal Vin1 is determined to be one, the control portion 6*a* determines the waveform of the drive signal Vin1 as the waveform PH1 having any one of the drive pulses PL selected from the drive pulses PL1, PL2, and PL3. For example, the waveform of the drive signal Vin1 is determined to be the waveform PH1 having the drive pulse PL3.

Similarly, when the number of drive pulses PL included in the drive signal Vin1 is determined to be two, the control portion 6*a* determines the waveform of the drive signal Vin1 as the waveform PH1 having any two of the drive pulses PL selected from the drive pulses PL1, PL2, and PL3. For example, the waveform of the drive signal Vin1 is determined to be the waveform PH1 having the drive pulses PL2 and PL3.

Further, the control portion 6*a* determines the waveform of the drive signal Vin2 as the waveform PH2 regardless of the viscosity information VI.

In a case where the drive pulse PL to be included in the waveform PH1 is selected from the drive pulses PL1, PL2, and PL3, by selecting the drive pulse PL close to the waveform PH2, the droplet DR can be easily discharged from the nozzle N when the waveform PH2 is supplied to the piezoelectric element PZ.

Referring back to FIG. 30. The control portion 6*a* generates the individual designation signal Sd[m] such that the drive signal Vin, which includes the drive signal Vin1 where the waveform thereof is determined and the drive signal Vin2 where the waveform thereof is determined, is generated. For example, when it is determined that the drive signal Vin1 includes the waveform PH1 having only the drive pulse PL3, the control portion 6*a* generates the individual designation signal Sd[m] of the drive mode α3 illustrated in FIG. 6. The control portion 6*a* outputs the generated individual designation signal Sd[m] to the switching circuit 10.

In the fifth modification example, as further described in the first embodiment, when discharging the droplet DR in the recording period Tu[j], a waveform of the drive signal Vin supplied to the piezoelectric element PZ in the recording period Tu[j] can also be determined in consideration of a waveform of the drive signal Vin supplied to the piezoelectric element PZ in a predetermined recording period Tux preceding the recording period Tu[j].

2.5.1. Round-Up of Fifth Modification Example

As described above, in the ink jet printer 1*a* in the fifth modification example, the control portion 6 executes a recording method including a first step, a second step, a third step, and a fourth step. The first step is to acquire the viscosity information VI indicating the viscosity of the ink in the liquid discharging head HU. The second step is to determine the waveform of the drive signal Vin based on the viscosity information VI. The third step is to form the liquid column LC6 in which the meniscus MS protrudes in the −Z direction by supplying the waveform PH1 included in the drive signal Vin1 among the drive signal Vin having the waveform determined in the second step to the piezoelectric element PZ. In the fourth step, when the liquid column LC6 is formed, by supplying the waveform PH2 included in the drive signal Vin2 among the drive signal Vin having the waveform determined in the second step to the piezoelectric element PZ, the liquid column LC8 in which the meniscus MS protrudes in the −Z direction is formed, and thereafter a part or all of the liquid constituting the liquid column LC8 is discharged as the droplet DR.

When increasing the number of drive pulses PL of the waveform PH1 regardless of the low state of the viscosity of the ink, the droplet DR is discharged earlier than the timing at which the droplet DR should be originally discharged. On the other hand, when decreasing the number of drive pulses PL of the waveform PH1 regardless of the high state of the viscosity of the ink, the droplet DR is discharged later than the timing at which the droplet DR should be originally discharged or the droplet DR is not discharged.

By determining the waveform of the drive signal Vin based on the viscosity indicated in the viscosity information VI, the droplet DR can be discharged so as to approach the timing at which the droplet DR should be originally discharged so that deterioration of the printing quality can be further reduced.

The second step in the "Round-up of Fifth Modification Example" is to determine the waveform of the drive signal Vin1 based on the viscosity information VI.

By adjusting the waveform of the drive signal Vin1, the droplet DR can be discharged so as to approach the timing at which the droplet DR should be originally discharged.

In the second step in the section "Round-up of Fifth Modification Example" is to determine the number of drive pulses PL of the waveform PH1 included in the drive signal Vin1 based on the viscosity information VI.

As described in the section "Round-up of Recording Method Using Drive Waveform Signal Com" in the first embodiment, adjusting the number of drive pulses PL is an easy configuration as compared with an aspect of adjusting the lowest potential and the highest potential of the drive pulses PL.

Therefore, according to the fifth modification example, it is possible to generate the waveform of the drive signal Vin1 that matches the viscosity of the ink with a simpler configuration.

In the fifth modification example, the drive signal Vin2 has a predetermined waveform PH2 regardless of the viscosity information VI. Therefore, when generating the drive signal Vin that matches the viscosity of the ink, it is only necessary to adjust the waveform of the drive signal Vin1 and it is not necessary to adjust the waveform of the drive signal Vin2.

In the second step in the section "Round-up of Fifth Modification Example", the waveform of the drive signal Vin1 is determined such that a third of the number of drive pulses PL of the waveform PH1 included in the drive signal Vin1 when the viscosity information VI indicates a first viscosity is larger than a fourth of the number of drive pulses PL of the waveform PH1 included in the drive signal Vin1 when the viscosity information VI indicates a second viscosity lower than the first viscosity.

Since the first viscosity is higher than the second viscosity, when the viscosity information VI indicates the first viscosity, it is necessary to supply the drive signal Vin1 having more drive pulses PL to the piezoelectric element PZ as compared when the viscosity information VI indicates the second viscosity. Therefore, the droplet DR can be discharged at the timing at which the droplet DR should be originally discharged by determining the waveform of the drive signal Vin1 such that the third of the number of drive pulses PL is larger than the fourth of the number of drive pulses PL.

2.6. Sixth Modification Example

In the fifth modification example, it has been described that one example of the physical property information is the viscosity information VI, but the physical property information is not limited to the viscosity information VI. For example, the physical property information may be any one of information indicating the surface tension of the ink, information indicating the bulk modulus of the ink, and information indicating the specific gravity of the ink.

When the physical property information is information indicating the surface tension of the ink, the control portion 6 determines the waveform of the drive signal Vin1 such that the number of drive pulses PL included in the drive signal Vin1 when the surface tension of the ink indicates a first value is larger than the number of drive pulses PL included in the drive signal Vin1 when the surface tension of the ink indicates a second value that is smaller than the first value.

When the physical property information is information indicating the bulk modulus of the ink, the control portion 6 determines the waveform of the drive signal Vin1 such that the number of drive pulses PL included in the drive signal Vin1 when the bulk modulus of the ink indicates a third value is larger than the number of drive pulses PL included in the drive signal Vin1 when the bulk modulus of the ink indicates a fourth value that is smaller than the third value.

When the physical property information is information indicating the specific gravity of the ink, the control portion 6 determines the waveform of the drive signal Vin1 such that the number of drive pulses PL included in the drive signal Vin1 when the bulk modulus of the ink indicates a fifth value is larger than the number of drive pulses PL included in the drive signal Vin1 when the bulk modulus of the ink indicates a sixth value that is smaller than the fifth value.

2.7. Seventh Modification Example

In the first embodiment and the first modification example to the sixth modification example, the drive waveform signal Com has a waveform PH2 having drive pulses PL4 and PL5, but the present disclosure is not limited to this. A drive waveform signal Comb in a seventh modification example has a waveform PH2*b* having only the drive pulse PL4.

Figure 32:
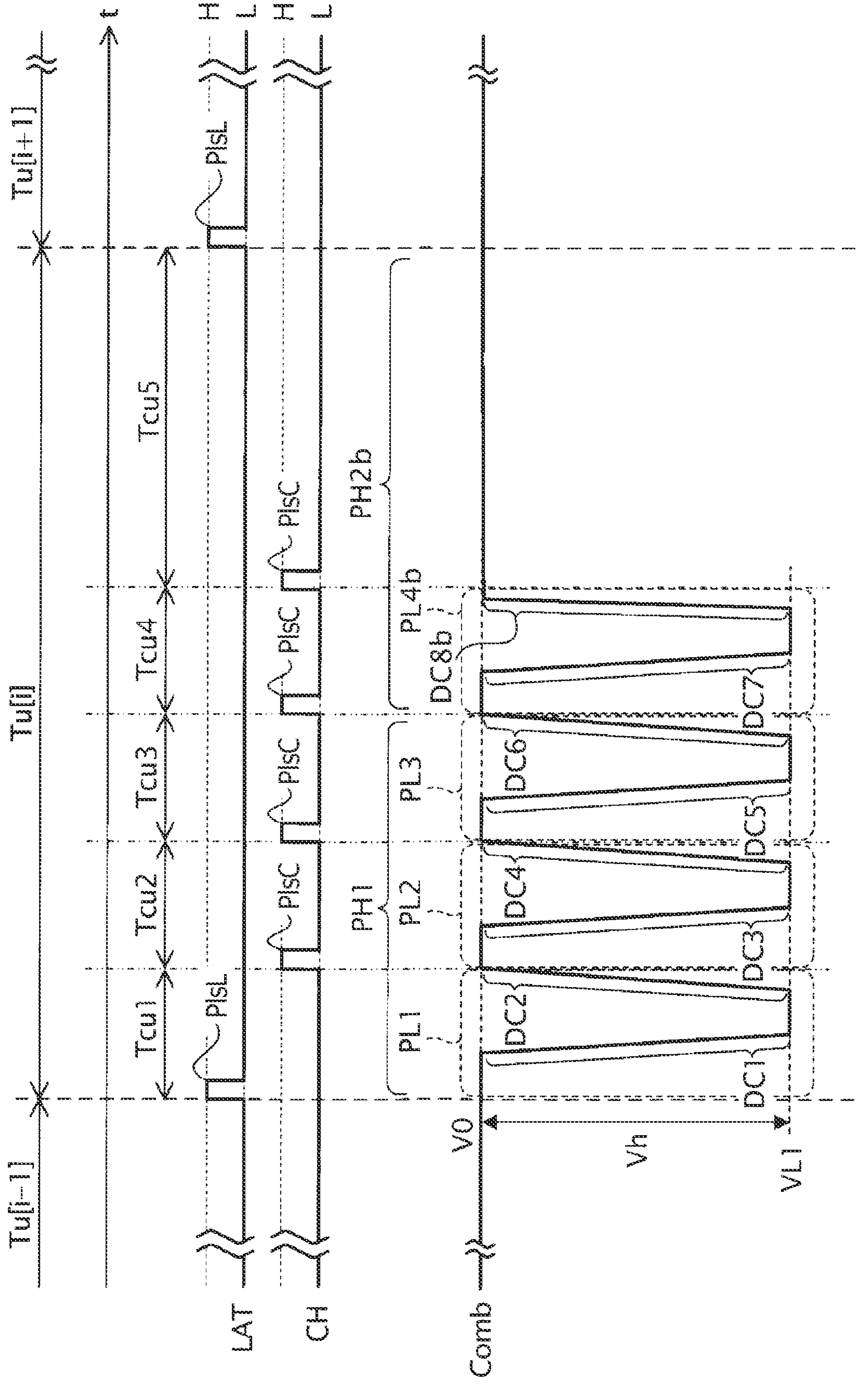
FIG. 32 is a view for describing a drive waveform signal Comb in a seventh modification example.

FIG. 32 is a view for describing the drive waveform signal Comb in the seventh modification example. The drive waveform signal Comb has the waveform PH1 and a waveform PH2*b*. The waveform PH2*b* has a drive pulse PL4*b*. The drive pulse PL4*b* has the drive component DC7 and a drive component DC8*b*. The change amount of the potential per unit period in the drive component DC8*b* is larger than the change amount of the potential per unit period in the drive components DC2, DC4, and DC6, so that the energy to move the liquid column LC8, which is formed by supplying the drive component DC8*b* to the piezoelectric element PZ, in the −Z direction is increased, and thus a part or all of the liquid column is discharged as the droplet DR even when the drive pulse PL is not present after the drive pulse PL4*b*.

2.8. Eighth Modification Example

In the first embodiment and the first modification example to the seventh modification example, a potential difference between the highest potential and the lowest potential in the drive pulses PL included in the waveform PH1 and the waveform PH2 is a potential difference Vh, but the present disclosure is not limited to this. The potential difference of the waveform PH1 may be 0.5 times or more the potential difference of the waveform PH2. In an eighth modification example, a potential difference Vh2*a* of a drive pulse PL4*a* included in a waveform PH2*a* is larger than a potential difference Vh1 of the drive pulses PL1, PL2, and PL3 of the waveform PH1, and a potential difference Vh3*a* of a drive pulse PL5*a* included in a waveform PH2 is smaller than the potential difference Vh1 of the drive pulses PL1, PL2, and PL3 of the waveform PH1.

Figure 33:
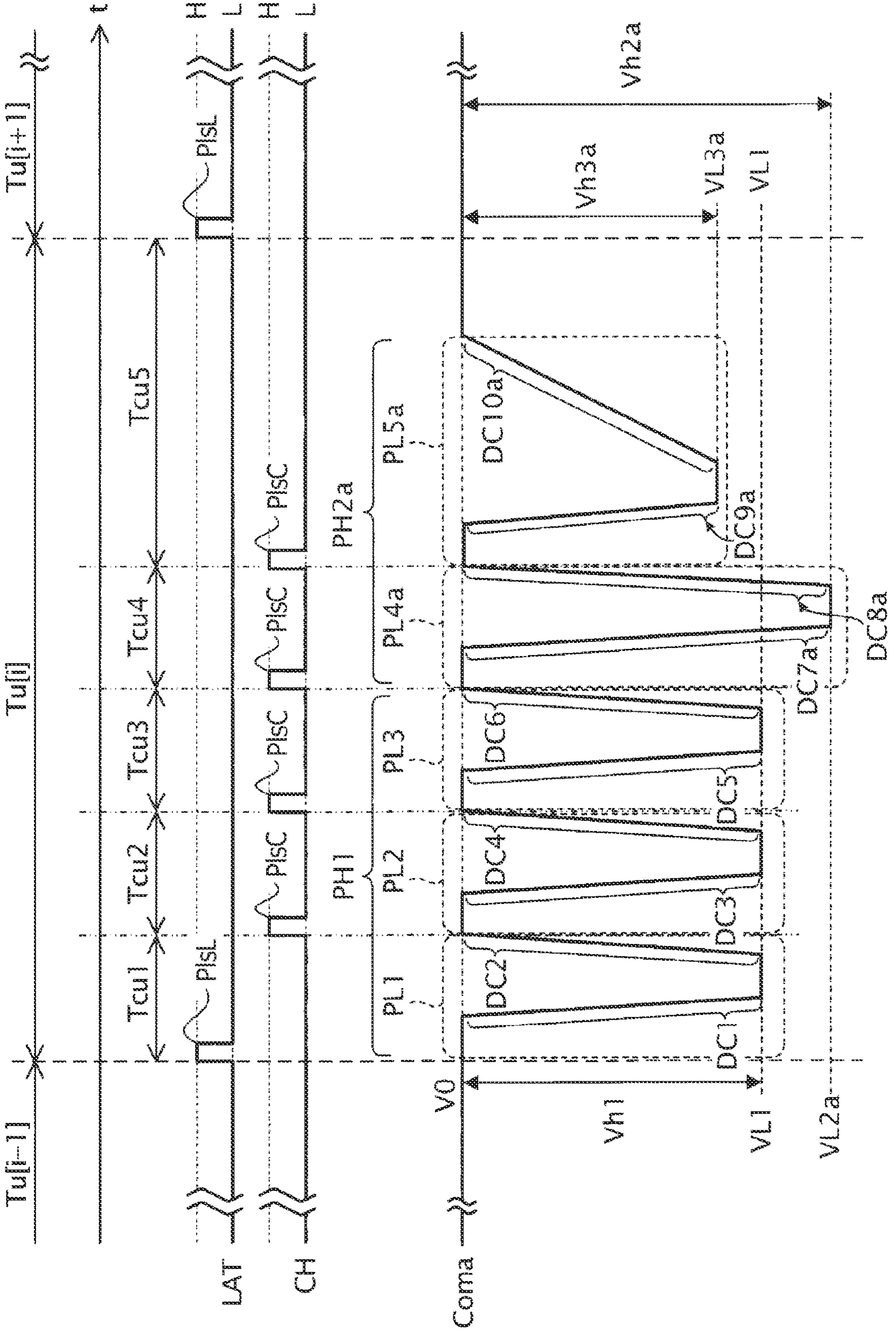
FIG. 33 is a view for describing a drive waveform signal Coma in an eighth modification example.

FIG. 33 is a view for describing a drive waveform signal Coma in the eighth modification example. The drive waveform signal Coma has the waveform PH1 and the waveform PH2*a*. The waveform PH2*a* has drive pulses PL4*a* and PL5*a*. The drive pulse PL5*a* has drive components DC9*a* and DC10*a*. The lowest potential of the drive pulse PL4*a* is a potential VL2*a*. The potential VL2*a* is lower than the potential VL1. The potential difference of the drive pulse PL4*a* is the potential difference Vh2*a*. The potential difference Vh2*a* is larger than the potential difference Vh1 of the drive pulses PL1, PL2, and PL3. More specifically, in the drive component DC7*a* of the drive pulse PL4*a*, a potential at the start is set to the reference potential V0, and a potential at the end is set to the potential VL2*a*. In the drive component DC8*a* of the drive pulse PL4*a*, a potential at the start is set to the potential VL2*a*, and a potential at the end is set to the reference potential V0. Further, the lowest potential of the drive pulse PL5*a* is the potential VL3*a*. The potential VL3*a* is higher than the potential VL1. The potential difference of the drive pulse PL5*a* is the potential difference Vh3*a*. The potential difference Vh3*a* is smaller than the potential difference Vh1 of the drive pulses PL1, PL2, and PL3. More specifically, in the drive component DC9*a* of the drive pulse PL5*a*, a potential at the start is set to the reference potential V0, and a potential at the end is set to the potential VL3*a*. In the drive component DC10*a* of the drive pulse PL5*a*, a potential at the start is set to the potential VL3*a*, and a potential at the end is set to the reference potential V0.

By the potential difference Vh1 of the drive pulses PL1, PL2, and PL3 included in the waveform PH1, any potential can be set suitable for the liquid column to grow appropriately and to prevent the ink from leaking from the nozzle N unnecessarily. Since the liquid column cannot be grown when the potential difference Vh1 is small, the potential difference Vh1 of the drive pulses PL1, PL2, and PL3 is desirably 0.5 times or more the potential difference Vh2*a* of the drive pulse PL4*a* of the waveform PH2*a*.

Further, in the present modification example, the potential difference Vh3*a* of the drive pulse PL5*a* of the waveform PH2*a* is made smaller than the potential difference Vh1 and the potential difference Vh2*a*. As a result, it is possible to reduce the possibility that the ink oozes out to the surface of the nozzle plate 330 in the −Z direction due to the drive component DC10*a* of the drive pulse PL5*a*. When the ink is hard to ooze out to the surface of the nozzle plate 330 in the −Z direction due to the drive component DC10*a* of the drive pulse PL5*a*, the potential difference Vh3*a* of the drive pulse PL5*a* can be set to the potential difference Vh2*a* or more.

It is also possible to set the individual potential differences of the drive pulses PL1, PL2, and PL3 of the waveform PH1 to different values from each other.

2.9. Ninth Modification Example

In the first embodiment and the first modification example to the eighth modification example, a potential difference between the highest potential and the lowest potential in the drive pulses PL included in the waveform PH1 and the waveform PH2 is substantially equal to the potential difference Vh, but the present disclosure is not limited to this. The potential difference of the waveform PH1 may be 0.5 times or more the potential difference of the waveform PH2. In a ninth modification example, the potential difference of the drive pulse PL5 included in the waveform PH2 is larger than the potential difference of the waveform PH1.

Figure 34:
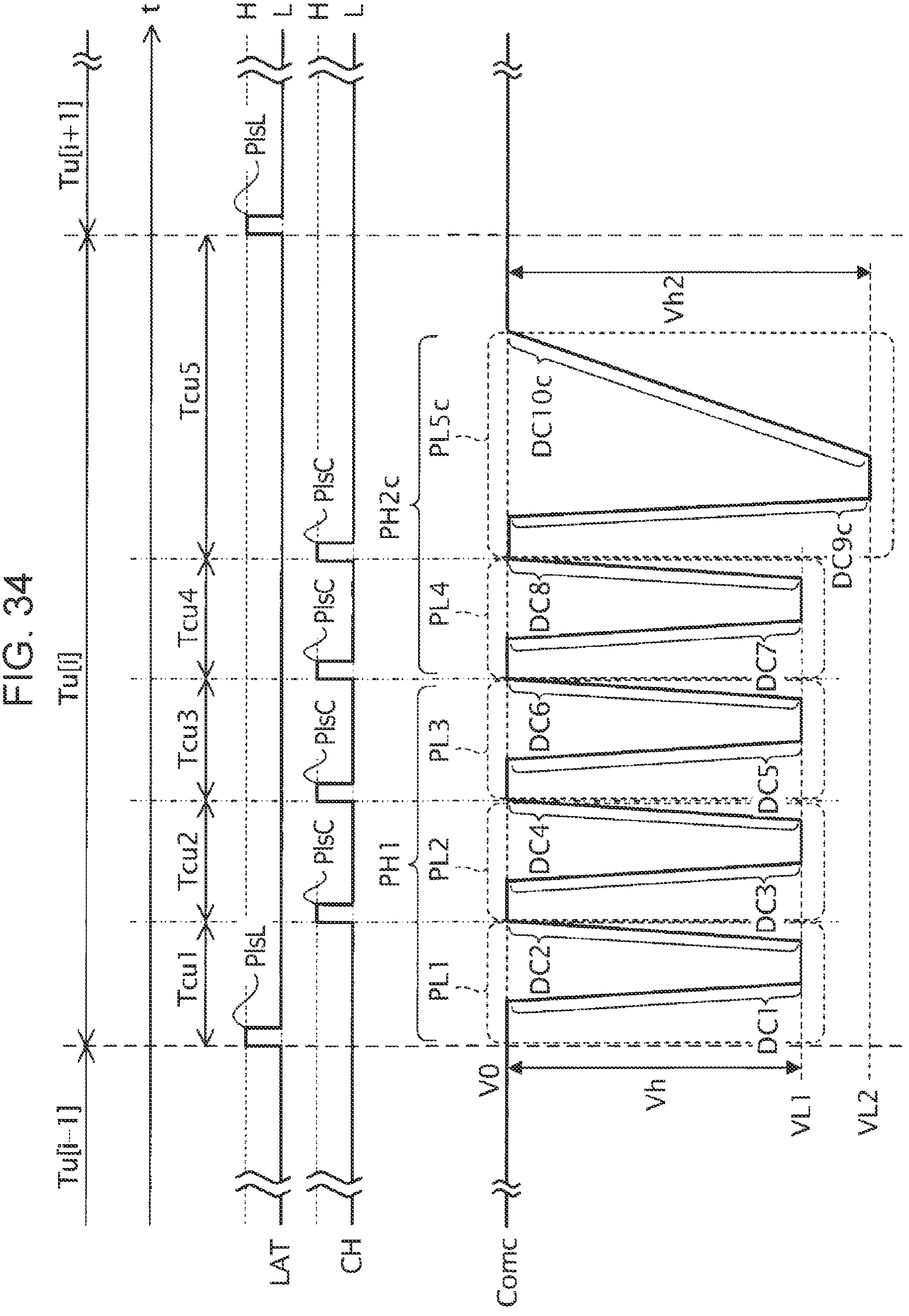
FIG. 34 is a view for describing a drive waveform signal Comc in a ninth modification example.

FIG. 34 is a view for describing a drive waveform signal Comc in the ninth modification example. The drive waveform signal Comc has the waveform PH1 and a waveform PH2*c*. The waveform PH2*c* has drive pulses PL4 and PL5*c*. The drive pulse PL5*c* has drive components DC9*c* and DC10*c*. The lowest potential of the drive pulse PL5*c* is a potential VL2. The potential VL2 is lower than the potential VL1. A potential difference of the drive pulse PL5*c* is the potential difference Vh2. More specifically, regarding the drive component DC9*c*, a potential at the start is set to the reference potential V0, and the potential at the end is set to the potential VL2. Regarding the drive component DC10*c*, a potential at the start is set to the potential VL2, and a potential at the end is set to the reference potential V0. The potential difference Vh2 is larger than the potential difference Vh of the drive pulses PL1, PL2, PL3, and PL4. Since the potential difference Vh2 of the drive pulse PL5*c* is larger than the potential difference Vh, a force for tearing off the droplet DR from the liquid column LC9 can be increased.

According to the ninth modification example, by setting the potential difference of the waveform PH1 to 0.5 times or more the potential difference of the waveform PH2*c*, the degree of freedom in designing the drive waveform signal Com can be improved as compared with an aspect in which the potential difference of the waveform PH1 and the potential difference of the waveform PH2 are substantially equal to each other. For example, by making the potential difference of the waveform PH2 larger than the potential difference of the waveform PH1, the force for tearing off the droplet DR from the liquid column LC9 can be increased. More desirably, the drive pulse PL5*c* of the waveform PH2*c* has the drive component DC9*c* supplied to the piezoelectric element PZ when the front end of the liquid column LC8 moves in the −Z direction, and the difference between the highest potential and the lowest potential of the drive pulse PL5*c* is made larger than the difference between the highest potential and the lowest potential in the waveform PH1, and thus the force for tearing off the droplet DR from the liquid column LC9 can be increased.

The drive pulse PL5*c* is an example of "one drive pulse included in the second drive pulse of the second waveform", and the drive component DC9*c* is an example of the "the third drive component supplied to the drive element when the front end of the second liquid column moves in the discharging direction".

On the other hand, by making the potential difference of the waveform PH1 smaller than the potential difference of the waveform PH2*c*, the droplet DR can be reliably discharged when the waveform PH2*c* is supplied to the piezoelectric element PZ, without discharging the droplet DR from the discharging portion D when the waveform PH1 is supplied to the piezoelectric element PZ. Further, when the potential difference of the waveform PH2*c* is larger than the potential difference of the waveform PH1, the droplets are not excessively discharged by the waveform PH2, but the ink may ooze out to the surface of the nozzle plate 330 in the −Z direction. By making the potential difference of the waveform PH1 larger than the potential difference of the waveform PH2, it is possible to reduce the possibility that the ink oozes out to the surface of the nozzle plate 330 in the −Z direction. The designer of the ink jet printer 1 can design the drive waveform signal Com in consideration of the viscosity of the ink.

2.10. Tenth Modification Example

In the first embodiment and the first modification example to the ninth modification example, a period from a time point when the supply of the drive components DC9, DC9*a*, and DC9*c* included in the drive pulses PL5, PL5*a*, and PL5*c* is started to a time point when the supply of the drive components DC10, DC10*a*, and DC10*c* is ended, is longer than a period from the time point when the supply of the first drive components DC1, DC3, DC5, and DC7 included in any of the drive pulses PL among the other drive pulses PL included in the drive waveform signals Com, Coma, and Comc is started to the time point when the supply of the second drive components DC2, DC4, DC6, and DC8 is ended, but the present disclosure is not limited to this.

Figure 35:
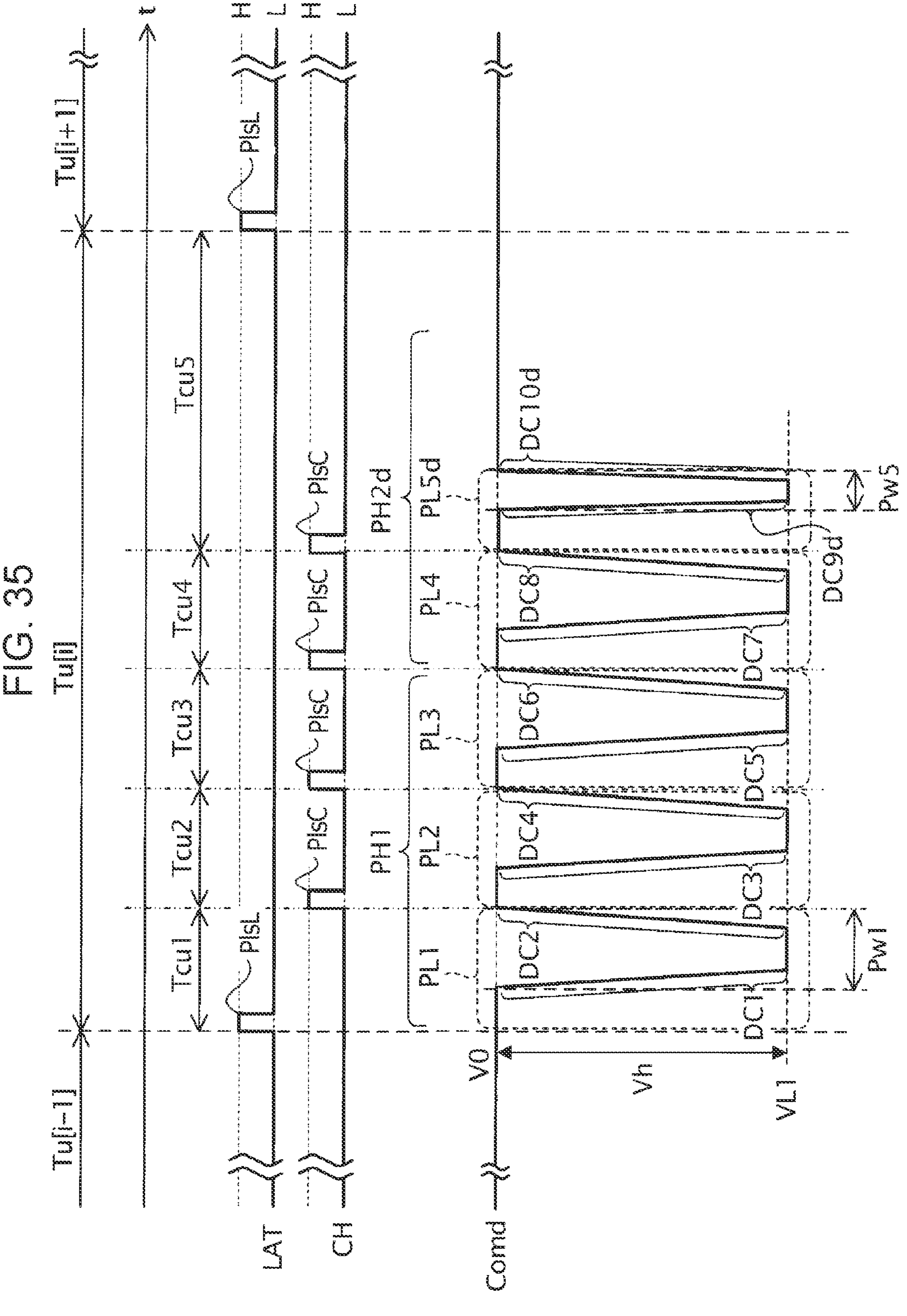
FIG. 35 is a view for describing a drive waveform signal Comd in a tenth modification example.

FIG. 35 is a view for describing a drive waveform signal Comd in a tenth modification example. The drive waveform signal Comd has the waveform PH1 and a waveform PH2*d*. The waveform PH2*d* has drive pulses PL4 and PL5*d*. The drive pulse PL5*d* has a drive component DC9*d* and a drive component DC10*d*. A period Pw5 from the time point when the supply of the drive component DC9*d* is started to the time point when the supply of the drive component DC10*d* is ended is shorter than, for example, a period Pw1 from the time point when the supply of the drive component DC1 of the drive pulse PL1 is started to the time point when the supply of the drive component DC2 is ended. The period Pw5 is shorter than the natural vibration cycle TC of the discharging portion D, and is, for example, 0.25 times the natural vibration cycle TC. By the fact that the period Pw5 is shorter than the period Pw1, it can trigger the tearing of the droplet DR from the liquid column LC9.

Further, the drive pulse PL that causes tearing is one drive pulse PL5, but a plurality of drive pulses PL may be used.

2.11. Eleventh Modification Example

In the first embodiment and the first modification example to the tenth modification example, the highest potential and the initial potential of the drive pulse PL are the same, but the highest potential and the initial potential may be different from each other.

Figure 36:
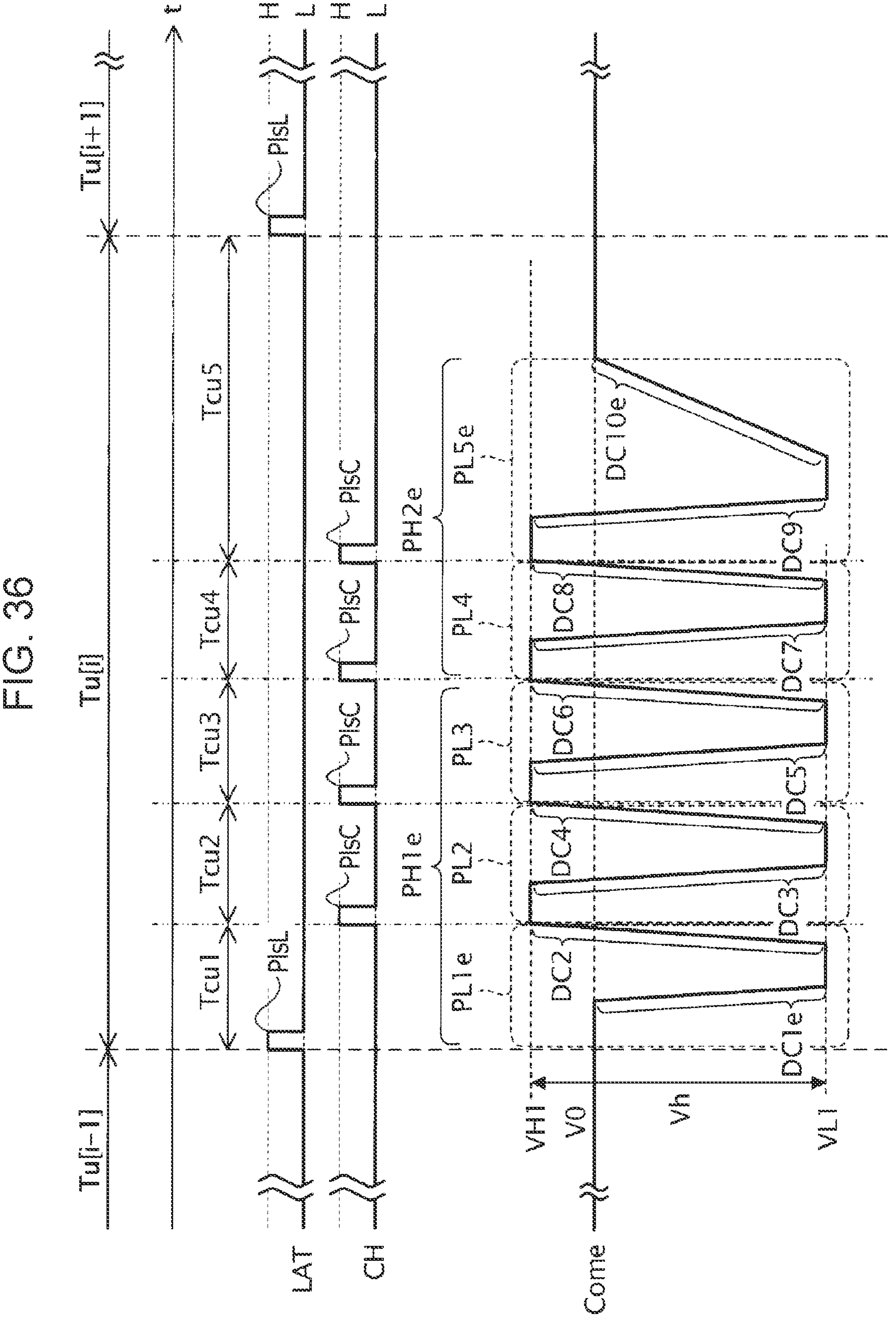
FIG. 36 is a view for describing a drive waveform signal Come in an eleventh modification example.

FIG. 36 is a view for describing a drive waveform signal Come in an eleventh modification example. The drive waveform signal Come has a waveform PH1*e* and a waveform PH2*e*. The waveform PH1*e* has drive pulses PL1*e*, PL2, and PL3. The waveform PH2*e* has drive pulses PL4 and PL5*e*.

Regarding the drive pulse PL1*e*, the potential at the start is set to the reference potential V0, and the potential at the end is set to the highest potential VH1. The highest potential VH1 is higher than the reference potential V0. The drive pulse PL1*e* has drive components DC1*e* and DC2. Regarding the drive component DC1*e*, the potential at the start is set to the reference potential V0, and the potential at the end is set to the lowest potential VL1. Regarding the drive pulses PL2, PL3, and PL4, the potential at the start and the potential at the end are set to the highest potential VH1. Regarding the drive pulse PL5*e*, the potential at the start is set to the highest potential VH1, and the potential at the end is set to the reference potential V0. The drive pulse PL5*e* has drive components DC9 and DC10*e*. Regarding the drive component DC10*e*, the potential at the start is set to the lowest potential VL1 and the potential at the end is set to the reference potential V0.

According to the eleventh modification example, a potential difference between the highest potential and the lowest potential of the drive component DC10*e* is smaller than a potential difference between the highest potential and the lowest potential of the drive component DC10, so that unnecessary discharge can be reduced as compared with the above-described embodiment and modification examples. Alternatively, in the embodiment, there is a possibility that the ink oozes out to the surface of the nozzle plate 330 in the −Z direction even when the droplet DR is not discharged by the drive component DC10. In the tenth modification example, it is possible to reduce the ink from oozing out to the surface of the nozzle plate 330 in the −Z direction as compared with the embodiment.

2.12. Twelfth Modification Example

In the eleventh modification example, the reference potential V0 is between the highest potential VH1 and the lowest potential VL1, but the reference potential V0 may coincide with the lowest potential VL1.

Figure 37:
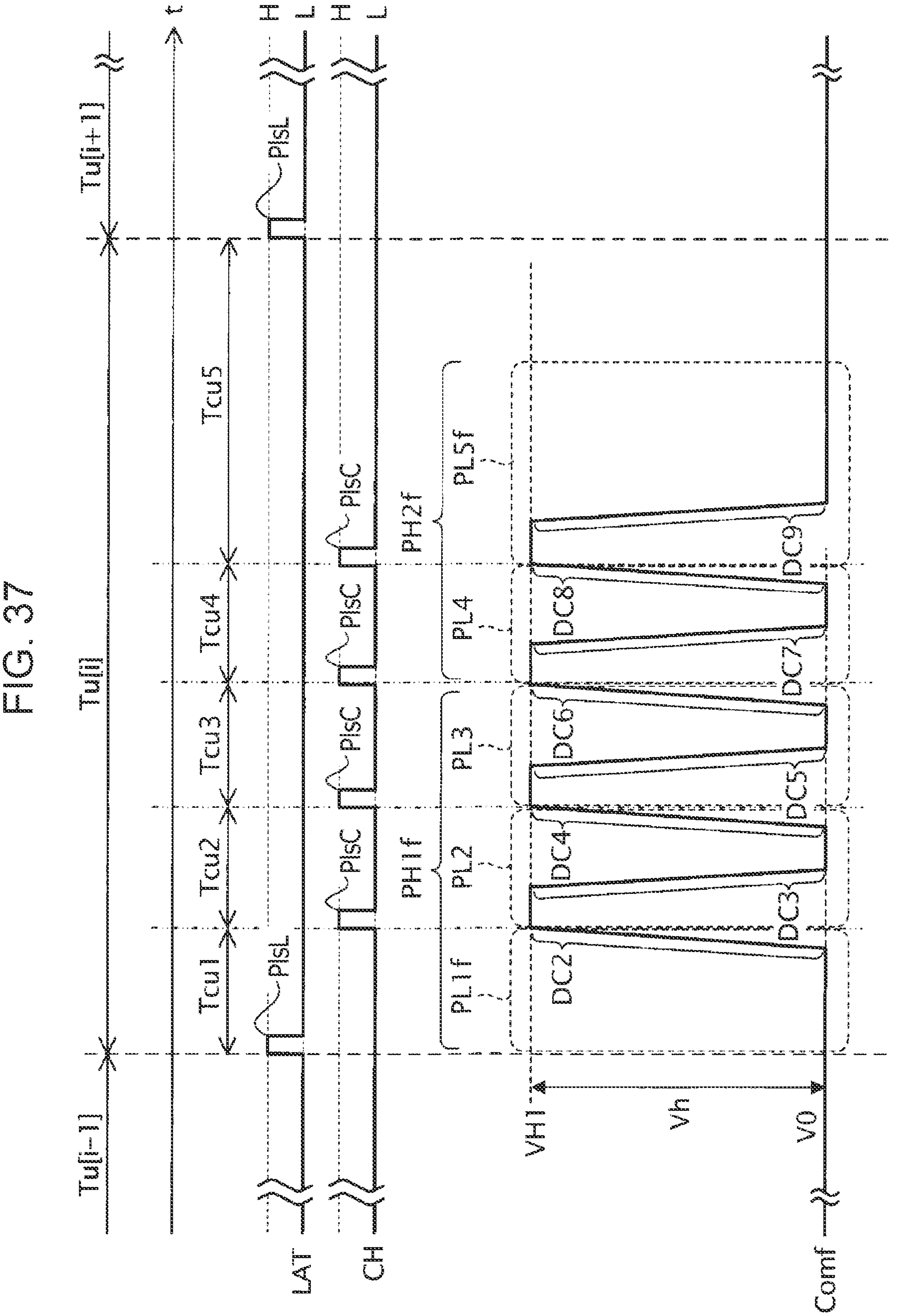
FIG. 37 is a view for describing a drive waveform signal Comf in a twelfth modification example.

FIG. 37 is a view for describing a drive waveform signal Comf in the twelfth modification example. The drive waveform signal Comf has a waveform PH1*f* and a waveform PH2*f*. The waveform PH1*f* has drive pulses PL1*f*, PL2, and PL3. The waveform PH2*f* has drive pulses PL4 and PL5*f*.

Regarding the drive pulse PL1*f*, the potential at the start is set to the reference potential V0, and the potential at the end is set to the highest potential VH1. The highest potential VH1 is higher than the reference potential V0. The drive pulse PL1*f* has the drive component DC2 and does not have the drive component DC1. Regarding the drive pulses PL2, PL3, and PL4, the potential at the start and the potential at the end are set to the highest potential VH1. Regarding the drive pulse PL5*f*, the potential at the start is set to the highest potential VH1, and the potential at the end is set to the reference potential V0. The drive pulse PL5*e* has the drive component DC9 and does not have the drive component DC10.

According to the twelfth modification example, since the drive component DC10 is not provided, unnecessary discharge can be reduced as compared with the tenth modification example. Alternatively, in the eleventh modification example, there is a possibility that the ink oozes out to the surface of the nozzle plate 330 in the −Z direction even when the droplet DR is not discharged by the drive component DC10. According to the eleventh modification example, since the drive component DC10 is not provided, it is possible to reduce the ink from oozing out to the surface of the nozzle plate 330 in the −Z direction as compared with the tenth modification example.

2.13. Thirteenth Modification Example

In the first embodiment, the control portion 6 determines the waveform of the individual designation signal Sd[m] in the recording period Tu[j] based on the individual designation signals Sd[m] in the recording periods Tu[j−1] to Tu[j−3] as the predetermined recording period Tux preceding the recording period Tu[j], but the present disclosure is not limited to this. For example, the control portion 6 may determine the individual designation signal Sd[m] for the recording period Tu[j] based on the individual designation signals Sd[m] in two or more recording periods Tu, which include the recording period Tu[j−1], are two or more consecutive recording periods Tu, and end before the start of the recording period Tu[j]. Further, for example, the control portion 6 may determine the individual designation signal Sd[m] in the recording period Tu[j] based on the individual designation signal Sd[m] having only the recording period Tu[j−1].

2.14. Fourteenth Modification Example

In a fourteenth modification example, it has been described that the control portion 6 determines the individual designation signal Sd[m] in the recording period Tu[j] based on the individual designation signals Sd[m] in two or more recording periods Tu including the recording period Tu[j−1] as the predetermined recording period Tux preceding the recording period Tu[j], but the control portion 6 may determine the individual designation signal Sd[m] in the recording period Tu[j] based on the individual designation signals Sd[m] in one or more recording periods Tu that does not include the recording period Tu[j−1] as the predetermined recording period Tux preceding the recording period Tu[j].

2.15. Fifteenth Modification Example

The control portion 6 may determine the waveform of the drive signal Vin in the recording period Tu[j] based on the ratio of the number of recording period Tu in which the droplet DR is discharged from the discharging portion D to the number of recording period Tu in which the droplet DR is not discharged from the discharging portion D among the predetermined recording periods Tux including the recording period Tu[j−1] and including two or more consecutive recording periods Tu ending before the start of the recording period Tu[j]. For example, the control portion 6 calculates the following equation (3).

$$\text{Discharge ratio} = \text{Number of recording periods } Tu \text{ in which droplet } DR \text{ is discharged from discharging portion } D / \text{Number of predetermined recording periods } Tux \quad (3)$$

Thereafter, the control portion 6 makes the number of drive pulses PL in the recording period Tu when the calculated discharge ratio is a first ratio smaller than the number of drive pulses PL in the recording period Tu when the discharge ratio is a second ratio. The first ratio is larger than the second ratio.

When the discharge ratio is large, the liquid column formed in the meniscus MS at the start time point of the recording period Tu[j] becomes large. Therefore, by determining the waveform of the drive signal Vin in the recording period Tu[j] based on the discharge ratio, the droplet DR can be discharged so as to approach the timing at which the droplet DR should be originally discharged so that deterioration of the printing quality can be further reduced.

2.16. Sixteenth Modification Example

In the first embodiment and the first modification example to the fifteenth modification example, the waveform PH1 has three drive pulses PL, but the present disclosure is not limited to this. The waveform PH1 may have only one drive pulse PL or may have four or more drive pulses PL. In a case where the waveform PH1 has four or more drive pulses PL, in the fifth modification example, when the viscosity indicated by the viscosity information VI is 70 millipascal seconds or more, the control portion 6*a* determines the number of drive pulses PL included in the drive signal Vin1 to be four or more. For example, when the viscosity indicated by the viscosity information VI is 70 millipascal seconds or more and less than 100 millipascal seconds, the control portion 6*a* determines the number of drive pulses PL included in the drive signal Vin1 to be four.

2.17. Seventeenth Modification Example

In the first embodiment, the liquid column is defined as a columnar or pyramidal liquid surface protruding from a position in the most+Z direction side to the −Z direction side in the meniscus MS, but when the droplet is temporarily separated from the meniscus MS, the columnar or pyramidal liquid surface of the droplet may also be the liquid column. A droplet that is temporarily separated from the meniscus MS is a droplet that is separated when a certain drive component DC is supplied but is combined when the next drive component DC is supplied. Specifically, the liquid column LC7 illustrated in FIG. 14 may be temporarily separated from the meniscus MS. The separated liquid column LC7 is recombined with the meniscus MS by the supply of the drive component DC8.

2.18. Eighteenth Modification Example

Each of the above aspects can also be applied to an aspect in which a plurality of cavities 320 supply ink to one nozzle N.

Figure 38:
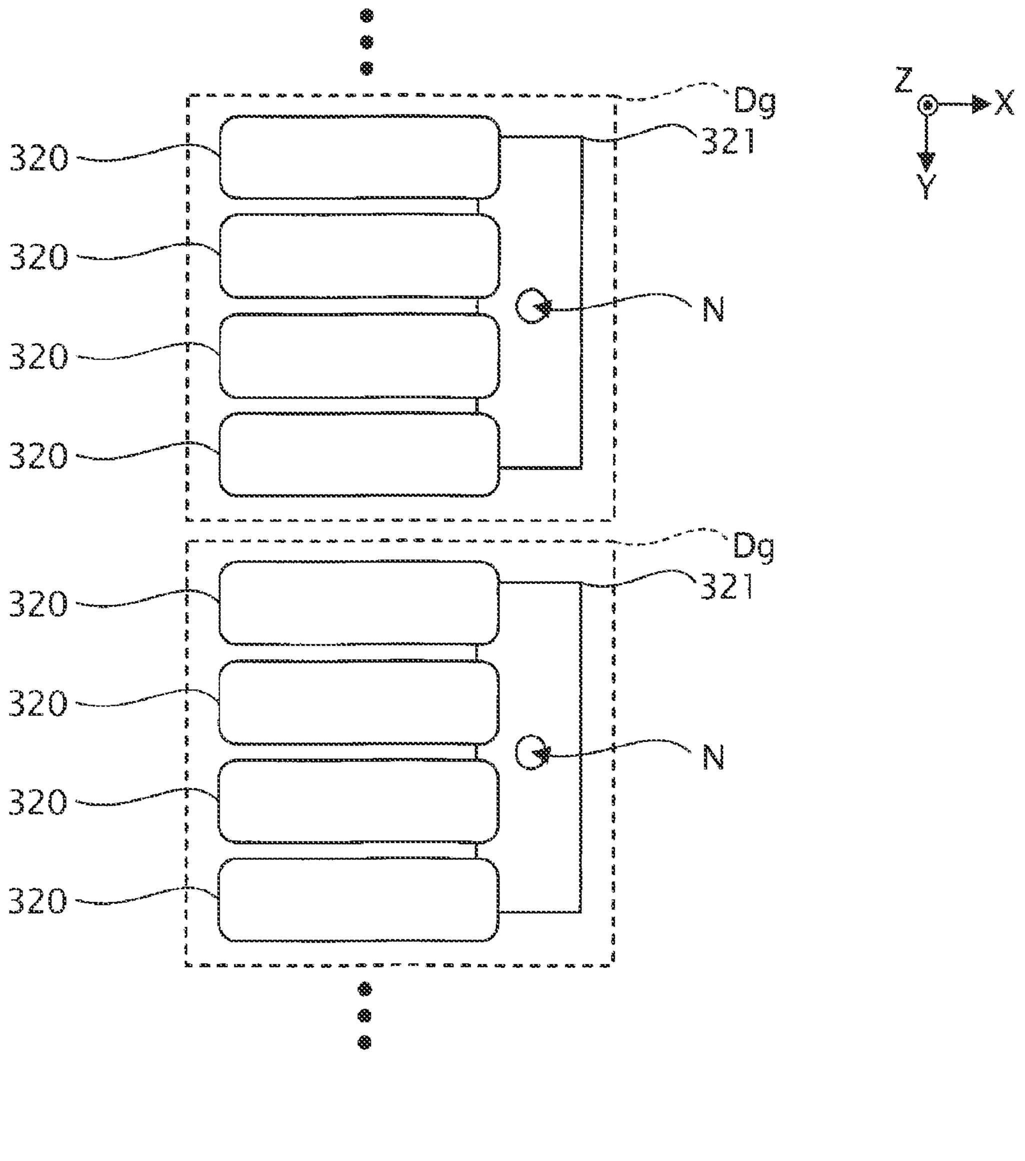
FIG. 38 is a view illustrating an example of a discharging portion Dg in an eighteenth modification example.

FIG. 38 is a view illustrating an example of a discharging portion Dg in an eighteenth modification example. The figure illustrated in FIG. 38 is a view of a plurality of discharging portions Dg viewed in the −Z direction. For the sake of brevity, the piezoelectric element PZ, the vibrating plate 310, the nozzle plate 330, and the cavity plate 340 are not illustrated in FIG. 38. The discharging portion Dg has four cavities 320, a connection flow path 321, and a nozzle N. The four cavities 320 communicate with an ink common liquid chamber (not shown) to supply ink. The connection flow path 321 communicates with the nozzle N and further communicates with each of the four cavities 320 in the −X direction. In FIG. 38, the discharging portion Dg has four cavities 320, but the discharging portion Dg may have two cavities 320, three cavities 320, or five or more cavities 320. By increasing the number of cavities 320 included in one discharging portion D, the excluded volume of the cavities 320 with respect to one nozzle N can be increased, so that ink having a higher viscosity can be discharged as compared with the first embodiment.

2.19. Nineteenth Modification Example

Each of the above aspects can be also applied to an ink jet printer 1 that supplies the ink to the liquid discharging head HU and has a circulation mechanism collecting ink discharged from the liquid discharging head HU for resupply to the liquid discharging head HU.

Figure 39:
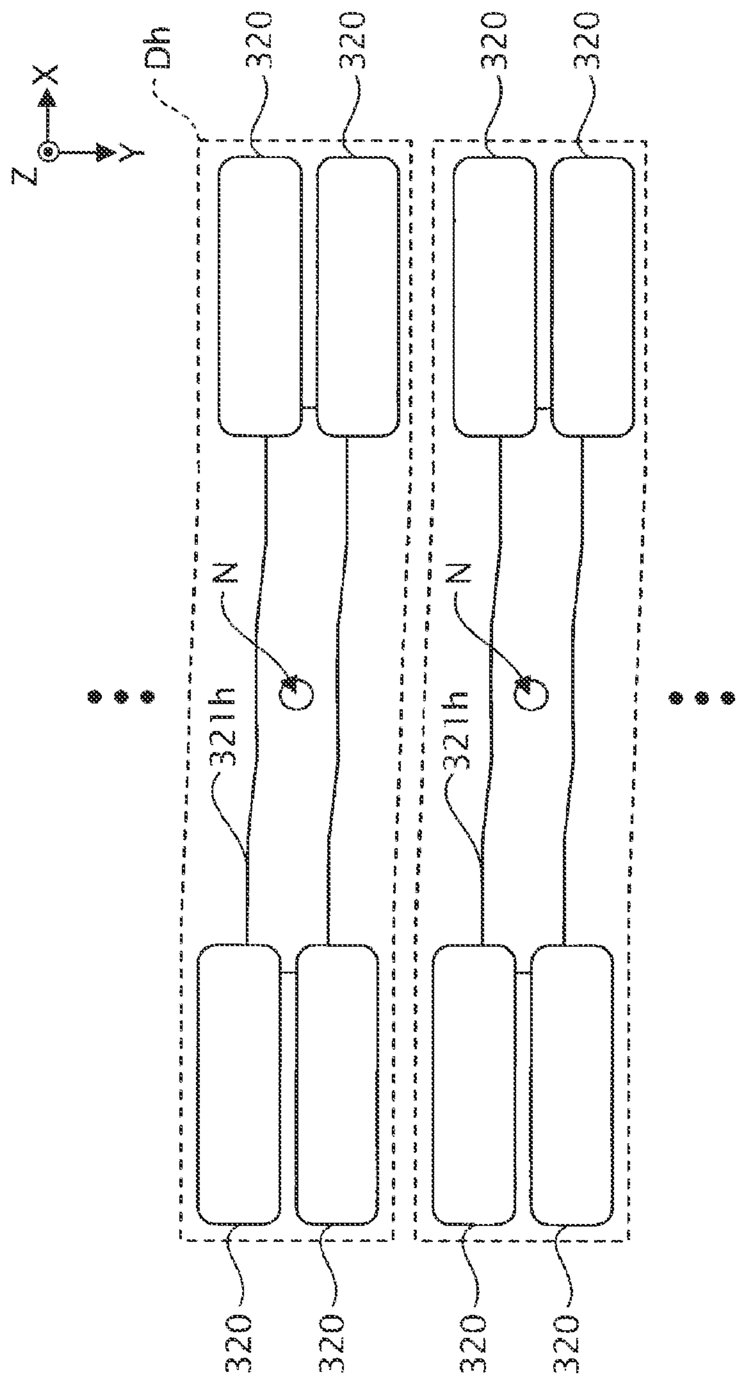
FIG. 39 is a view illustrating an example of a discharging portion Dh in a nineteenth modification example.

FIG. 39 is a view illustrating an example of a discharging portion Dh in a nineteenth modification example. The figure illustrated in FIG. 39 is a view of a plurality of discharging portions Dh viewed in the −Z direction. For the sake of brevity, the piezoelectric element PZ, the vibrating plate 310, the nozzle plate 330, and the cavity plate 340 are not illustrated in FIG. 39. The discharging portion Dh has four cavities 320, a connection flow path **321*h*, and a nozzle N. The connection flow path 321*h* communicates with two cavities 320 at the end portion in the −X direction and connects the two cavities 320 at the end portion in the +X direction. The two cavities 320 communicating with the end portion of the connection flow path 321*h* in the −X direction communicate with the ink supply portion of the circulation mechanism (not shown), and the ink is supplied from the ink supply portion. Further, the two cavities 320 communicating with the end portion of the connection flow path 321*h* in the +X direction communicate with the ink collection liquid portion of the circulation mechanism (not shown), and the ink is collected by an ink collection portion. As a result, the ink circulates from the two cavities 320 in the −X direction to the two cavities 320 in the +X direction side via the connection flow path 321*h***.

In the nineteenth modification example as well, since the excluded volume of the cavity 320 with respect to one nozzle N can be increased, ink having a higher viscosity can be discharged as compared with the first embodiment. Further, in the nineteenth modification example, the thickening of the ink inside the cavity 320 and the connection flow path **321*h*** is reduced by the circulation mechanism.

2.20. Twentieth Modification Example

In each of the above-described aspects, the serial-type ink jet printer 1 in which a transporting body 82 accommodating the liquid discharging head HU is reciprocated in the X axis direction is exemplified, but the present disclosure is not limited to such an aspect. The ink jet printer may be a line-type ink jet printer in which a plurality of nozzles N are distributed over the entire width of the recording paper P.

When a line-type ink jet printer 1 is used, the third modification example may be applied. The control portion 6 controls the transport mechanism 7 such that the transporting speed of the recording paper P is a value obtained by dividing the transporting speed of the recording paper P by a predetermined number when the twentieth modification example is applied to the first embodiment.

2.21. Twenty First Modification Example

In each of the above aspects, an example of the "drive element" is the piezoelectric element PZ, but a heat generating element may be provided instead of the piezoelectric element PZ.

2.22. Twenty Second Modification Example

The ink jet printer exemplified in each of the above-described aspects can be adopted not only in an apparatus dedicated to printing but also in various apparatus such as a facsimile apparatus and a copying machine. Moreover, the application of the liquid discharging apparatus of the present disclosure is not limited to printing. For example, a liquid discharging apparatus that discharges a solution of a coloring material is utilized as a manufacturing apparatus that forms a color filter of a liquid crystal display apparatus. Further, a liquid discharging apparatus that discharges a solution of a conductive material is utilized as a manufacturing apparatus that forms wiring and electrodes of a wiring substrate.

3. APPENDIX

From the above-exemplified embodiment, for example, the following configuration can be ascertained.

A drive method of a liquid discharging head according to Aspect 1, which is a preferred aspect, is a drive method of a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber, the drive method including: a first step of forming a first liquid column in which a liquid surface inside the discharging portion protrudes in the discharging direction by supplying a drive signal, which has a first waveform including a first drive pulse having a first drive component that causes the pressure inside the pressure chamber to decrease and a second drive component that causes the pressure inside the pressure chamber to increase, to the drive element; and a second step of, when the first liquid column is formed, forming a second liquid column in which a liquid surface inside the discharging portion protrudes in the discharging direction by supplying a drive signal, which has a second waveform including a second drive pulse having a third drive component that causes the pressure inside the pressure chamber to decrease and a fourth drive component that causes the pressure inside the pressure chamber to increase, to the drive element, and thereafter discharging a part or all of liquid constituting the second liquid column as a droplet, in which when a drive signal having the first waveform but not having the second waveform is supplied to the drive element, a droplet is not discharged from the discharging portion, and when a drive signal having the second waveform but not having the first waveform is supplied to the drive element, a droplet is not discharged from the discharging portion.

According to Aspect 1, when the first liquid column is formed by the drive signal having the first waveform, by supplying the drive signal having the second waveform to the drive element, the liquid column formed on the liquid surface inside the discharging portion can be grown, and a part or all of the liquid constituting the second liquid column can be discharged as a droplet.

In Aspect 2, which is a specific example of Aspect 1, a decrement amount, which is a fluctuation amount of pressure of liquid inside the nozzle toward a negative pressure side at the time of supplying the third drive component of the second waveform to the drive element when the drive signal having the second waveform but not having the first waveform is supplied to the drive element, may be substantially equal to a decrement amount, which is a fluctuation amount of pressure of liquid inside the nozzle toward the negative pressure side at the time of supplying the third drive component of the second waveform to the drive element when a drive signal having the first waveform and the second waveform is supplied to the drive element.

In Aspect 2, even when the liquid has a high viscosity, the droplet can be discharged by forming the liquid column formed on the liquid surface inside the discharging portion by the first waveform and the second waveform.

In Aspect 3, which is a specific example of Aspect 1 or 2, an increment amount, which is a fluctuation amount of pressure of liquid inside the nozzle toward a positive pressure side at the time of supplying the fourth drive component of the second waveform to the drive element when the drive signal having the second waveform but not having the first waveform is supplied to the drive element, may be substantially equal to an increment amount, which is a fluctuation amount of pressure of liquid inside the nozzle toward the positive pressure side at the time of supplying the fourth drive component of the second waveform to the drive element when the drive signal having the first waveform and the second waveform is supplied to the drive element.

Similar to Aspect 2, in Aspect 3, even when the liquid has a high viscosity, the droplet can be discharged by forming the liquid column formed on the liquid surface inside the discharging portion by the first waveform and the second waveform.

In Aspect 4, which is a specific example of any one of Aspects 1 to 3, the most pulled-in part of a liquid surface inside the discharging portion in a pull-in direction opposite to the discharging direction at the time of supplying the fourth drive component of the second waveform included in the drive signal to the drive element when the drive signal having the second waveform is supplied to the drive element following the drive signal having the first waveform, may be positioned in the discharging direction with respect to the most pulled-in part of a liquid surface inside the discharging portion in the pull-in direction at the time of supplying the drive signal having the fourth drive component of the second waveform to the drive element when the drive signal having the second waveform is supplied to the drive element without supplying the drive signal having the first waveform to the drive element.

In the first embodiment, by supplying the first waveform and the second waveform to the piezoelectric element PZ, the most pulled-in part of the liquid surface inside the discharging portion in the pull-in direction when the drive signal having the first drive component is supplied to the drive element moves in the discharging direction, and thus the liquid column formed on the liquid surface inside the discharging portion also moves in the discharging direction. As the liquid column moves in the discharging direction, the front end of the liquid column in the discharging direction moves away from the initial position of the liquid surface inside the discharging portion, so that part or all of the liquid column can be easily separated, and the droplet separated from the liquid column can be discharged.

In Aspect 5, which is a specific example of any one of Aspects 1 to 4, in the second step, when a front end of the second liquid column moves in the discharging direction, the third drive component of the second drive pulse of the drive signal may be supplied to the drive element.

When the front end of the second liquid column moves in the discharging direction, the droplet is torn off from the second liquid column by supplying the drive signal having the second drive component to the drive element. According to the present embodiment, a more stable discharge can be realized as compared with the aspect in which the drive signal having no second drive component is supplied to the drive element.

In Aspect 6, which is a specific example of any one of Aspects 1 to 5, the first drive pulse of the first waveform may include a plurality of drive pulses.

Since the first waveform has the plurality of drive pulses, even when the droplet cannot be discharged with one drive pulse, the liquid column formed on the liquid surface inside the discharging portion can be grown by supplying the drive signal having the first waveform having the plurality of drive pulses to the drive element, and a part or all of the liquid constituting the second liquid column can be discharged as a droplet by the second waveform.

In Aspect 7, which is a specific example of any one of Aspects 1 to 6, a viscosity of liquid in the liquid discharging head may be 20 millipascal seconds or more.

When the viscosity of the liquid becomes 20 millipascal seconds or more, it may not be possible to discharge the droplet with only one drive pulse, but by the drive method according to Aspect 7 in which the first waveform is provided before the second waveform, the droplet can be discharged even for the liquid that has a viscosity of 20 millipascal seconds or more.

In Aspect 8, which is a specific example of any one of Aspects 1 to 7, a difference between the highest potential and the lowest potential in the first waveform may be substantially equal to a difference between the highest potential and the lowest potential in the second waveform. More specifically, the highest potential in the first waveform and the highest potential in the second waveform are substantially equal to each other, and the lowest potential in the first waveform and the lowest potential in the second waveform are substantially equal to each other.

By setting the highest potential that can be realized in the liquid discharging apparatus to the highest potential of the first waveform and the second waveform, and setting the lowest potential that can be realized in the liquid discharging apparatus to the lowest potential of the first waveform and the second waveform, even when the liquid has a high viscosity, the liquid column can be grown on the liquid surface inside the discharging portion by the first waveform, and the droplet can be discharged in the second waveform.

A liquid discharging apparatus according to Aspect 9, which is a preferred aspect, is a liquid discharging apparatus including: a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber; and a control portion controlling the liquid discharging head, in which the control portion forms a first liquid column in which a liquid surface inside the discharging portion protrudes in the discharging direction by supplying a drive signal, which has a first waveform including a first drive pulse having a first drive component that causes the pressure inside the pressure chamber to decrease and a second drive component that causes the pressure inside the pressure chamber to increase, to the drive element, and when the first liquid column is formed, forms a second liquid column in which a liquid surface inside the discharging portion protrudes in the discharging direction by supplying a drive signal, which has a second waveform including a second drive pulse having a third drive component that causes the pressure inside the pressure chamber to decrease and a fourth drive component that causes the pressure inside the pressure chamber to increase, to the drive element, and thereafter discharges a part or all of liquid constituting the second liquid column as a droplet, when a drive signal having the first waveform but not having the second waveform is supplied to the drive element, a droplet is not discharged from the discharging portion, and when a drive signal having the second waveform but not having the first waveform is supplied to the drive element, a droplet is not discharged from the discharging portion.

According to Aspect 9, when the first liquid column is formed by the drive signal having the first waveform, by supplying the drive signal having the second waveform to the drive element, the liquid column formed on the liquid surface inside the discharging portion can be grown, and a part or all of the liquid constituting the second liquid column can be discharged as a droplet.

What is claimed is:

1. A drive method of a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber, the drive method comprising:

supplying a drive signal to the drive element, the drive signal comprising at least one of:

a first waveform including a first drive pulse having a first drive component that causes the pressure inside the pressure chamber to decrease and a second drive component that causes the pressure inside the pressure chamber to increase, the first waveform being configured to form a first liquid column in which a liquid surface inside the discharging portion protrudes in the discharging direction; and a second waveform including a second drive pulse having a third drive component that causes the pressure inside the pressure chamber to decrease and a fourth drive component that causes the pressure inside the pressure chamber to increase, the second waveform being configured to grow the first liquid column to a second liquid column when the second wave form is supplied to the drive element in a time that the first liquid column is forming, the second liquid column comprising the liquid surface inside the discharging portion protruding in the discharging direction wherein when the drive signal having the first waveform but not having the second waveform is supplied to the drive element, a droplet is not discharged from the discharging portion, when the drive signal having the second waveform but not having the first waveform is supplied to the drive element, a droplet is not discharged from the discharging portion, when the drive signal having the first waveform and the second waveform is supplied to the drive element, with the second waveform being supplied to the drive element in the time that the first liquid column is forming, a droplet is formed from the second liquid column to be discharged from the discharging portion, and when a front end of the second liquid column moves in the discharging direction, the third drive component of the second drive pulse of the drive signal is supplied to the drive element.

2. The drive method according to claim 1, wherein a decrement amount, which is a fluctuation amount of pressure of liquid inside the nozzle toward a negative pressure side at the time of supplying the third drive component of the second waveform to the drive element when the drive signal having the second waveform but not having the first waveform is supplied to the drive element, is substantially equal to a decrement amount, which is a fluctuation amount of pressure of the liquid inside the nozzle toward the negative pressure side at the time of supplying the third drive component of the second waveform to the drive element when a drive signal having the first waveform and the second waveform is supplied to the drive element.

3. The drive method according to claim 1, wherein an increment amount, which is a fluctuation amount of pressure of liquid inside the nozzle toward a positive pressure side at the time of supplying the fourth drive component of the second waveform to the drive element when the drive signal having the second waveform but not having the first waveform is supplied to the drive element, is substantially equal to an increment amount, which is a fluctuation amount of pressure of the liquid inside the nozzle toward the positive pressure side at the time of supplying the fourth drive component of the second waveform to the drive element when a drive signal having the first waveform and the second waveform is supplied to the drive element.

4. The drive method according to claim 1, wherein a most pulled-in part of a liquid surface inside the discharging portion in a pull-in direction opposite to the discharging direction at the time of supplying the fourth drive component of the second waveform included in the drive signal to the drive element when the drive signal having the second waveform is supplied to the drive element following the drive signal having the first waveform, is positioned in the discharging direction with respect to a most pulled-in part of a liquid surface inside the discharging portion in the pull-in direction at the time of supplying the drive signal having the fourth drive component of the second waveform to the drive element when the drive signal having the second waveform is supplied to the drive element without supplying the drive signal having the first waveform to the drive element.

5. The drive method according to claim 1, wherein the first drive pulse of the first waveform includes a plurality of drive pulses.

6. The drive method according to claim 1, wherein a viscosity of liquid in the liquid discharging head is 20 millipascal seconds or more.

7. The drive method according to claim 1, wherein a difference between a highest potential and a lowest potential in the first waveform is substantially equal to a difference between a highest potential and a lowest potential in the second waveform.

8. A liquid discharging apparatus comprising:

a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber; and a control portion configured to control the liquid discharging head, the control portion being configured to supply a drive signal to the drive element, the drive signal comprising at least one of:

a first waveform including a first drive pulse having a first drive component that causes the pressure inside the pressure chamber to decrease and a second drive component that causes the pressure inside the pressure chamber to increase, the first waveform being configured to form a first liquid column in which a liquid surface inside the discharging portion protrudes in the discharging direction, and a second waveform including a second drive pulse having a third drive component that causes the pressure inside the pressure chamber to decrease and a fourth drive component that causes the pressure inside the pressure chamber to increase, the second waveform being configured to grow the first liquid column to a second liquid column when the second wave form is supplied to the drive element in a time that the first liquid column is forming, the second liquid column comprising the liquid surface inside the discharging portion protruding in the discharging direction, wherein a part or all of liquid constituting the second liquid column as a droplet, when a drive signal having the first waveform but not having the second waveform is supplied to the drive element, a droplet is not discharged from the discharging portion, and when a drive signal having the second waveform but not having the first waveform is supplied to the drive element, a droplet is not discharged from the discharging portion, when the drive signal having the first waveform and the second waveform is supplied to the drive element, with the second waveform being supplied to the drive element in the time that the first liquid column is forming, a droplet is formed from the second liquid column to be discharged from the discharging portion, and when a front end of the second liquid column moves in the discharging direction, the third drive component of the second drive pulse of the drive signal is supplied to the drive element.

9. A drive method of a liquid discharging head having a discharging portion that includes a drive element that displaces by being supplied with a drive signal, a pressure chamber inside which pressure is increased or decreased according to a displacement of the drive element, and a nozzle configured to communicate with the pressure chamber to discharge liquid, which fills inside the pressure chamber, as a droplet in a discharging direction according to an increase or a decrease in the pressure inside the pressure chamber, the drive method comprising:

supplying a drive signal to the drive element, the drive signal comprising at least one of:

a first waveform including a first drive pulse having a first drive component that causes the pressure inside the pressure chamber to decrease and a second drive component that causes the pressure inside the pressure chamber to increase, the first waveform being configured to form a first liquid column in which a liquid surface inside the discharging portion protrudes in the discharging direction; and a second waveform including a second drive pulse having a third drive component that causes the pressure inside the pressure chamber to decrease and a fourth drive component that causes the pressure inside the pressure chamber to increase, the second waveform being configured to grow the first liquid column to a second liquid column when the second wave form is supplied to the drive element in a time that the first liquid column is forming, the second liquid column comprising the liquid surface inside the discharging portion protruding in the discharging direction wherein when the drive signal having the first waveform but not having the second waveform is supplied to the drive element, a droplet is not discharged from the discharging portion, when the drive signal having the second waveform but not having the first waveform is supplied to the drive element, a droplet is not discharged from the discharging portion, and when the drive signal having the first waveform and the second waveform is supplied to the drive element, with the second waveform being supplied to the drive element in the time that the first liquid column is forming, a droplet is formed from the second liquid column to be discharged from the discharging portion, and a most pulled-in part of a liquid surface inside the discharging portion in a pull-in direction opposite to the discharging direction at the time of supplying the fourth drive component of the second waveform included in the drive signal to the drive element when the drive signal having the second waveform is supplied to the drive element following the drive signal having the first waveform, is positioned in the discharging direction with respect to a most pulled-in part of a liquid surface inside the discharging portion in the pull-in direction at the time of supplying the drive signal having the fourth drive component of the second waveform to the drive element when the drive signal having the second waveform is supplied to the drive element without supplying the drive signal having the first waveform to the drive element.

10. The drive method according to claim 9, wherein a decrement amount, which is a fluctuation amount of pressure of liquid inside the nozzle toward a negative pressure side at the time of supplying the third drive component of the second waveform to the drive element when the drive signal having the second waveform but not having the first waveform is supplied to the drive element, is substantially equal to a decrement amount, which is a fluctuation amount of pressure of the liquid inside the nozzle toward the negative pressure side at the time of supplying the third drive component of the second waveform to the drive element when a drive signal having the first waveform and the second waveform is supplied to the drive element.

11. The drive method according to claim 9, wherein an increment amount, which is a fluctuation amount of pressure of liquid inside the nozzle toward a positive pressure side at the time of supplying the fourth drive component of the second waveform to the drive element when the drive signal having the second waveform but not having the first waveform is supplied to the drive element, is substantially equal to an increment amount, which is a fluctuation amount of pressure of the liquid inside the nozzle toward the positive pressure side at the time of supplying the fourth drive component of the second waveform to the drive element when a drive signal having the first waveform and the second waveform is supplied to the drive element.

12. The drive method according to claim 9, wherein when a front end of the second liquid column moves in the discharging direction, the third drive component of the second drive pulse of the drive signal is supplied to the drive element.

13. The drive method according to claim 9, wherein the first drive pulse of the first waveform includes a plurality of drive pulses.

14. The drive method according to claim 9, wherein a viscosity of liquid in the liquid discharging head is 20 millipascal seconds or more.

15. The drive method according to claim 9, wherein a difference between a highest potential and a lowest potential in the first waveform is substantially equal to a difference between a highest potential and a lowest potential in the second waveform.

* * * * *